US009589317B2

(12) United States Patent
Ozaki

(10) Patent No.: US 9,589,317 B2
(45) Date of Patent: Mar. 7, 2017

(54) IMAGE PROCESSING APPARATUS, IMAGE PROCESSING METHOD, AND PROGRAM

(71) Applicant: SONY CORPORATION, Tokyo (JP)

(72) Inventor: Koji Ozaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 101 days.

(21) Appl. No.: 14/607,281

(22) Filed: Jan. 28, 2015

(65) Prior Publication Data

US 2015/0220781 A1 Aug. 6, 2015

(30) Foreign Application Priority Data

Feb. 6, 2014 (JP) ................................. 2014-021283

(51) Int. Cl.
*G06K 9/00* (2006.01)
*G06T 3/00* (2006.01)

(52) U.S. Cl.
CPC .................................. *G06T 3/0062* (2013.01)

(58) Field of Classification Search
CPC .................................................... G06T 3/0062
USPC ......................................................... 382/103
See application file for complete search history.

(56) References Cited

U.S. PATENT DOCUMENTS

| 2009/0251530 A1* | 10/2009 | Cilia ....................... B60R 11/04 348/39 |
| 2012/0045149 A1* | 2/2012 | Arai ...................... H04N 7/183 382/296 |
| 2013/0242040 A1* | 9/2013 | Masuda ............... H04N 5/2251 348/36 |
| 2013/0243351 A1* | 9/2013 | Feng ..................... G06T 3/4038 382/284 |
| 2013/0314402 A1* | 11/2013 | Furumura ............. G03B 35/02 345/419 |
| 2014/0071227 A1* | 3/2014 | Takenaka ........... H04N 5/23238 348/36 |
| 2014/0085412 A1* | 3/2014 | Hayashi .................. G06T 11/60 348/37 |
| 2014/0132709 A1 | 5/2014 | Satoh et al. |
| 2015/0062363 A1* | 3/2015 | Takenaka ........... H04N 5/23238 348/218.1 |

* cited by examiner

*Primary Examiner* — John Strege
(74) *Attorney, Agent, or Firm* — Chip Law Group

(57) ABSTRACT

There is provided an image processing apparatus including a movement amount deciding unit configured to decide a movement amount for moving a target object that is a movement target among objects included in a plurality of captured images imaged by an imaging device including optical units that have imaging ranges overlapping with each other in part on the basis of a distance from the imaging device to the target object and an angle from a reference line at a reference position of the imaging device to the target object in a manner that the plurality of captured images look like images imaged from the reference position, the imaging device using all directions as an imaging range, the plurality of captured images corresponding to the respective optical units.

12 Claims, 29 Drawing Sheets

FIG. 6
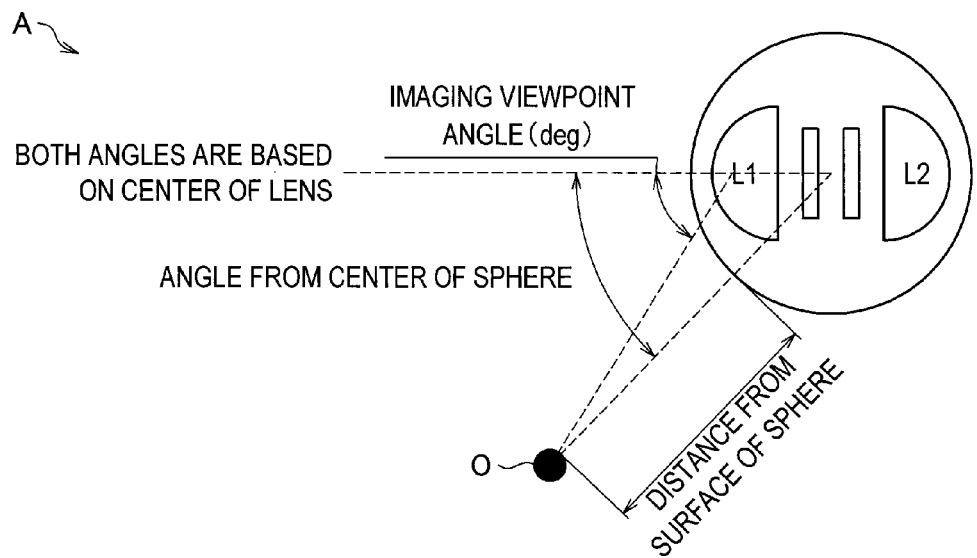
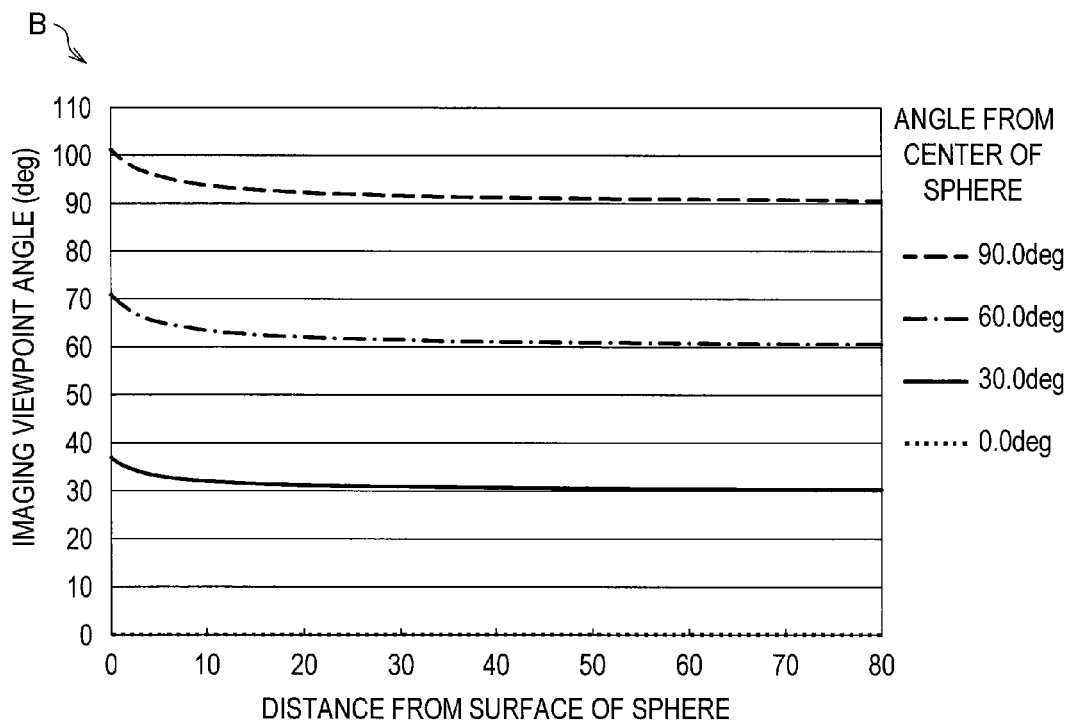

FIG. 15
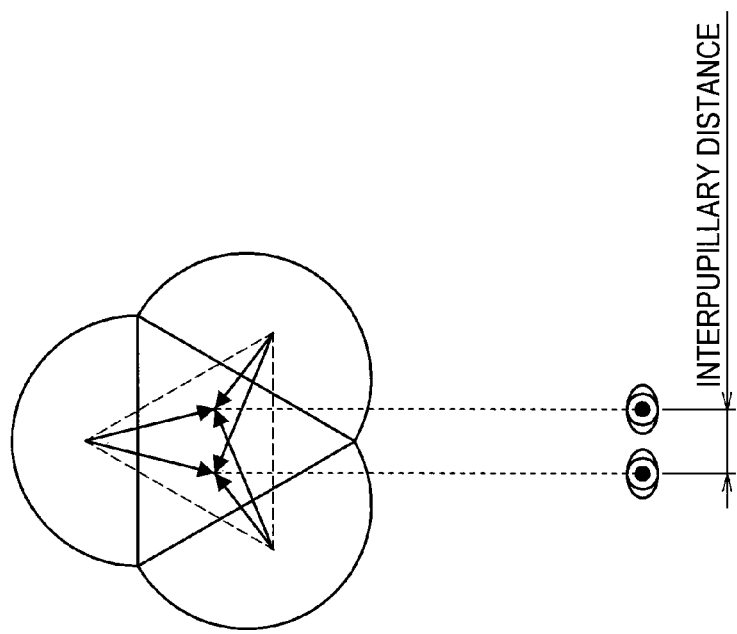
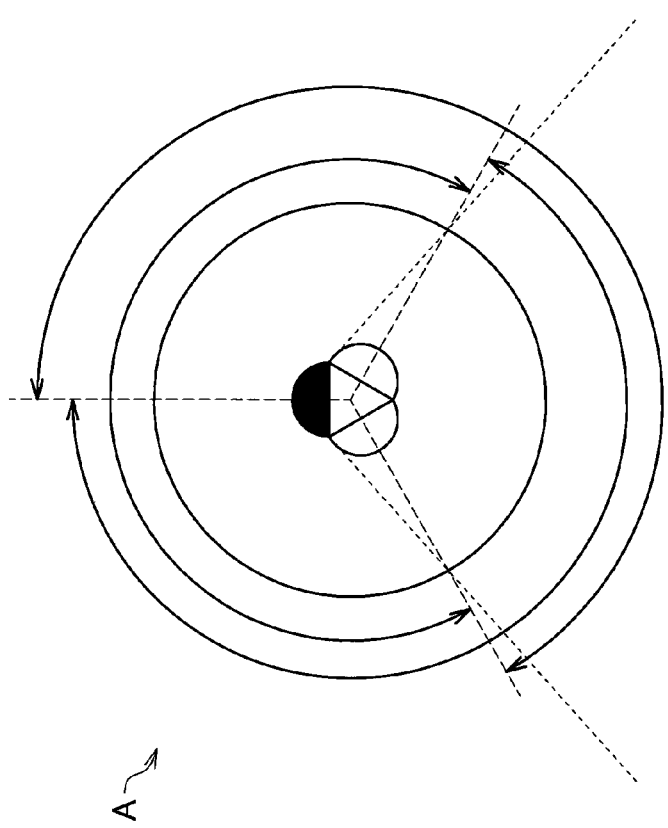

FIG. 20
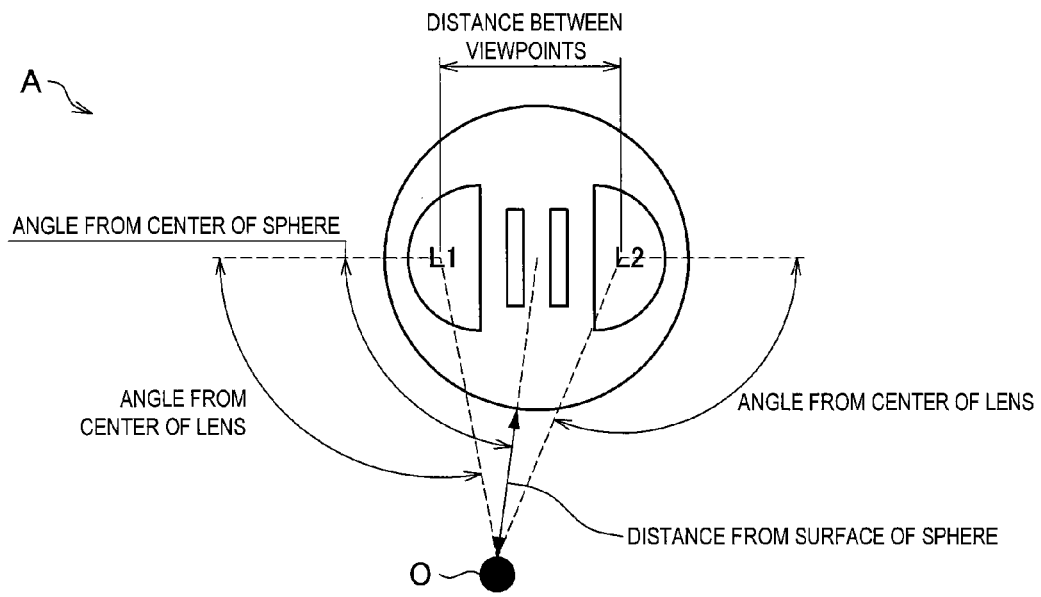
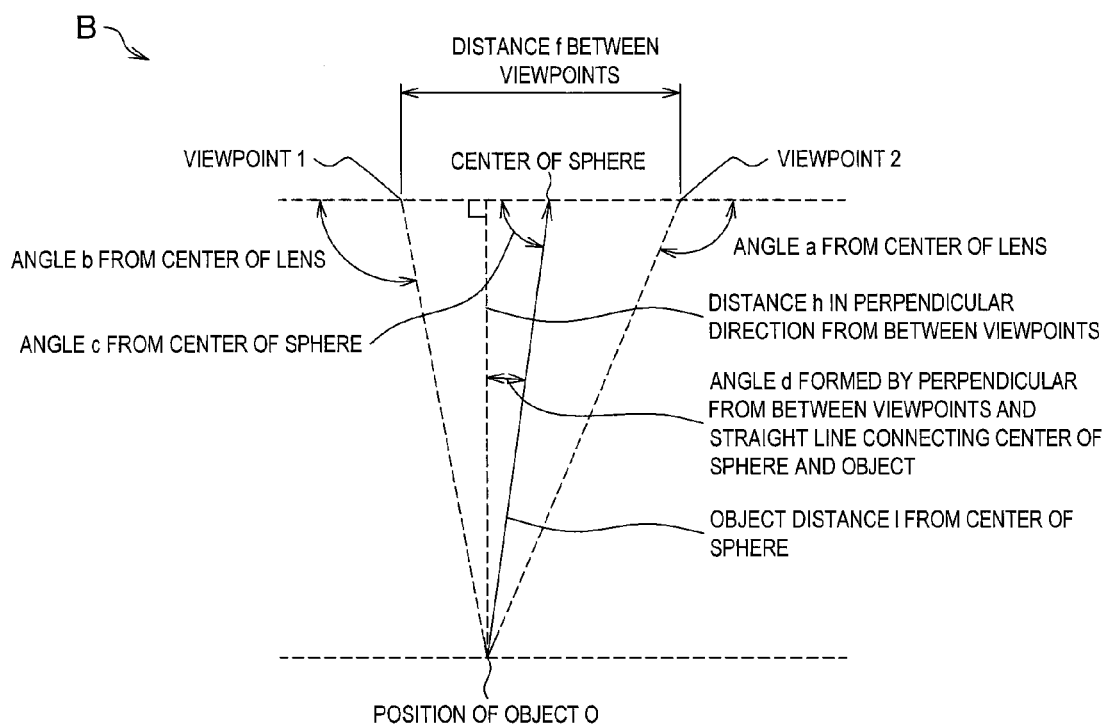

FIG. 29
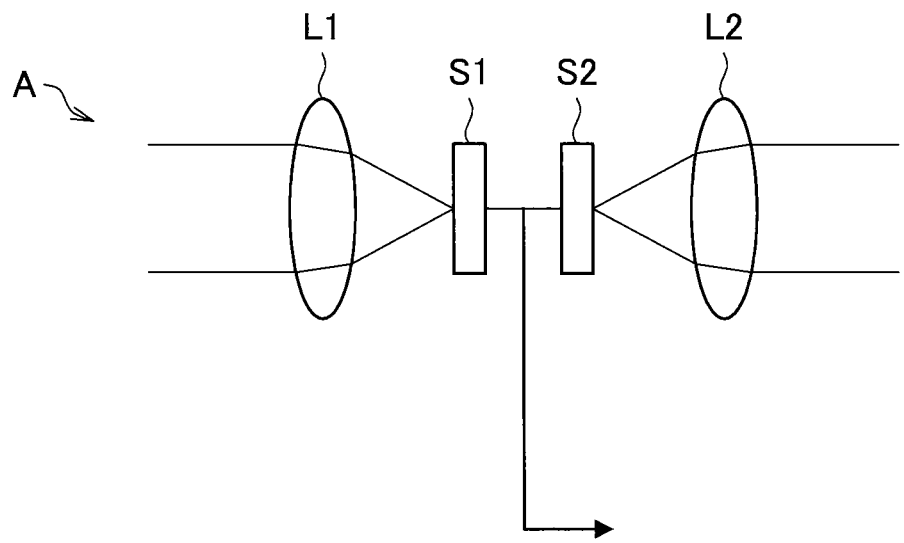
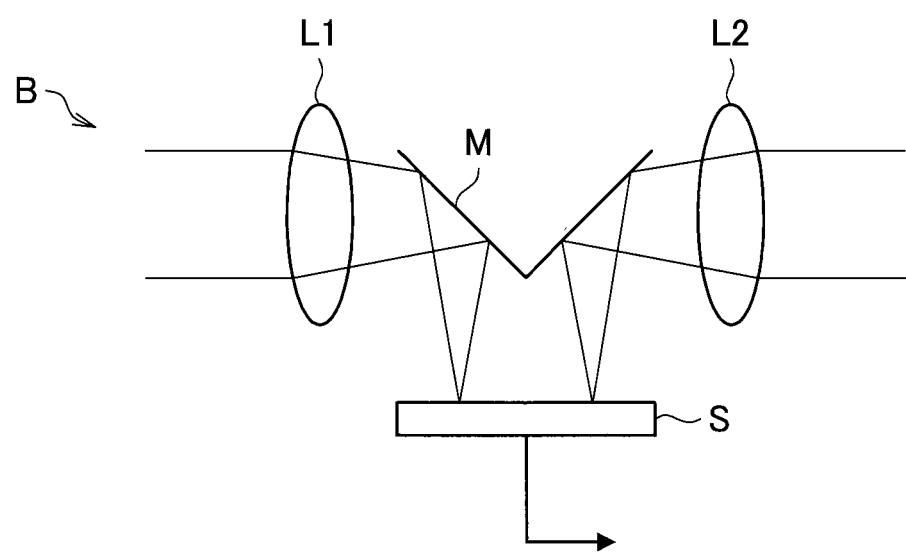

IMAGE PROCESSING APPARATUS, IMAGE PROCESSING METHOD, AND PROGRAM

CROSS REFERENCE TO RELATED APPLICATIONS

This application claims the benefit of Japanese Priority Patent Application JP 2014-021283 filed Feb. 6, 2014, the entire contents of which are incorporated herein by reference.

BACKGROUND

The present disclosure relates to an image processing apparatus, an image processing method, and a program.

Recent years have seen imaging devices (which will also be referred to as 'omnidirectional imaging devices' below) that include a plurality of optical units and use all the directions as their imaging ranges. Examples of techniques for the omnidirectional imaging devices include the technology described in JP 2013-025255A (US 2014/0132709A1).

SUMMARY

If a general planar display screen that is not omnidirectional displays captured images imaged by a plurality of optical units (including, for example, lenses and light receiving elements) of an omnidirectional imaging device, the display screen displays a part of regions which corresponds to a predetermined direction of an image in which the plurality of captured images have been combined. Some states of an object included in the composite border that is a border between the images to be combined may, however, lead to undesired situations such as "discontinuous images in the composite border of the combined images."

For example, the technology described in JP 2013-025255A (US 2014/0132709A1) can possibly relieve the discontinuity of images in a composite border because a plurality of optical units of an omnidirectional imaging device have the distances of their imaging viewpoints shortened. However, even the technology described in JP 2013-025255A (US 2014/0132709A1) is not capable of allowing a plurality of optical units of an omnidirectional imaging device to physically decreasing the distances of their imaging viewpoints to 0 (zero), which may still lead to undesired situations such as discontinuous images in a composite border.

The present disclosure provides a novel and improved image processing apparatus, image processing method, and program that can make more natural an image in which a plurality of captured images imaged by an imaging device that uses all the directions as its imaging range have been combined.

According to an embodiment of the present disclosure, there is provided an image processing apparatus including a movement amount deciding unit configured to decide a movement amount for moving a target object that is a movement target among objects included in a plurality of captured images imaged by an imaging device including optical units that have imaging ranges overlapping with each other in part on the basis of a distance from the imaging device to the target object and an angle from a reference line at a reference position of the imaging device to the target object in a manner that the plurality of captured images look like images imaged from the reference position, the imaging device using all directions as an imaging range, the plurality of captured images corresponding to the respective optical units.

According to another embodiment of the present disclosure, there is provided an image processing method to be executed by an image processing apparatus, the image processing method including deciding a movement amount for moving a target object that is a movement target among objects included in a plurality of captured images imaged by an imaging device including optical units that have imaging ranges overlapping with each other in part on the basis of a distance from the imaging device to the target object and an angle from a reference line at a reference position of the imaging device to the target object in a manner that the plurality of captured images look like images imaged from the reference position, the imaging device using all directions as an imaging range, the plurality of captured images corresponding to the respective optical units.

According to a still another embodiment of the present disclosure, there is provided a program for causing a computer to execute deciding a movement amount for moving a target object that is a movement target among objects included in a plurality of captured images imaged by an imaging device including optical units that have imaging ranges overlapping with each other in part on the basis of a distance from the imaging device to the target object and an angle from a reference line at a reference position of the imaging device to the target object in a manner that the plurality of captured images look like images imaged from the reference position, the imaging device using all directions as an imaging range, the plurality of captured images corresponding to the respective optical units.

According to one or more of embodiments of the present disclosure, it is possible to make more natural an image in which a plurality of captured images imaged by an imaging device that uses all the directions as its imaging range have been combined.

The above-mentioned advantageous effects are not necessarily limited thereto, but any other effects that are shown in the present specification or can be grasped from the present specification may also be attained in combination with or the above-mentioned advantageous effects or instead thereof.

BRIEF DESCRIPTION OF THE DRAWINGS

FIG. 6 is an explanatory diagram for describing the image processing method according to the present embodiment;

FIG. 15 is an explanatory diagram for describing the image processing method according to the present embodiment;

FIG. 20 is an explanatory diagram for describing an example of a process of the image processing method according to the present embodiment;

FIG. 29 is an explanatory diagram illustrating an example of a hardware configuration of an image processing apparatus according to the present embodiment.

DETAILED DESCRIPTION OF THE EMBODIMENT(S)

Figure 1:
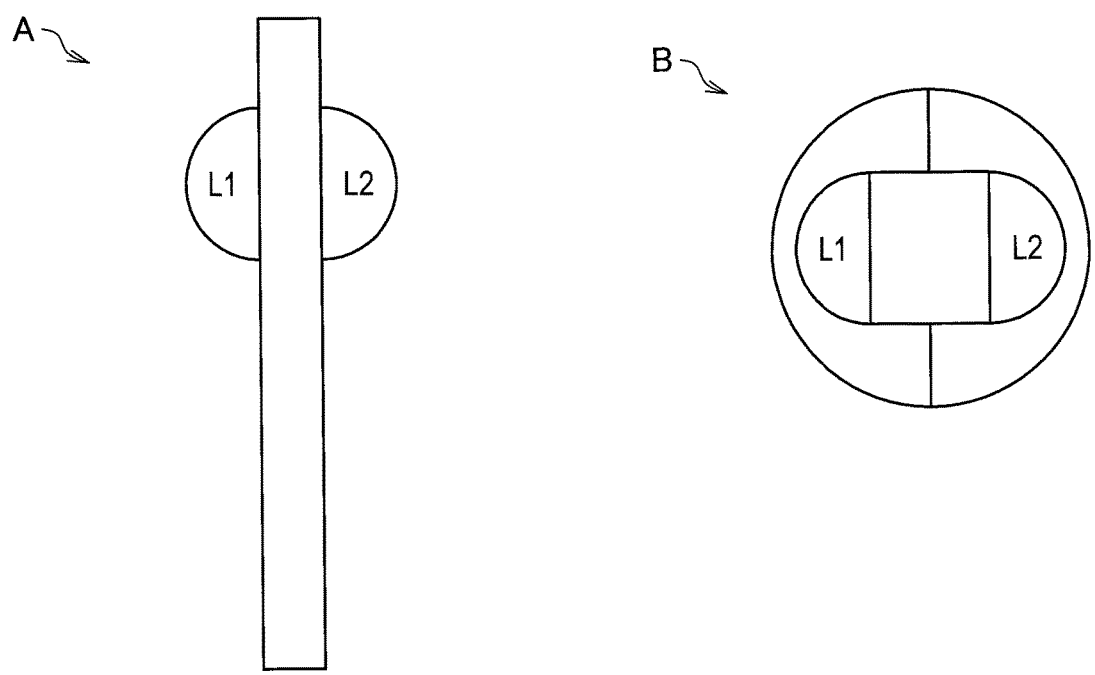
FIG. 1 is an explanatory diagram illustrating examples of omnidirectional imaging devices according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be now made in the following order.

1. Image Processing Method according to Present Embodiment
2. Image Processing Apparatus according to Present Embodiment
3. Program according to Present Embodiment (Image Processing Method According to Present Embodiment)

First of all, an image processing method according to the present embodiment will be described before the configuration of an image processing apparatus according to the present embodiment is described. The image processing method according to the present embodiment will be described below using, as an example, processes of the image processing method according to the present embodiment, the processes being performed by the image processing apparatus according to the present embodiment.

Example of Omnidirectional Imaging Device and Example of Captured Image Imaged by Omnidirectional Imaging Device First of all, the description will be made for an example of a captured image to be processed by the image processing apparatus according to the present embodiment, and an example of an omnidirectional imaging device that images the captured image.

FIG. 1 is an explanatory diagram illustrating examples of omnidirectional imaging devices according to the present embodiment. A of FIG. 1 illustrates an example of an omnidirectional imaging device having lenses L1 and L2 disposed on both sides of its rod-like housing, while B of FIG. 1 illustrates an example of an omnidirectional imaging device having lenses L1 and L2 disposed inside its spherical housing.

Furthermore, the omnidirectional imaging devices illustrated in FIG. 1 each include a light receiving element (not illustrated) that converts light received, for example, via the lenses L1 and L2 into an electrical signal. The light receiving element (not illustrated) serves as a so-called image sensor. Additionally, the light receiving element (not illustrated) may be provided to each of the lenses L1 and L2, or may also be shared by the lenses L1 and L2. For example, the lenses and the light receiving element (not illustrated) correspond to optical units in the omnidirectional imaging devices illustrated in FIG. 1. That is to say, FIG. 1 illustrates examples of omnidirectional imaging devices each including two optical units. The omnidirectional imaging devices according to the present embodiment do not necessarily have to include two optical units, but may also include three or more optical units. That is to say, the omnidirectional imaging devices according to the present embodiment are configured of a plurality of optical units.

An omnidirectional imaging device according to the present embodiment will be described below, for example, as the spherical imaging device illustrated in B of FIG. 1.

Figure 2:
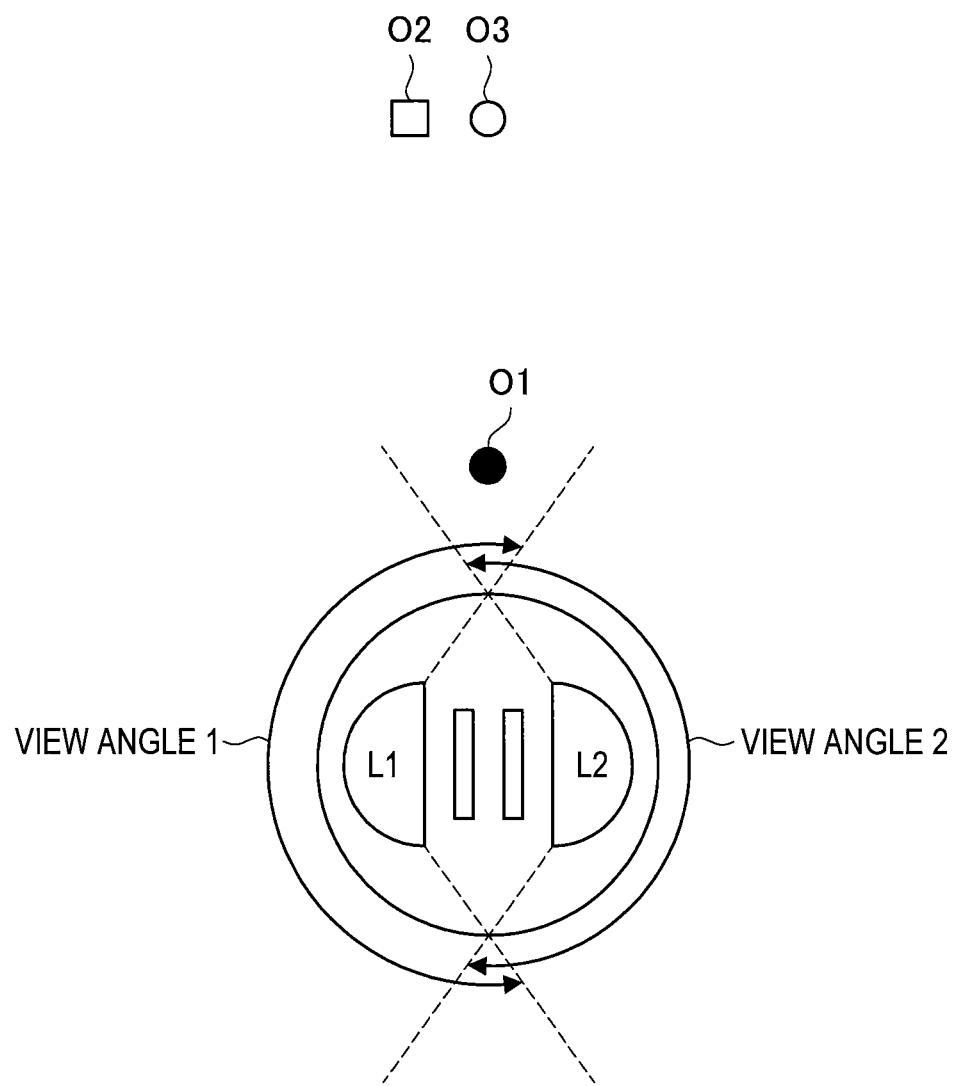
FIG. 2 is an explanatory diagram illustrating an example of a situation of imaging by an omnidirectional imaging device according to the present embodiment.

FIG. 2 is an explanatory diagram illustrating an example of a situation of imaging by an omnidirectional imaging device according to the present embodiment. An "view angle 1" illustrated in FIG. 2 indicates the imaging range of an optical unit including a lens L1, while an "view angle 2" illustrated in FIG. 2 indicates the imaging range of an optical unit including a lens L2. As illustrated in FIG. 2, some of the imaging range of the optical unit including the lens L1 overlaps with some of the imaging range of the optical unit including the lens L2.

FIG. 2 also illustrates an example in which three objects O1, O2 and O3 are within the imaging range. FIG. 2 illustrates the example, in which the object O1 is at a position nearer to the omnidirectional imaging device, and the objects O2 and O3 are at positions farther from the omnidirectional imaging device within the overlapping imaging range of the omnidirectional imaging device. Here, examples of objects according to the present embodiment include any objects including the animate such as humans and animals, and the inanimate such as buildings and vehicles.

Each position of the objects O2 and O3 farther from the omnidirectional imaging device in FIG. 2 will also be referred to as 'far point' below, while the position of the object O1 nearer to the omnidirectional imaging device in FIG. 2 will also be referred to as 'near point' below.

Figure 3:
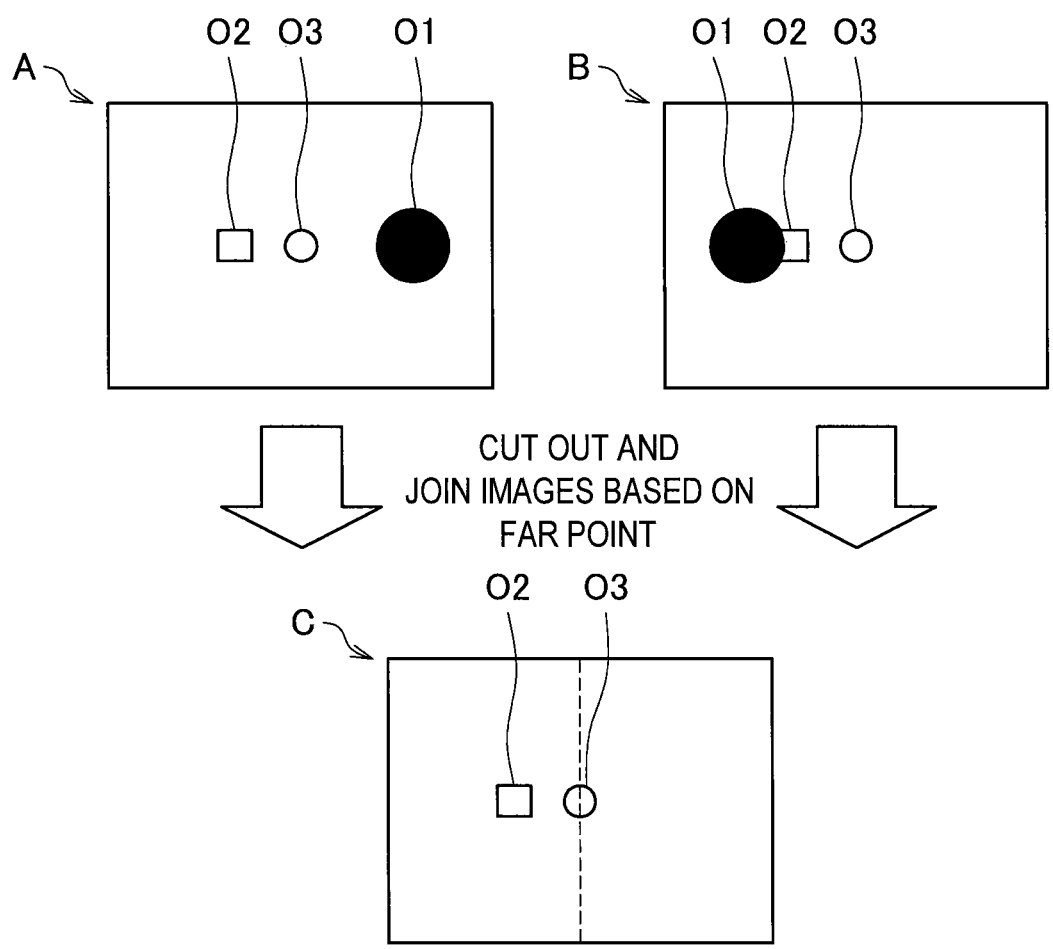
FIG. 3 is an explanatory diagram illustrating an example of captured images imaged by an omnidirectional imaging device according to the present embodiment.

FIG. 3 is an explanatory diagram illustrating an example of captured images imaged by an omnidirectional imaging device according to the present embodiment.

A of FIG. 3 illustrates an example of a captured image imaged by an optical unit including a lens L1 in the situation illustrated in FIG. 2, and illustrates the captured image, which corresponds to the direction corresponding to the overlapping imaging range illustrated in FIG. 2 among the captured images. B of FIG. 3 illustrates an example of a captured image imaged by an optical unit including a lens L2 in the situation illustrated in FIG. 2, and illustrates the captured image, which corresponds to the direction corresponding to the overlapping imaging range illustrated in FIG. 2 among the captured images.

C of FIG. 3 illustrates an example of an image in which the captured image illustrated in A of FIG. 3 and the captured image illustrated in B of FIG. 3 have been combined, and illustrates the example of the image, which has been combined on the basis of the far point in FIG. 2. C of FIG. 3 illustrates the image, which has been combined by cutting out images from the captured images on the basis of the far point, and joining the cut-out images. For example, when a plurality of captured images imaged by an omnidirectional imaging device are combined as illustrated in FIG. 3, the composite border is included in the captured images corresponding to the overlapping imaging range of an omnidirectional imaging device.

As illustrated in A and B of FIG. 3, the captured images (captured images including a composite border) corresponding to the overlapping imaging range of an omnidirectional imaging device are different from each other, although the lenses L1 and L2 have imaged the same object. Accordingly, a combination of the captured image illustrated in A of FIG. 3 with the captured image illustrated in B of FIG. 3 simply based on the far point makes the object O1 at the near point vanish from the combined image as illustrated in C of FIG. 3.

Additionally, the size of the object O2 is so small in the example of FIG. 3 that the object O1 at the near point vanishes from the combined image, but if the size of the object O1 at the near point is large, a part of the object O1 vanishes and the combined image becomes discontinuous. Phenomena in which a part of an object vanishes from a combined image and a combined image becomes discontinuous as illustrated in FIG. 3 occur not only when captured images are processed which have been imaged by the spherical imaging device illustrated in B of FIG. 1, but the phenomena may also occur when captured images are processed which have been imaged by an omnidirectional imaging device having any kind of shape such as the rod-like imaging device illustrated in A of FIG. 1.

Overview of Process of Image Processing Method According to Present Embodiment

Examples of methods for preventing phenomena in which a part of an object vanishes from a combined image as illustrated FIG. 3 and a combined image becomes discontinuous include a "method for moving an object that is a movement target among objects included in a plurality of captured images imaged by an omnidirectional imaging device in a manner that the captured images look like images imaged from a reference position of the imaging device." An object that is a movement target among objects included in captured images will also be referred to as 'target object' below.

Examples of reference positions according to the present embodiment include the "central position of the spherical imaging device illustrated in B of FIG. 1," the "position of the middle point of a segment connecting the central positions of lenses included in optical units (example of a reference position for two optical units)," a "given position inside a polygon that includes, as its apices, the central positions of lenses included in optical units (example of a reference position for three or more optical units)," and a "given position inside a pyramid that includes, as its apices, the central positions of lenses included in optical units (example of a reference position for four or more optical units)." A reference position according to the present embodiment may be a fixed position that has been set in advance, or may also be a variable position that can be varied by a user operation and the like.

It will also be referred to as 'viewpoint movement' below to "move a target object in a manner that a plurality of captured images imaged by an imaging device look like images imaged from a reference position." For example, it will also be referred to as 'X viewpoint' below for an imaging device to image an image from an X position, or to assume that an imaging device images an image from an X position. Examples of viewpoints according to the present embodiment include a "central viewpoint" meaning that an image is imaged from the central position of a spherical imaging device, and a "lens viewpoint" meaning that an image is imaged from a predetermined position of a lens included in an optical unit.

Figure 4:
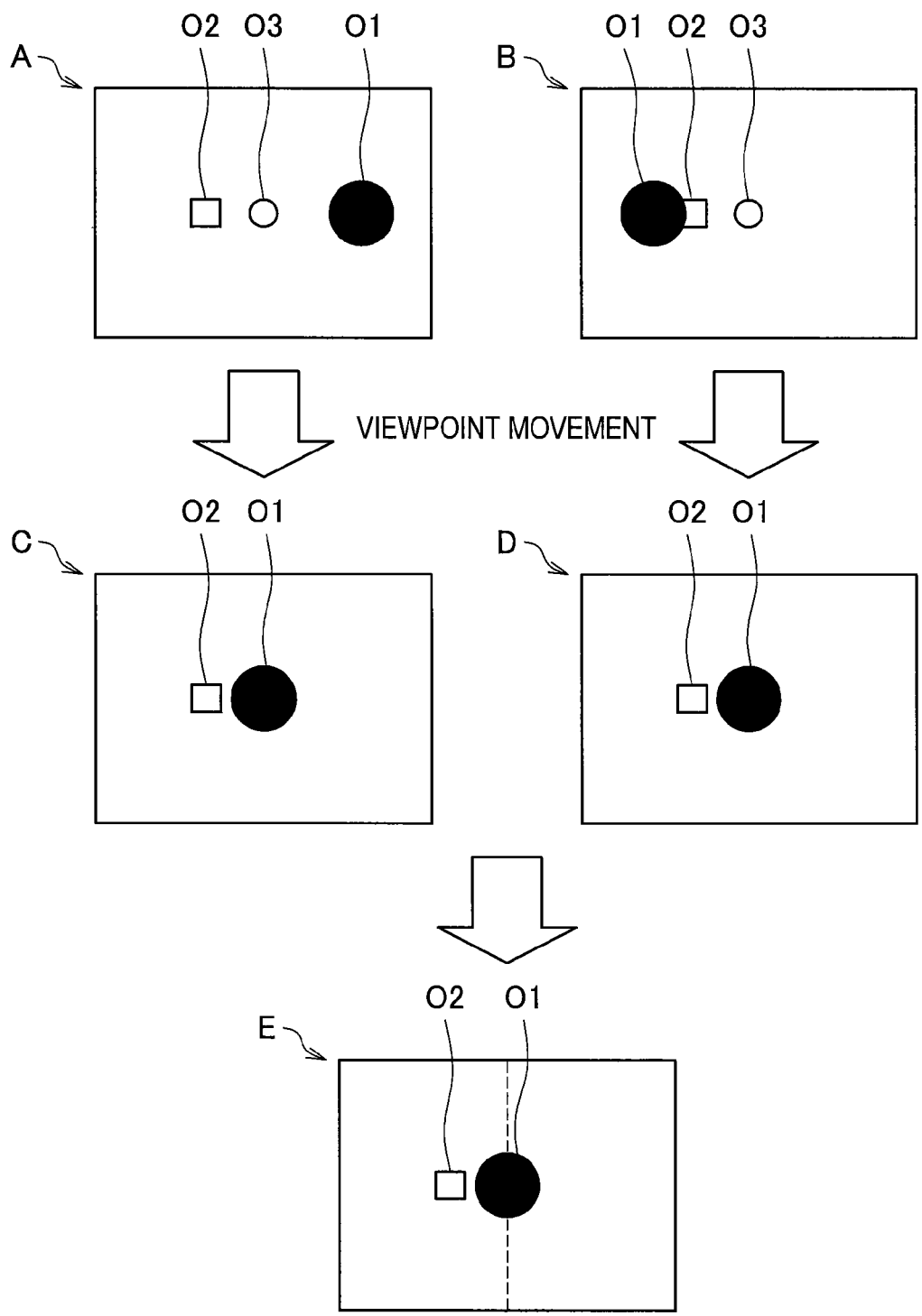
FIG. 4 is an explanatory diagram for describing an image processing method according to the present embodiment.

FIG. 4 is an explanatory diagram for describing the image processing method according to the present embodiment.

As in A of FIG. 3, A of FIG. 4 illustrates an example of a captured image imaged by an optical unit including a lens L1 in the situation illustrated in FIG. 2. As in B of FIG. 3, B of FIG. 4 illustrates an example of a captured image imaged by an optical unit including a lens L2 in the situation illustrated in FIG. 2.

C of FIG. 4 illustrates an example of a captured image in which viewpoint movement has been performed from the captured image illustrated in A of FIG. 4, while D of FIG. 4 illustrates an example of a captured image in which viewpoint movement has been performed from the captured image illustrated in B of FIG. 4. C and D of FIG. 4 each illustrate that viewpoint movement is performed in a manner that a reference position resides at the "position of the middle point of a segment connecting the central positions of lenses L1 and L2 included in optical units." The examples of C and D of FIG. 4 illustrate that an object O1 is moving to the center of each captured image as a target object.

Here, examples of the movement of a target object according to the present embodiment mean that a "part of a target object is cut out from a captured image, the cut-out part of a target object is combined into the position of a movement destination, and a captured image imaged by another optical unit is interpolated into the cut-out part." The movement of a target object according to the present embodiment is not limited thereto, but may exclude "interpolating a captured image imaged by another optical unit into a cut-out part."

E of FIG. 4 illustrates an example of an image in which the captured image illustrated in C of FIG. 4 and the captured image illustrated in D of FIG. 4 have been combined, and illustrates the image, in which images cut out from the captured image illustrated in C of FIG. 4 and the captured image illustrated in D of FIG. 4 have been joined and combined.

Combination after a target object is moved through the viewpoint movement as illustrated in C and D of FIG. 4 can prevent phenomena in which an object vanishes and a combined image becomes discontinuous, for example, and can offer a more natural image that looks like an image imaged from a reference position.

Accordingly, the use of a "method for moving a target object in a manner that a plurality of captured images imaged by an omnidirectional imaging device look like images imaged from a reference position of the imaging device" can make more natural an image in which the plurality of captured images imaged by an imaging device that uses all the directions as its imaging range have been combined.

Figure 5:
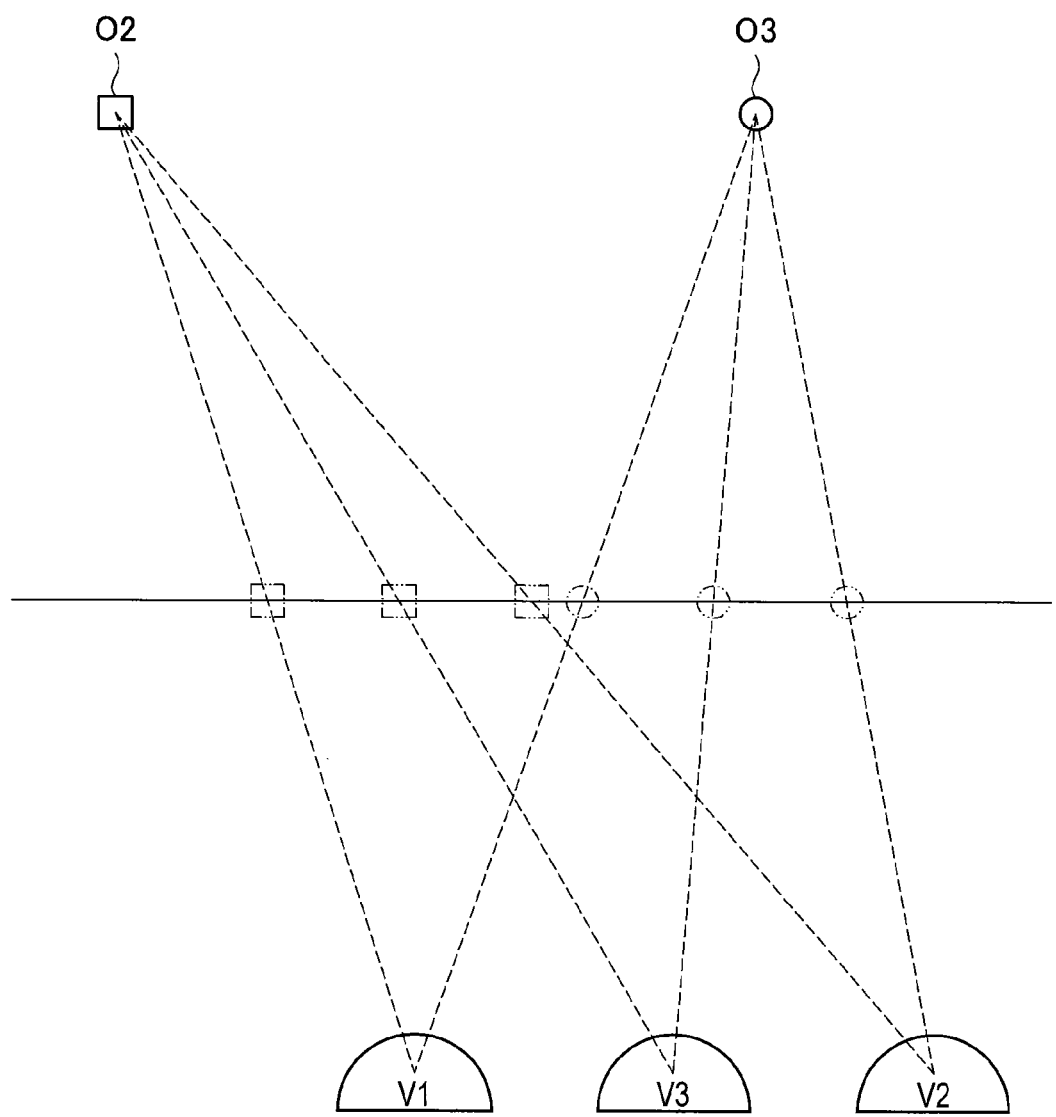
FIG. 5 is an explanatory diagram for describing the image processing method according to the present embodiment.

FIG. 5 is an explanatory diagram for describing the image processing method according to the present embodiment, and illustrates an example in which viewpoint movement is performed for an imaging device that images stereo images (3D images), using a comparative example in which viewpoint movement is performed for an omnidirectional imaging device. "V1" and "V2" illustrated in FIG. 5 indicate a viewpoint position for generating an image for a left eye included in a stereo image, and a viewpoint position for generating an image for a right eye included in the stereo image, respectively. Additionally, "V3" illustrated in FIG. 5 indicates a viewpoint position that is newly generated, which is the intermediate position between "V1" and "V2" illustrated in FIG. 5. That is to say, "V3" indicates a viewpoint position that is used when an intermediate viewpoint is generated.

When viewpoint movement is performed for an imaging device that images stereo images to perform imaging, the movement of a target object to the intermediate point allows for the creation of a central viewpoint as represented by "V3" in FIG. 5. Accordingly, if the viewpoint movement for an imaging device that images stereo images brings the object O2 and the object O3 from a viewpoint position in the same distance, the movement amount of a target object corresponding to "V1" is equal to the movement amount of a target object corresponding to "V2."

FIG. 6 is an explanatory diagram for describing the image processing method according to the present embodiment. FIG. 6 illustrates an example of a relationship among a "distance from the surface of a spherical imaging device," the "angle from the central position (example of a reference position) of the spherical imaging device illustrated in B of FIG. 1 to an object O," and the "angle from the central position (example of a position corresponding to an optical unit) of a lens included in an optical unit to the object O."

The "distance from the surface of a spherical imaging device" according to the present embodiment means, for example, the distance between the surface of a spherical imaging device and the surface of an object on a segment connecting a predetermined position of the spherical imaging device to a predetermined position of the object. Examples of the predetermined position of the spherical imaging device according to the present embodiment include the central position of a spherical imaging device and a position corresponding to a lens included in an optical unit. In addition, examples of the predetermined position of an object according to the present embodiment include the central position of an object and the position at the center of gravity on an object.

FIG. 6 uses the distance between the surface of a spherical imaging device and the surface of an object on a segment connecting the central position of the spherical imaging device to the central position of the object as the 'distance from the surface of a spherical imaging device.'

Meanwhile, FIG. 6 refers to the "angle from the central position of a spherical imaging device to an object O" as 'angle from the center of a sphere,' and refers to the "angle from the central position of a lens included in an optical unit to an object O" as 'imaging viewpoint angle.' As illustrated in A of FIG. 6, the "angle from the center of a sphere" illustrated in FIG. 6 is the angle between the direction from the central position of an imaging device to the central position of a lens and the direction from the central position of the imaging device to an object O. In addition, as illustrated in A of FIG. 6, the "imaging viewpoint angle" illustrated in FIG. 6 is the angle between the direction from the central position of the imaging device to the central position of the lens and the direction from the central position of the lens to the object O.

As illustrated in B of FIG. 6, an object farther from the lens central position and nearer to the surface of the spherical imaging device has a greater difference between the "angle from the center of the sphere" and the "imaging viewpoint angle."

Figure 7:
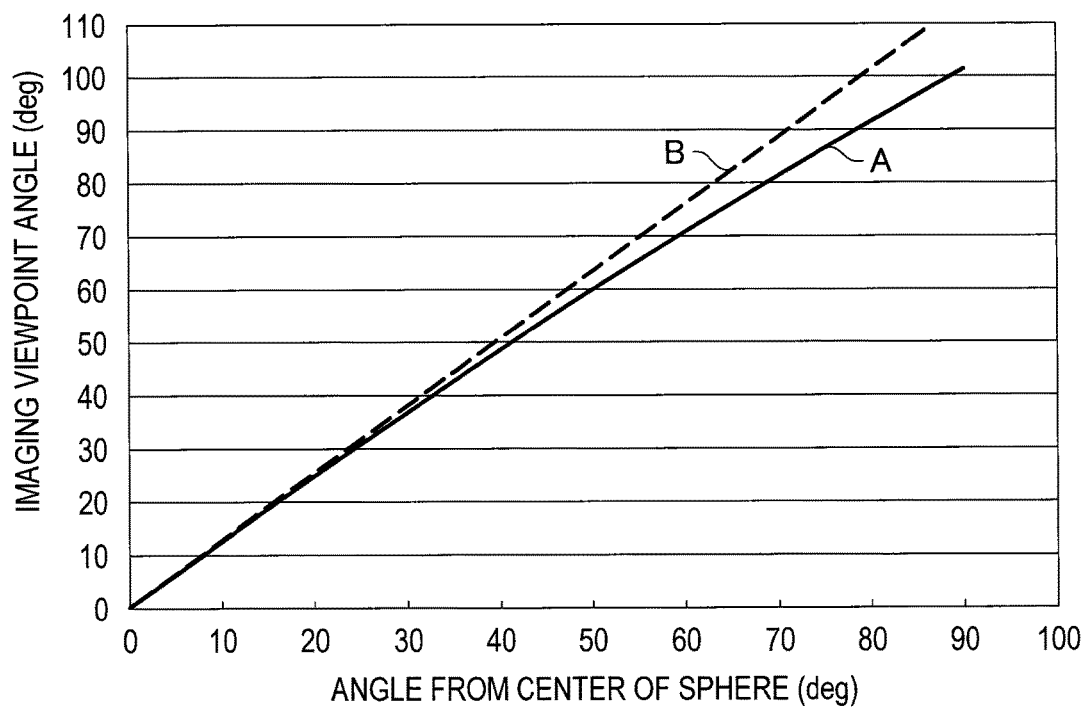
FIG. 7 is an explanatory diagram for describing the image processing method according to the present embodiment.

FIG. 7 is an explanatory diagram for describing the image processing method according to the present embodiment. FIG. 7 illustrates an example of a relationship between the "angle from the center of a sphere" and the "imaging viewpoint angle", keeping the distance between the central position of a spherical imaging device and an object O constant in the situation illustrated in A of FIG. 6. A of FIG. 7 illustrates an example of the relationship between the "angle from the center of a sphere" and the "imaging viewpoint angle." Meanwhile, B of FIG. 7 illustrates a relationship between the "angle from the center of a sphere" and the "imaging viewpoint angle" at a ratio near 0 degrees between the "angle from the center of the sphere" and the "imaging viewpoint angle," representing the relationship between the "angle from the center of the sphere" and the "imaging viewpoint angle" in a straight line.

As illustrated in FIG. 7, a relationship between the "angle from the center of a sphere" and the "imaging viewpoint angle" has a greater difference from the relationship obtained at a ratio near 0 degrees with an increase in the "angle from the center of the sphere" and the "imaging viewpoint angle". The relationship between the "angle from the center of the sphere" and the "imaging viewpoint angle" thus deviates more from the straight line illustrated in B of FIG. 7 with an increase in the "angle from the center of the sphere" and the "imaging viewpoint angle." That is to say, as understood from FIG. 7, even though the distance between the central position of the spherical imaging device and the object O is constant, a different "angle from the center of the sphere" moves a target object in a different movement amount in the situation illustrated in A of FIG. 6.

Accordingly, when a combined image is desired to be made more natural in a "method for moving a target object in a manner that a plurality of captured images imaged by an omnidirectional imaging device look like images imaged from a reference position of an imaging device," it is necessary to move a target object in a movement amount different from a movement amount for the "viewpoint movement for an imaging device that images stereo images to perform imaging" described with reference to FIG. 5.

The image processing apparatus according to the present embodiment then decides a movement amount for moving a target object as a process of the image processing method according to the present embodiment in a manner that a plurality of captured images imaged, for example, by an omnidirectional imaging device according to the present embodiment look like images imaged from a reference position of the imaging device, the plurality of captured images corresponding to respective optical units. The process of deciding a movement amount for moving a target object according to the present embodiment will be referred to as 'movement amount deciding process' below.

A plurality of captured images are combined in each of which a target object has been moved on the basis of a movement amount decided by an image processing apparatus according to the present embodiment in a movement amount deciding process, so that it is possible to make more natural an image in which the plurality of captured images imaged by an omnidirectional imaging device (imaging device using all the directions as its imaging range) according to the present embodiment have been combined. The more natural combined image is used to generate an image corresponding to a direction that has been set, allowing the generated image to be more natural. The image that is generated from the combined image and corresponds to the set direction will be referred to as 'viewpoint image' below.

For example, an image processing apparatus according to the present embodiment can perform a "process of moving a target object included in captured images on the basis of a decided movement amount" (which will be referred to as 'movement process' below) according to the present embodiment. That is to say, a process of the image processing method according to the present embodiment may include a movement process. Additionally, the movement process according to the present embodiment may also be performed, for example, by an external apparatus of the image processing apparatus according to the present embodiment.

In addition, examples of the "process of combining a plurality of captured images in each of which a target object has been moved" according to the present embodiment include a spherical projection process of performing spherical projection. The "process of combining a plurality of captured images in each of which a target object has been moved" according to the present embodiment will be referred to as 'spherical projection process' below. For example, the image processing apparatus according to the present embodiment performs the spherical projection process according to the present embodiment. That is to say, a process of the image processing method according to the present embodiment may include the spherical projection process. Additionally, the spherical projection process according to the present embodiment may also be performed, for example, by an external apparatus of the image processing apparatus according to the present embodiment.

Meanwhile, for example, the image processing apparatus according to the present embodiment can perform a "process of generating a viewpoint image" (which will be referred to as 'viewpoint image generating process' below) according to the present embodiment. That is to say, a process of the image processing method according to the present embodiment may include the viewpoint image generating process. Additionally, the viewpoint image generating process according to the present embodiment may also be performed, for example, by an external apparatus of the image processing apparatus according to the present embodiment.

A process of the image processing method according to the present embodiment will be more specifically described below. An example of a process of the image processing method according to the present embodiment will be described below chiefly using an example in which an image processing apparatus according to the present embodiment performs a movement amount deciding process, a movement process, a spherical projection process, and a viewpoint image generating process as the processes of the image processing method according to the present embodiment.

Example of Processes of Image Processing Method According to Present Embodiment

[3-1] Regarding Viewpoint Movement Conducted in Process of Image Processing Method According to Present Embodiment Viewpoint movement conducted in a process of the image processing method according to the present embodiment will be described before a specific example of a process of the image processing method according to the present embodiment is described.

Figure 8:
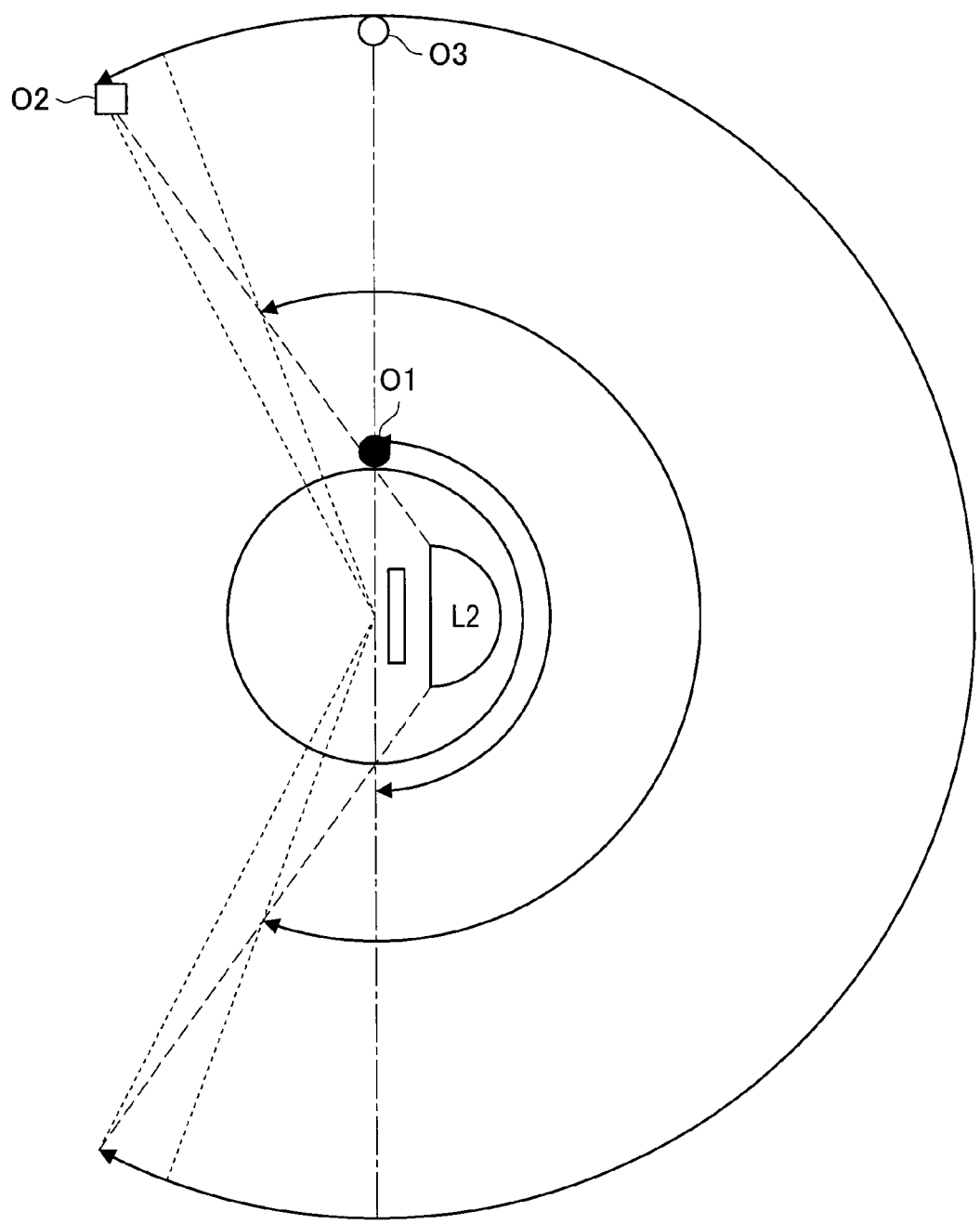
FIG. 8 is an explanatory diagram for describing the image processing method according to the present embodiment.

FIG. 8 is an explanatory diagram for describing the image processing method according to the present embodiment, and illustrates an example of an imaging range based on the distance from the surface of a spherical imaging device in a situation similar to the situation described in FIG. 2.

FIG. 8 illustrates that an imaging range based on the position corresponding to a lens L2 is constant depending on the distance from the position to an object. To the contrary, an imaging range based on the central position of a spherical imaging device as a reference position grows narrower with a decrease in the distance from the position to an object, and grows wider with an increase in the distance from the position to the object.

That is to say, for example, when two optical units made of an optical unit including a lens L1 and an optical unit including a lens L2 perform imaging, the overlapping imaging ranges grow wider with an increase in the distance from the central position (example of the reference position) of a spherical imaging device to an object, and grow narrower with a decrease in the distance from the central position of the spherical imaging device to the object.

FIG. 8 illustrates that a positional relationship between a far point and a near point based on the position corresponding to the lens L2 is different from a positional relationship between a far point and a near point based on the central position of the spherical imaging device. To give a specific example, the viewpoint based on the position corresponding to the lens L2 in the example illustrated in FIG. 8 shows an object O1 and an object O2 in the same direction, while the viewpoint based on the central position of the spherical imaging device shows the object O1 and an object O3 in the same direction.

Additionally, the spherical imaging device according to the present embodiment includes an optical unit that is, for example, capable of bringing an object into focus from the surface part of the sphere, so that the spherical imaging device according to the present embodiment can images an object near the surface of the housing like the object O1 illustrated in FIG. 8. The spherical imaging device according to the present embodiment can image an object near the surface of the housing, which hereby allows the spherical imaging device according to the present embodiment to come very close to an object without making the object conscious of the imaging device or making a user who uses the spherical imaging device according to the present embodiment pay attention to the direction of the imaging device.

Figure 9:
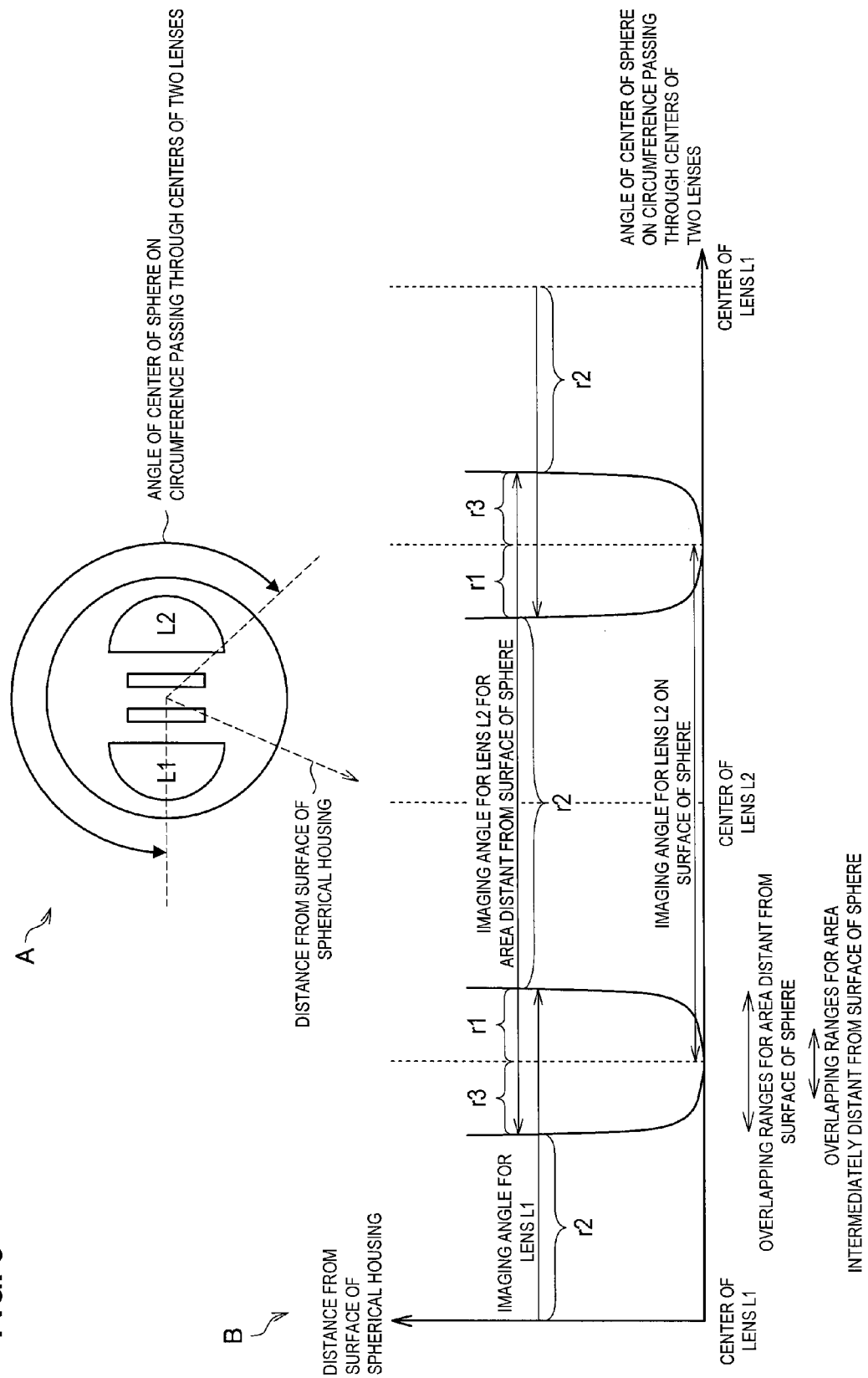
FIG. 9 is an explanatory diagram for describing the image processing method according to the present embodiment.

FIG. 9 is an explanatory diagram for describing the image processing method according to the present embodiment, and illustrates overlapping parts of the imaging range of a spherical imaging device (A illustrated in FIG. 9) from the central viewpoint, the spherical imaging device including two optical units made of an optical unit including a lens L1 and an optical unit including a lens L2. Additionally, regions in captured images imaged at "r1," "r2," and "r3" illustrated in FIG. 9 correspond to regions "R1," "R2," and "R3" illustrated in FIGS. 10, 11, 13, and 21 discussed below, respectively.

As illustrated in FIG. 9, the farther the distance from the surface of the spherical imaging device to an object is, the more the imaging range of the optical unit including the lens L1 overlaps with the imaging range of the optical unit including the lens L2.

Figure 10:
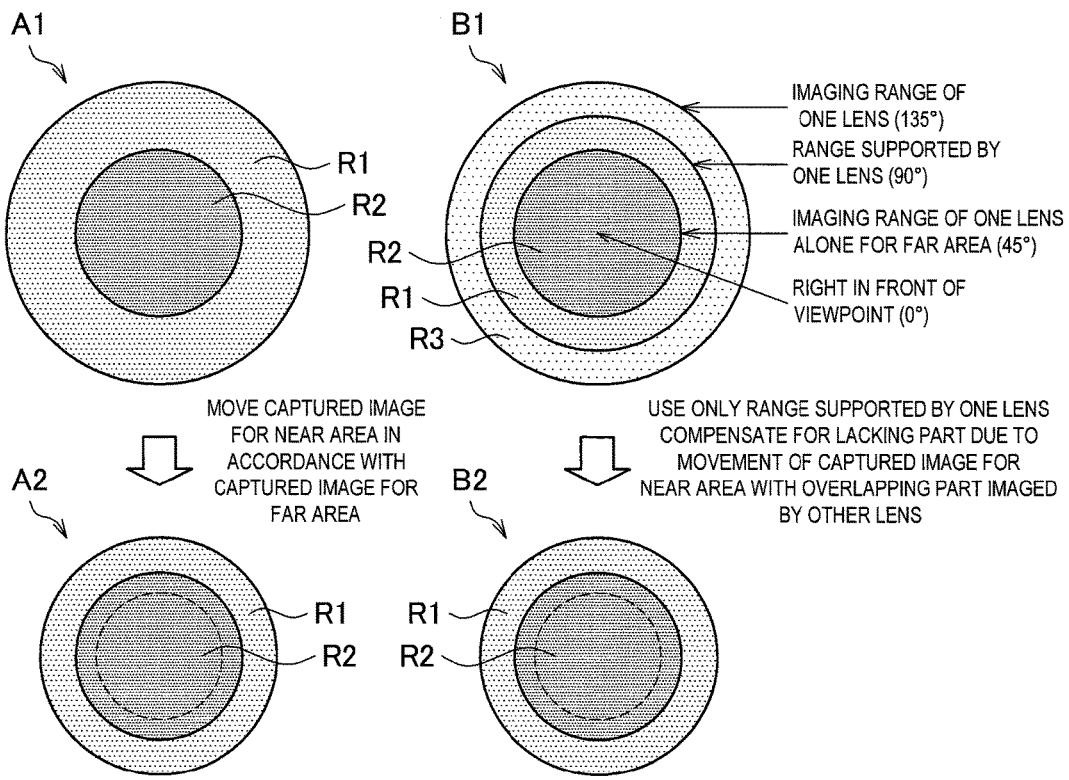
FIG. 10 is an explanatory diagram for describing the image processing method according to the present embodiment.

FIG. 10 is an explanatory diagram for describing the image processing method according to the present embodiment, and illustrates an example of the movement of an object. FIG. 10 illustrates the example of the movement of an object, in which two captured images imaged by a spherical imaging device allow all the directions to be used as the imaging range, the spherical imaging device including two optical units made of an optical unit including a lens L1 and an optical unit including a lens L2.

A1 of FIG. 10 is a schematic view of a captured image imaged in an area near (near point) a reference position such as the center of the lens included in one of the optical units, while B1 of FIG. 10 is a schematic view of a captured image imaged in an area far (far point) from a reference position such as the center of the lens included in one of the optical units. Meanwhile, A2 and B2 of FIG. 10 each illustrate an example of an image in which the captured image illustrated in A1 of FIG. 10 has been moved in accordance with the captured image illustrated in B1 of FIG. 10.

"R1" illustrated in FIG. 10 corresponds to a region in the captured image imaged at "r1" illustrated in FIG. 9, while "R2" illustrated in FIG. 10 corresponds to a region in the captured image imaged at "r2" illustrated in FIG. 9. Meanwhile, "R3" illustrated in FIG. 10 corresponds to a region in the captured image imaged at "r3" illustrated in FIG. 9.

As illustrated by "R2" of FIG. 10 and "r2" of FIG. 9, the region indicated by "R2" of FIG. 10 indicates a region corresponding to an overlapping imaging range within which images are not imaged even at the far point in an overlapping manner. It is difficult to distinguish whether the region indicates a region in a captured image imaged in an area near (near point) a reference position such as the center of a lens or a region in a captured image imaged in an area far (far point) from a reference point such as the center of a lens. Accordingly, as illustrated by A2 and B2 of FIG. 10, the region indicated by "R2" of FIG. 10 remains unchanged.

The region indicated by "R2" of FIG. 10 may be enlarged or reduced, keeping a positional relationship between a region in a captured image imaged in an area near (near point) a reference position such as the center of a lens and a region in a captured image in which an object in an area near the intersection of the central axis of the lens and an image sensor has been imaged (object is shown at the center). For example, a dashed line in R2 of FIG. 10 illustrates an example in which reduction is performed.

Reduction as illustrated by R2 of FIG. 10 in a dashed line brings about an effect that a viewpoint feels farther in a pseudo manner, but the effect is merely a pseudo effect because the front-to-back relationship does not change. The effect is a pseudo one, but users rarely feel something strange about images because an area far (far point) from a reference position such as the center of a lens causes a small disparity.

For the overlapping parts other than the region indicated by "R2" of FIG. 10, a captured image imaged in an area near (near point) a reference position such as the center of a lens is moved in the direction of the central position (example of the reference position) of a spherical imaging device in accordance with a captured image imaged in an area far (far point) from a reference position such as the center of a lens.

Since it would not be originally possible to image the hemisphere viewed from the central position of a spherical imaging device in an area near (near point) a reference position such as the center of a lens unless an image is imaged within a range larger than the hemisphere, the region indicated by "R1" is larger in A1 of FIG. 10 than the region indicated by "R1" in B1 of FIG. 10. Accordingly, as illustrated in A2 of FIG. 10, the region indicated by "R1" in a captured image imaged in an area near (near point) a reference position such as the center of a lens is moved in the direction of the central position of the spherical imaging device in the example of FIG. 10. Although the movement in the captured image imaged in an area near (near point) a reference position such as the center of a lens causes a hidden lacking part in a captured image imaged in an area far (far point) from a reference point such as the center of a lens, interpolation is possible because the lacking part is imaged by the lens included in the other optical unit in an overlapping manner.

A captured image imaged in an area far (far point) from a reference position such as the center of a lens has some part imaged in an overlapping manner like the region indicated by "R3" of FIG. 10. The region indicated by "R3" of FIG. 10, which is a part imaged in an overlapping manner, is thus used for interpolation of a captured image imaged by the lens included in the other optical unit, and then deleted as illustrated in B2 of FIG. 10.

Figure 11:
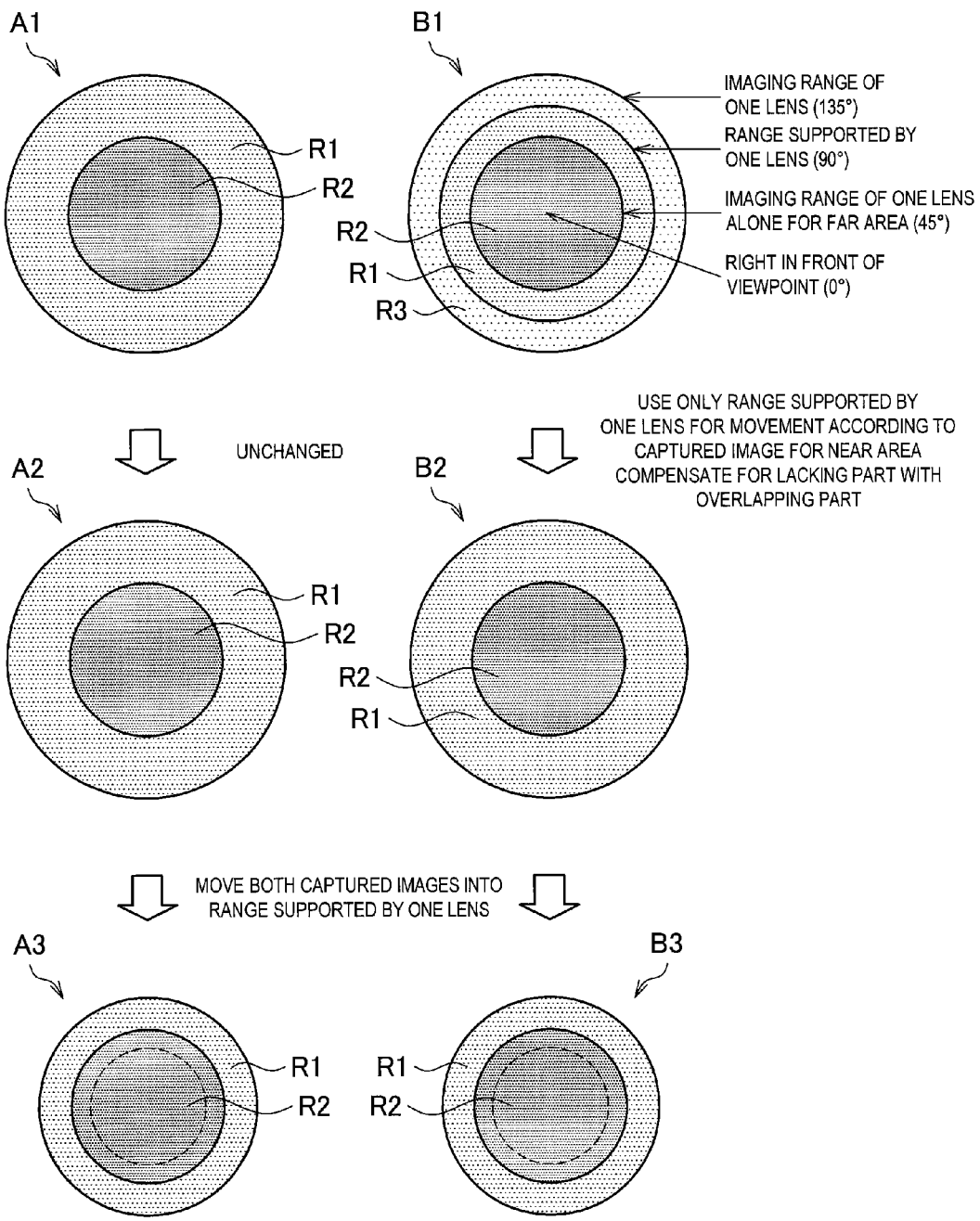
FIG. 11 is an explanatory diagram for describing the image processing method according to the present embodiment.

FIG. 11 is an explanatory diagram for describing the image processing method according to the present embodiment, and illustrates another example of the movement of an object. As in FIG. 10, FIG. 11 illustrates an example of the movement of an object in which two captured images imaged by a spherical imaging device allow all the directions to be used as the imaging range, the spherical imaging device including two optical units made of an optical unit including a lens L1 and an optical unit including a lens L2.

A1 of FIG. 11 is a schematic view of a captured image imaged in an area near (near point) a reference position such as the center of a lens included in one of the optical units, while B1 of FIG. 11 is a schematic view of a captured image imaged in an area far (far point) from a reference position such as the center of a lens included in one of the optical units. A2 and B2 of FIG. 11 each illustrate an example of an image in which the captured image illustrated in B1 of FIG. 11 has been moved in accordance with the captured image illustrated in A1 of FIG. 11, while A3 and B3 of FIG. 11 each illustrate another example of an image in which the captured image illustrated in B1 of FIG. 11 has been moved in accordance with the captured image illustrated in A1 of FIG. 11.

"R1" illustrated in FIG. 11 corresponds to a region in a captured image imaged at "r1" illustrated in FIG. 9, while "R2" illustrated in FIG. 11 corresponds to a region in a captured image imaged at "r2" illustrated in FIG. 9. Meanwhile, "R3" illustrated in FIG. 11 corresponds to a region in a captured image imaged at "r3" illustrated in FIG. 9.

As illustrated by "R2" of FIG. 11 and "r2" of FIG. 9, the region indicated by "R2" of FIG. 11 indicates a region corresponding to an imaging range within which images are not imaged in an overlapping manner. It is difficult to distinguish whether the region indicates a region in a captured image imaged in an area near (near point) a reference position such as the center of a lens or a region in a captured image imaged in an area far (far point) from a reference point such as the center of a lens. Accordingly, as illustrated in A2 and B2 of FIG. 11, the region indicated by "R2" of FIG. 10 remains unchanged.

The region indicated by "R2" of FIG. 11 may be enlarged or reduced, keeping a positional relationship between a region in a captured image imaged in an area near (near point) a reference position such as the center of a lens and a region in a captured image in which an object in an area near the intersection of the central axis of the lens and an image sensor is imaged (object is shown at the center). For example, the dashed lines in "R2" of A3 and B3 of FIG. 11 illustrate an example in which reduction is performed.

Reduction as illustrated by the dashed lines in "R2" of A3 and B3 of FIG. 11 bring about an effect that a viewpoint feels farther in a pseudo manner, but the effect is merely a pseudo effect because the front-to-back relationship does not change. The effect is a pseudo one, but users rarely feel something strange about images because an area far (far point) from a reference position such as the center of a lens causes a small disparity.

As illustrated in A2 and B2 of FIG. 11, for the region indicated by "R1" in a captured image imaged in an area near (near point) a reference position such as the center of a lens, a captured image imaged in an area far (far point) from a reference position such as the center of a lens is moved in the circumferential direction on the basis of the area near (near point) the reference position such as the center of a lens in the example of FIG. 11. In addition, the captured image imaged in the area far (far point) from the reference position such as the center of a lens has a lacking part through the movement, but interpolation of the lacking part is possible because the lens included in the other optical unit images the lacking part in an overlapping manner.

A captured image imaged in an area far (far point) from a reference position such as the center of a lens has a part imaged in an overlapping manner like the region represented by "R3" of FIG. 11. The region indicated by "R3" of FIG. 11, which is a part imaged in an overlapping manner, is thus used for interpolation of a captured image imaged by the lens included in the other optical unit, and then deleted as illustrated in B2 of FIG. 11.

For example, as illustrated in A3 and B3 of FIG. 11, it is possible to move both an image illustrated in A2 of FIG. 11 and corresponding to an area near (near point) a reference position such as the center of a lens and an image illustrated in B2 of FIG. 11 and corresponding to an area far (far point) from a reference position such as the center of a lens. The examples in A3 and B3 of FIG. 11 illustrate that the image illustrated in A2 of FIG. 11 and the image illustrated in B2 of FIG. 11 are moved in a manner that the images fall within the hemisphere.

A process of the image processing method according to the present embodiment causes, for example, the movement as illustrated in FIGS. 10 and 11, so that the viewpoint movement can be conducted.

Figure 12:
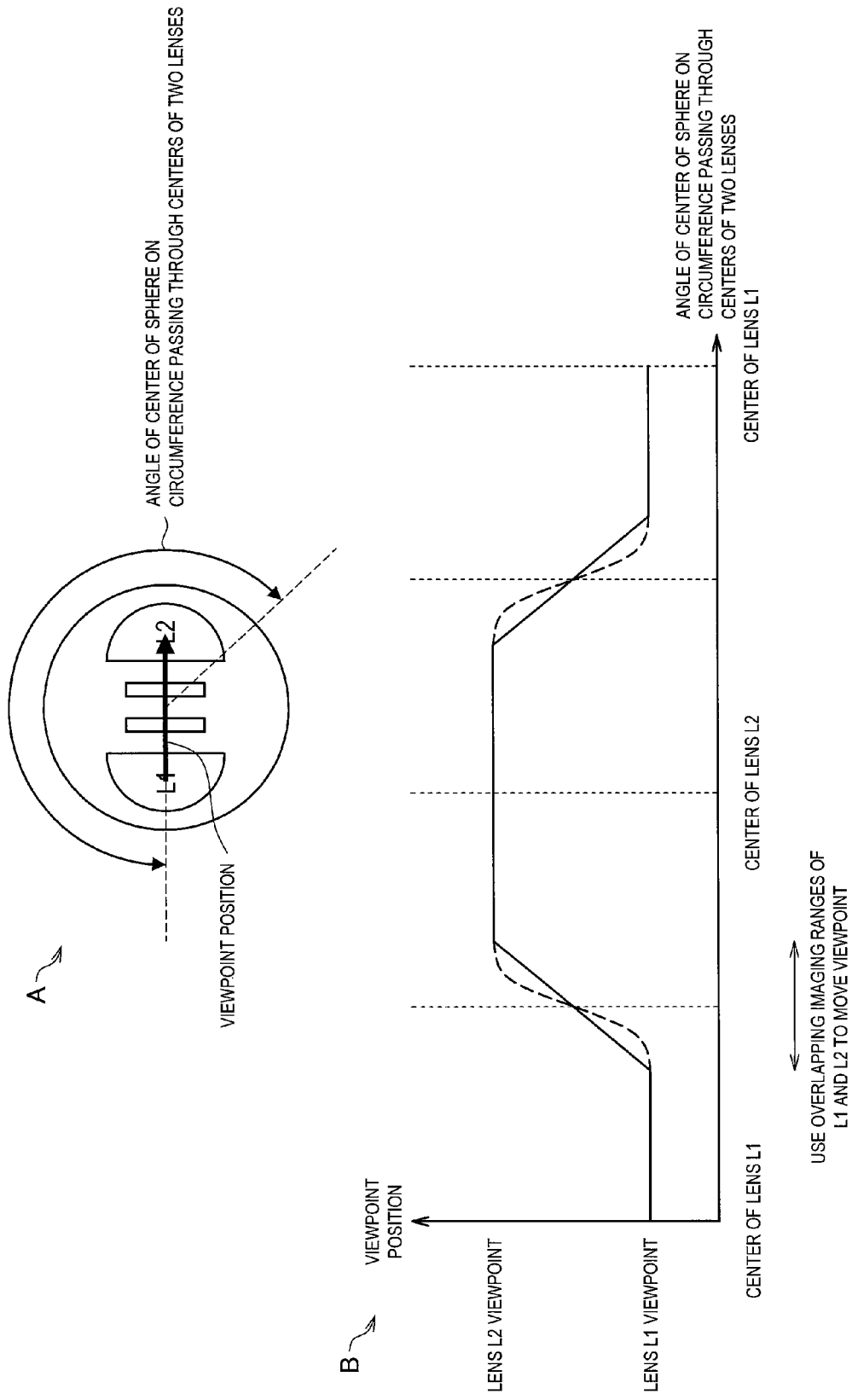
FIG. 12 is an explanatory diagram for describing the image processing method according to the present embodiment.

FIG. 12 is an explanatory diagram for describing the image processing method according to the present embodiment, and illustrates an example of viewpoint movement. FIG. 12 illustrates the example of viewpoint movement, which is based on two captured images imaged by a spherical imaging device including two optical units made of an optical unit including a lens L1 and an optical unit including a lens L2.

The viewpoint movement according to the present embodiment may be performed as illustrated in a solid line in B of FIG. 12, or may also be performed as illustrated in a dashed line in B of FIG. 12 in a manner that the inclination is continuous.

Figure 13:
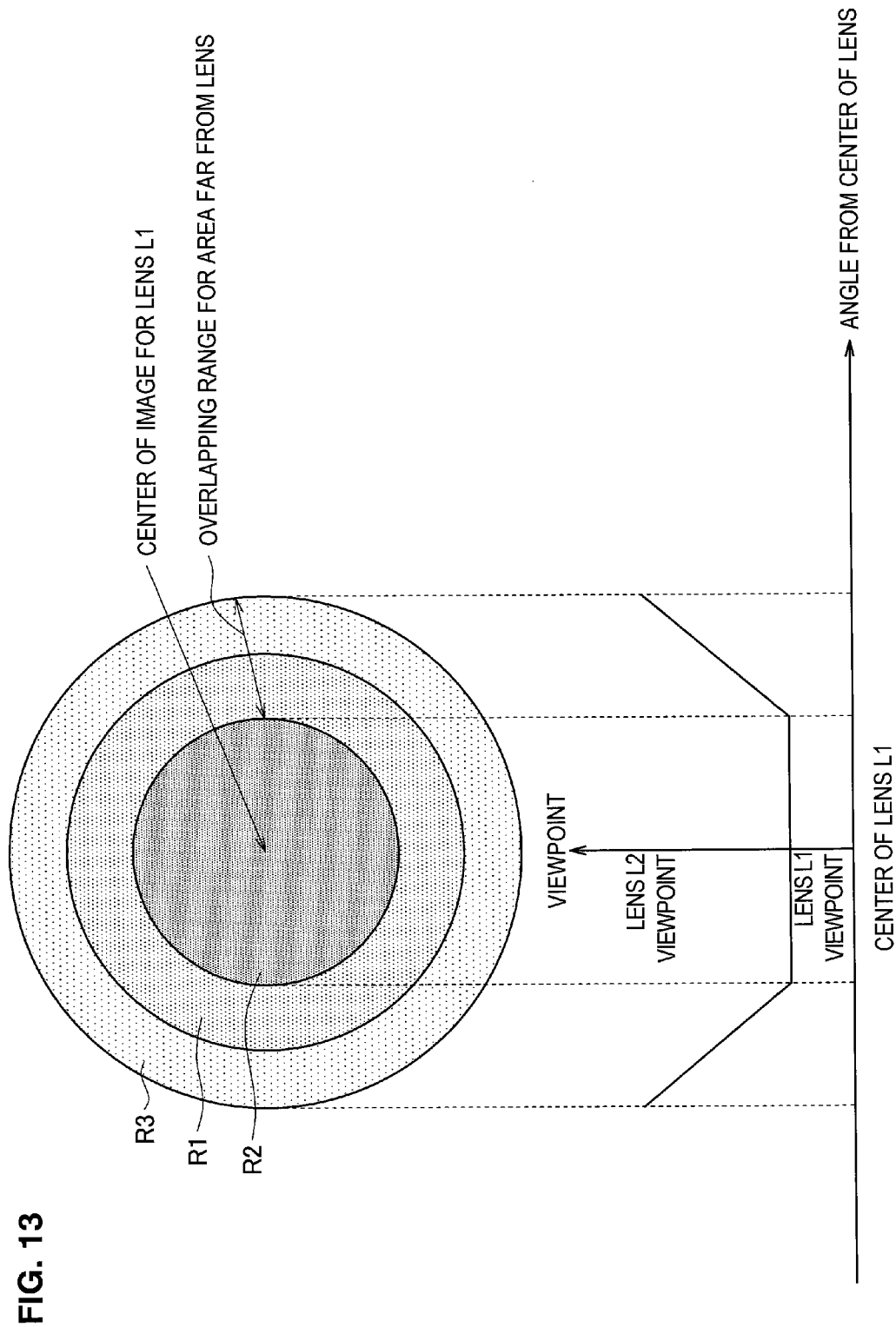
FIG. 13 is an explanatory diagram for describing the image processing method according to the present embodiment.

FIG. 13 is an explanatory diagram for describing the image processing method according to the present embodiment, and illustrates another example of viewpoint movement. FIG. 13 illustrates the example of fixation movement, which is based on a viewpoint using the position of a lens included in an optical unit as the center.

"R1" illustrated in FIG. 13 corresponds to a region in a captured image imaged at "r1" illustrated in FIG. 9, while "R2" illustrated in FIG. 13 corresponds to a region in a captured image imaged at "r2" illustrated in FIG. 9. Meanwhile, "R3" illustrated in FIG. 13 corresponds to a region in a captured image imaged at "r3" illustrated in FIG. 9.

As illustrated by "R2" of FIG. 13 and "r2" of FIG. 9, the region indicated by "R2" of FIG. 13 indicates a region corresponding to an imaging range within which images are not imaged in an overlapping manner, the region corresponding to an imaging range of a lens L1 alone which is included in one of the optical units in FIG. 13. Accordingly, as illustrated in FIG. 13, viewpoint movement is not performed within the imaging range of the lens L1 alone which is included in one of the optical units, but viewpoint movement is performed in a part of the imaging ranges illustrated in "R1" and "R3" of FIG. 13 which overlaps with the imaging range of a lens L2 included in the other optical unit.

Additionally, FIG. 13 focuses on the lens L1 included in one of the optical units, and yet the same applies to the lens L2 included in the other optical unit.

When a process of the image processing method according to the present embodiment is performed, it is possible to perform viewpoint movement within an imaging range within which images are imaged by a plurality of optical units in an overlapping manner as illustrated, for example, in FIGS. 12 and 13.

The example has been described so far in which two captured images imaged by two optical units made of the optical unit including the lens L1 and the optical unit including the lens L2 are processed in a process of the image processing method according to the present embodiment as illustrated, for example, in FIG. 1 and the like. However, captured images to be processed in the image processing method according to the present embodiment are not limited thereto.

Figure 14:
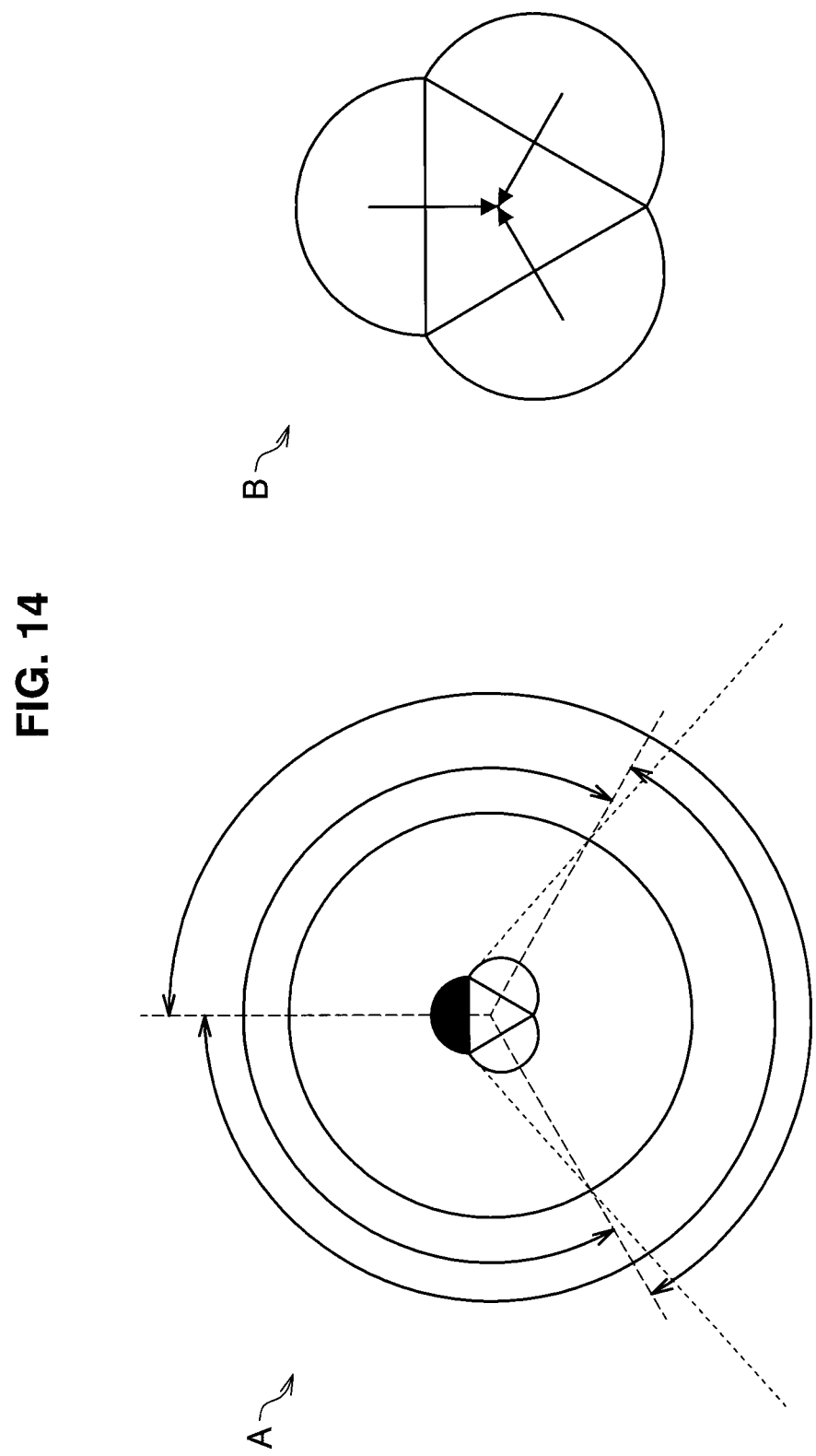
FIG. 14 is an explanatory diagram for describing the image processing method according to the present embodiment.

FIG. 14 is an explanatory diagram for describing the image processing method according to the present embodiment, and illustrates a first example in which the imaging ranges of a plurality of optical units overlap with areas in all the directions (entire imaging range). A of FIG. 14 illustrates an example in which an omnidirectional imaging device according to the present embodiment performs imaging with three optical units each of which has an imaging range of 240 [degrees] and includes a lens, so that the imaging ranges of the plurality of optical units overlap with areas in all the directions.

The omnidirectional imaging device according to the present embodiment includes at least three or more optical units as illustrated, for example, in A of FIG. 14 in order to overlap the imaging ranges of a plurality of optical units with areas in all the directions. When the imaging ranges of a plurality of optical units overlap with areas in all the directions, which correspond to the entire imaging range, as illustrated, for example, in A of FIG. 14, areas in all the directions and areas over all the distances from an imaging apparatus according to the present embodiment are imaged by the plurality of optical units in an overlapping manner.

Accordingly, when the imaging ranges of a plurality of optical units overlap with areas in all the directions, which correspond to the entire imaging range, as illustrated in A of FIG. 14, it is possible to perform viewpoint movement within the entire imaging range within which the plurality of optical units perform imaging in an overlapping manner as illustrated in B of FIG. 14. Additionally, B of FIG. 14 illustrates an example in which viewpoint movement is performed using the central position of a spherical imaging device as a reference position, but examples of the viewpoint movement according to the present embodiment are not limited to the example illustrated in B of FIG. 14.

FIG. 15 is an explanatory diagram for describing the image processing method according to the present embodiment, and illustrates a second example in which the imaging ranges of a plurality of optical units overlap with areas in all the directions (entire imaging range). As in A of FIG. 14, A of FIG. 15 illustrates an example in which an omnidirectional imaging device according to the present embodiment performs imaging with three optical units each of which has an imaging range of 240 [degrees] and includes a lens, so that the imaging ranges of the plurality of optical units overlap with areas in all the directions.

When a process of the image processing method according to the present embodiment is performed, viewpoint movement may be performed using, for example, as reference positions (a first reference position and a second reference position), two positions included in an n-sided polygon (where n represents the number of optical units) that includes, as its apices, the positions, for example, corresponding to respective three or more optical units. Here, examples of the positions corresponding to the optical units according to the present embodiment include any position in an optical unit such as the central position of a lens included in an optical unit. B of FIG. 15 is an example in which three optical units are provided, and viewpoint movement is performed using, as reference positions (an example of a first reference position and an example of a second reference position), two positions inside a triangle that includes, as its apices, the positions corresponding to the respective three optical units in the example illustrated in B of FIG. 15.

If two positions included in an n-sided polygon that includes, as its apices, the positions corresponding to respective three or more optical units are used as reference positions to perform viewpoint movement as illustrated, for example, in B of FIG. 15, two images (an image for a right eye and an image for a left eye) can be generated which allow for stereopsis. Here, examples of the "two positions included in an n-sided polygon that includes, as its apices, the positions corresponding to respective three or more optical units" according to the present embodiment include any two points included in an n-sided polygon, the two points having a distance therebetween which is equal to the interpupillary distance of a user. The interpupillary distance of a user who are looking at an image may be a fixed value that has been set in advance, or may also be a variable value that can be varied on the basis of a user operation and data indicating a result obtained by measuring the interpupillary distance. If the distance between two points is equal to the interpupillary distance of a user who are looking at an image, the user can recognize a more natural stereo image.

When two positions included in an n-sided polygon that includes, as its apices, the positions corresponding to respective three or more optical units are used as reference positions to perform viewpoint movement, filtering dependent on a distance from an omnidirectional imaging device according to the present embodiment is, for example, applied, so that an object other than an object having the same distance as a point of interest can be blurred in image processing.

Additionally, the viewpoint movement for generating two images (an image for a right eye and an image for a left eye) for allowing for stereopsis is not limited to the "viewpoint movement using, as reference positions, two positions included in an n-sided polygon that includes, as its apices, the positions corresponding to respective three or more optical units."

For example, when an omnidirectional imaging device according to the present embodiment includes four or more optical units disposed on a pyramid and is configured to overlap the imaging ranges of the plurality of optical units with areas in all the directions, which corresponds to the entire imaging range, the "viewpoint movement using, as reference positions, two positions included in a pyramid that includes, as its apices, the positions corresponding to the respective four or more optical units" can be conducted in a process of the image processing method according to the present embodiment.

Figure 16:
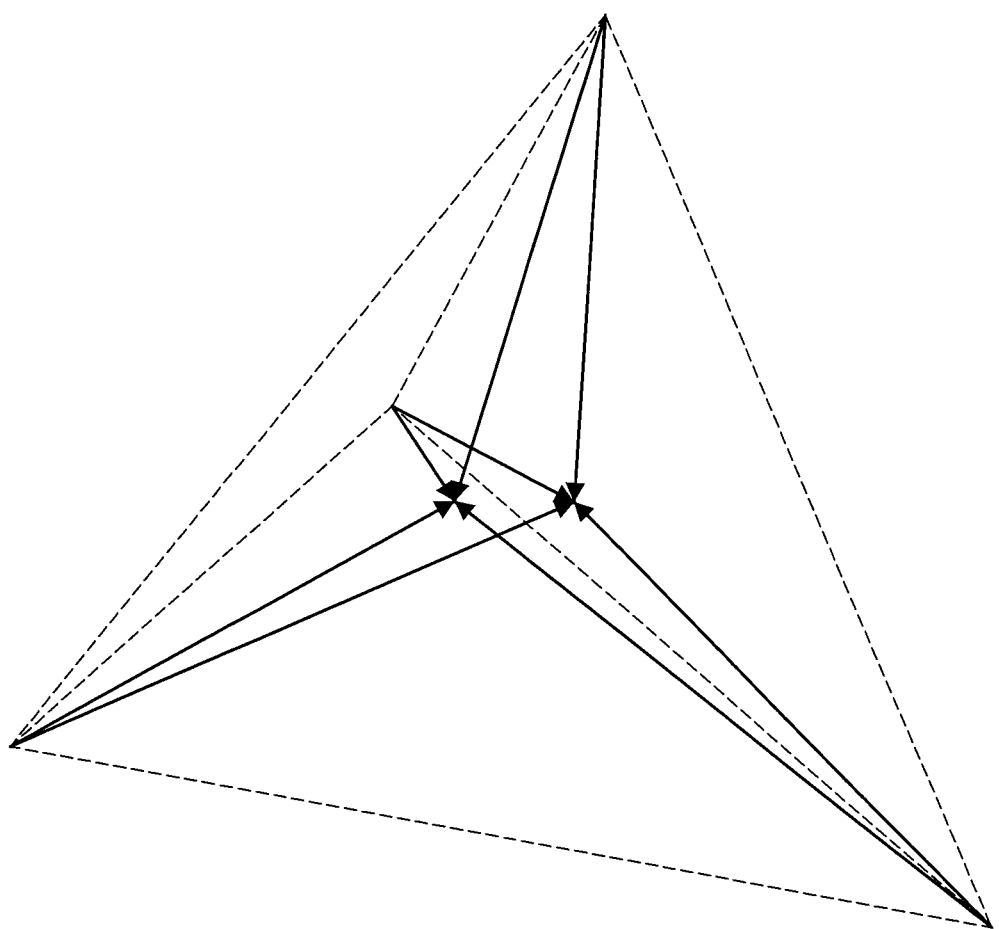
FIG. 16 is an explanatory diagram for describing the image processing method according to the present embodiment.

FIG. 16 is an explanatory diagram for describing the image processing method according to the present embodiment, and illustrates a third example in which the imaging ranges of a plurality of optical units overlap with areas in all the directions (entire imaging range). FIG. 16 illustrates that four optical units disposed on a square pyramid and each including a lens perform imaging to overlap the imaging ranges of the plurality of optical units with areas in all the directions.

When two positions included in a square pyramid (example of a pyramid) are used as reference positions (a first reference position and a second reference position) for viewpoint movement as illustrated, for example, in FIG. 16, the two reference positions can have still higher degrees of freedom and it is possible to generate two images (an image for a right eye and an image for a left eye) that allow for stereopsis, which correspond to any direction.

[3-2] Specific Example of Processes of Image Processing Method According to Present Embodiment Next, a process of the image processing method according to the present embodiment will be more specifically described. An omnidirectional imaging device according to the present embodiment will be described below, for example, as a spherical imaging device as illustrated in B of FIG. 1. Additionally, as discussed above, the omnidirectional imaging device according to the present embodiment is not limited to spherical imaging devices.

[3-2-1] First Example of Processes of Image Processing Method According to Present Embodiment As a first example of a process of the image processing method according to the present embodiment, a process will be described in which the process of the image processing method according to the present embodiment is performed for processes of reproducing images, which cause a display screen to display a captured image.

Figure 17:
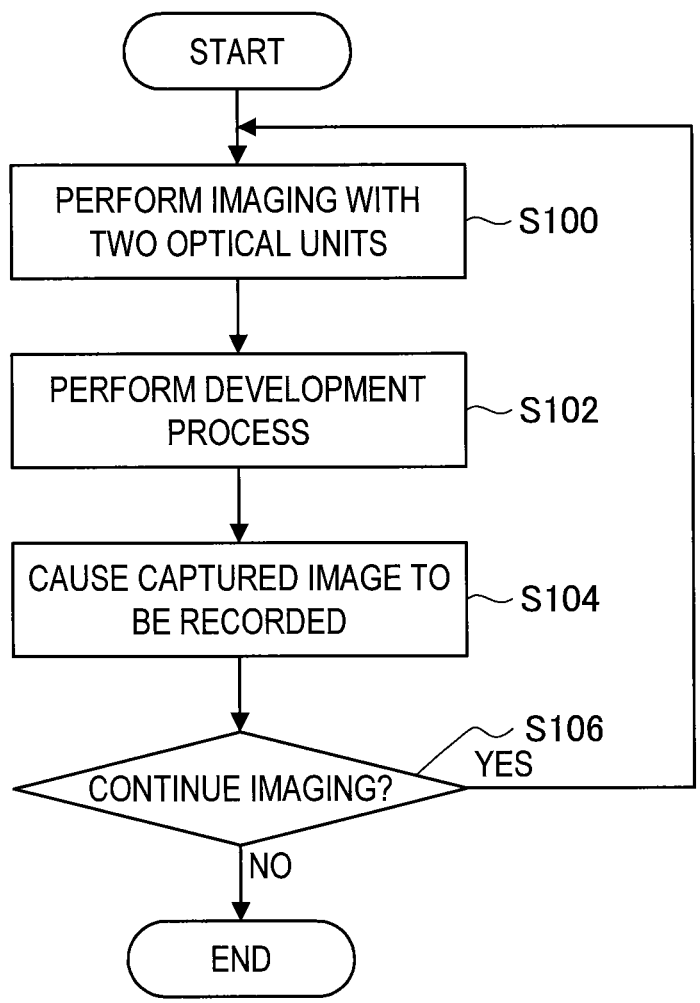
FIG. 17 is a flowchart for describing a first example of processes of the image processing method according to the present embodiment.
Figure 18:
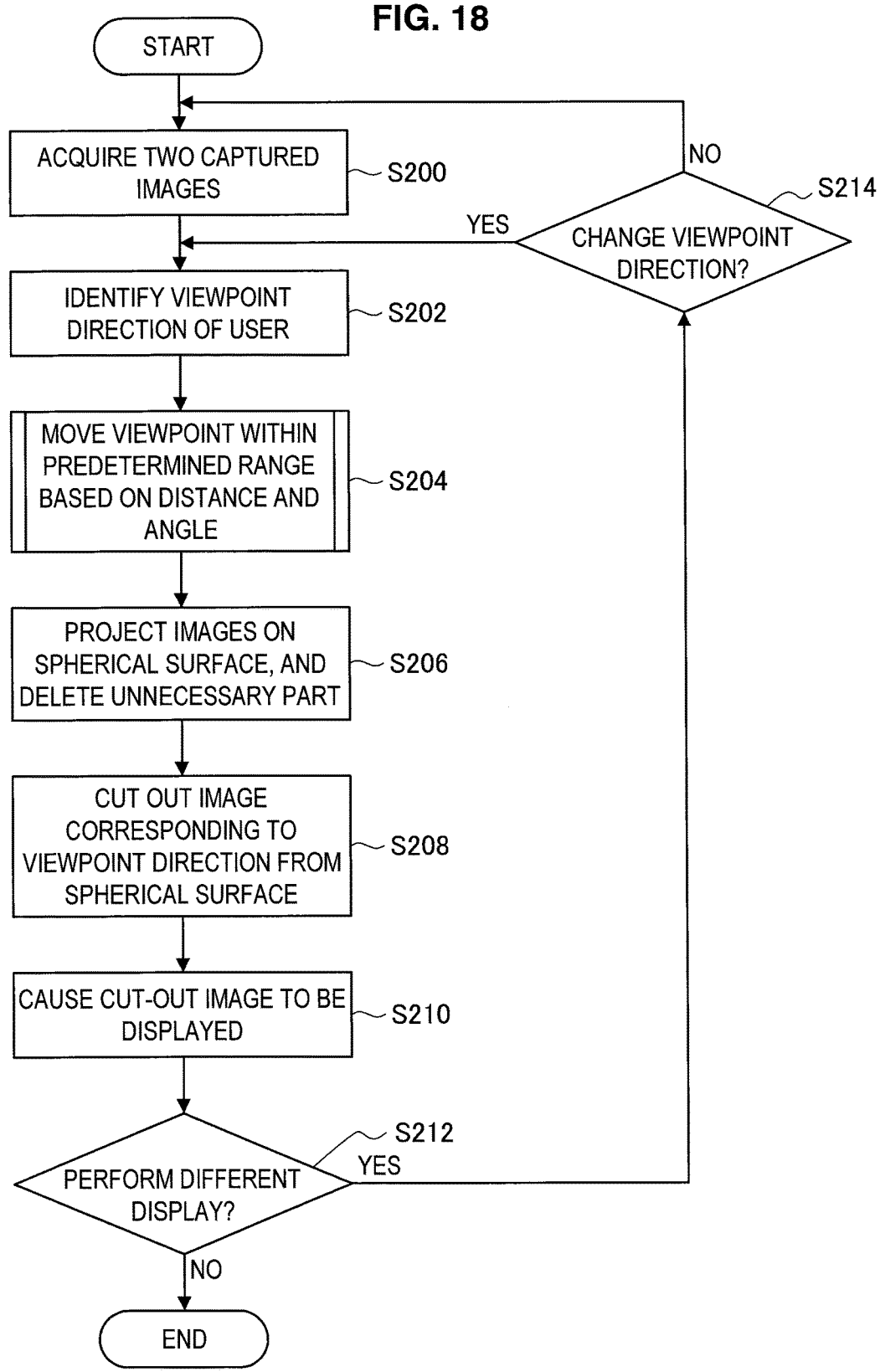
FIG. 18 is a flowchart for describing the first example of the processes of the image processing method according to the present embodiment.

FIGS. 17 and 18 each are a flowchart for describing the first example of the processes of the image processing method according to the present embodiment.

FIG. 17 illustrates an example of imaging processes, and illustrates the example of the processes to be performed by an omnidirectional imaging device according to the present embodiment, the omnidirectional imaging device including two optical units.

Meanwhile, FIG. 18 illustrates an example of processes of reproducing images, and illustrates the example of the processes of the image processing method according to the present embodiment, which are performed by an image processing apparatus according to the present embodiment on two captured images generated through imaging performed by the omnidirectional imaging device according to the present embodiment.

The process in step S204 of FIG. 18 corresponds to a movement amount deciding process according to the present embodiment and a movement process according to the present embodiment. The process in step S206 of FIG. 18 corresponds to a spherical projection process according to the present embodiment, while the process in step S208 corresponds to a viewpoint image generating process according to the present embodiment.

It will be described below that the processes illustrated in FIG. 17 are performed by an omnidirectional imaging device according to the present embodiment, and the processes illustrated in FIG. 18 are performed by an image processing apparatus according to the present embodiment, but the processes performed by the image processing apparatus according to the present embodiment are not limited to the following processes. For example, if an image processing apparatus according to the present embodiment has an imaging function similar to the imaging function of an omnidirectional imaging device according to the present embodiment, the processes illustrated in FIGS. 17 and 18 can also be performed by the image processing apparatus according to the present embodiment.

First of all, an example of the imaging processes to be performed by an omnidirectional imaging device according to the present embodiment will be described with reference to FIG. 17.

An omnidirectional imaging device according to the present embodiment images areas in all the directions with two optical units whose imaging ranges overlap with each other at least in part (S100).

The omnidirectional imaging device according to the present embodiment performs a development process of performing a predetermined process set for RAW data generated through imaging in step S100 (S102).

The omnidirectional imaging device according to the present embodiment then causes a recording medium to record a captured image that has undergone the development process (S104). Examples of recording media used for the omnidirectional imaging device according to the present embodiment to record captured images include a recording medium included in the omnidirectional imaging device according to the present embodiment, an external recording medium connected to the omnidirectional imaging device according to the present embodiment, and a recording medium included in an external apparatus of a storage unit (discussed below) or the like included in an image processing apparatus according to the present embodiment. In causing an external apparatus to record a captured image, the omnidirectional imaging device according to the present embodiment causes, for example, a communication device included therein or an external communication device connected thereto to transmit image data indicating the captured image and a recording instruction to the external apparatus.

The omnidirectional imaging device according to the present embodiment determines whether to continue imaging (S106). The omnidirectional imaging device according to the present embodiment does not determine that imaging is continued, for example, in detecting a signal for finishing imaging, the signal being based on a user operation or the like. To the contrary, the omnidirectional imaging device according to the present embodiment determines that imaging is continued, for example, in detecting no signal for finishing imaging.

If it is determined in step S106 that imaging is continued, the omnidirectional imaging device according to the present embodiment repeats the processes from step S100. To the contrary, if it is not determined in step S106 that imaging is continued, the omnidirectional imaging device according to the present embodiment finishes the processes.

The omnidirectional imaging device according to the present embodiment performs, for example, the processes illustrated in FIG. 17 to generate two captured images.

Additionally, the processes to be performed by the omnidirectional imaging device according to the present embodiment are not limited to the processes illustrated in FIG. 17.

For example, "if the omnidirectional imaging device according to the present embodiment includes three or more optical units for overlapping the entire imaging range with the imaging ranges of the plurality of optical units," or "if the omnidirectional imaging device according to the present embodiment includes four or more optical units disposed on a triangle for overlapping the entire imaging range with the imaging ranges of the plurality of optical units," the omnidirectional imaging device according to the present embodiment can also generate three or more captured images by performing, for example, similar processes to the processes illustrated in FIG. 17.

Meanwhile, for example, if an image processing apparatus according to the present embodiment can process RAW data, or if an external apparatus of the omnidirectional imaging device according to the present embodiment performs a development process, the omnidirectional imaging device according to the present embodiment does not necessarily have to perform the process in step S102 of FIG. 17.

The omnidirectional imaging device according to the present embodiment may also cause a communication device included therein or an external communication device connected thereto to transmit image data indicating a captured image to the image processing apparatus according to the present embodiment, for example, without performing the process in step S104. In this case, the image processing apparatus according to the present embodiment processes the captured image acquired through communication.

Furthermore, if the image processing apparatus according to the present embodiment has an imaging function similar to the imaging function of the omnidirectional imaging device according to the present embodiment, the image processing apparatus according to the present embodiment can also process a generated captured image without performing the process in step S104.

Next, an example of the processes of the image processing method according to the present embodiment for the processes of reproducing images will be described with reference to FIG. 18.

An image processing apparatus according to the present embodiment acquires two captured images each of which has been generated by two optical units (S200). The image processing apparatus according to the present embodiment acquires the two captured images, for example, by "reading out image data indicating the captured images from a storage unit (discussed below) and a recording medium such as a connected external recording medium," or a "communication unit (discussed below) included in the image processing apparatus according to the present embodiment or an external communication device connected to the image processing apparatus according to the present embodiment delivering image data indicating a received captured image."

The image processing apparatus according to the present embodiment identifies a viewpoint direction of a user (S202). The viewpoint direction according to the present embodiment means, for example, a direction used for identifying a region corresponding to a given direction among regions included in a plurality of captured images that use all the directions as their imaging ranges. The viewpoint direction according to the present embodiment corresponds to a direction in which a user faces among all the directions. Examples of the viewpoint direction according to the present embodiment which is identified by the image processing apparatus according to the present embodiment include deciding which directions are used as the top, bottom, left side, or right side.

That is to say, the image processing apparatus according to the present embodiment performs the process in step S202 to decide to which direction a region indicated by an image to be generated corresponds among regions included in a plurality of captured images that use all the directions as their imaging ranges.

For example, the image processing apparatus according to the present embodiment identifies, as a viewpoint direction, a direction indicated by an operation signal based on a user operation designating the viewpoint direction. The image processing apparatus according to the present embodiment can also identify, as a viewpoint direction, a direction indicated by detection data from, for example, a direction sensor included in an omnidirectional imaging device according to the present embodiment, a direction sensor included in a wearable apparatus worn by a user, or the like. Examples of direction sensors according to the present embodiment include any sensors (or sensor group) such as gyro sensors and geomagnetic sensors that can detect directions.

The image processing apparatus according to the present embodiment moves a viewpoint within a predetermined range on the basis of the distance from the omnidirectional imaging device according to the present embodiment to a target object, and the angle from a reference line at a reference position of the omnidirectional imaging device according to the present embodiment to the target object (S204). An example of the reference line according to the present embodiment will be discussed below.

Figure 19:
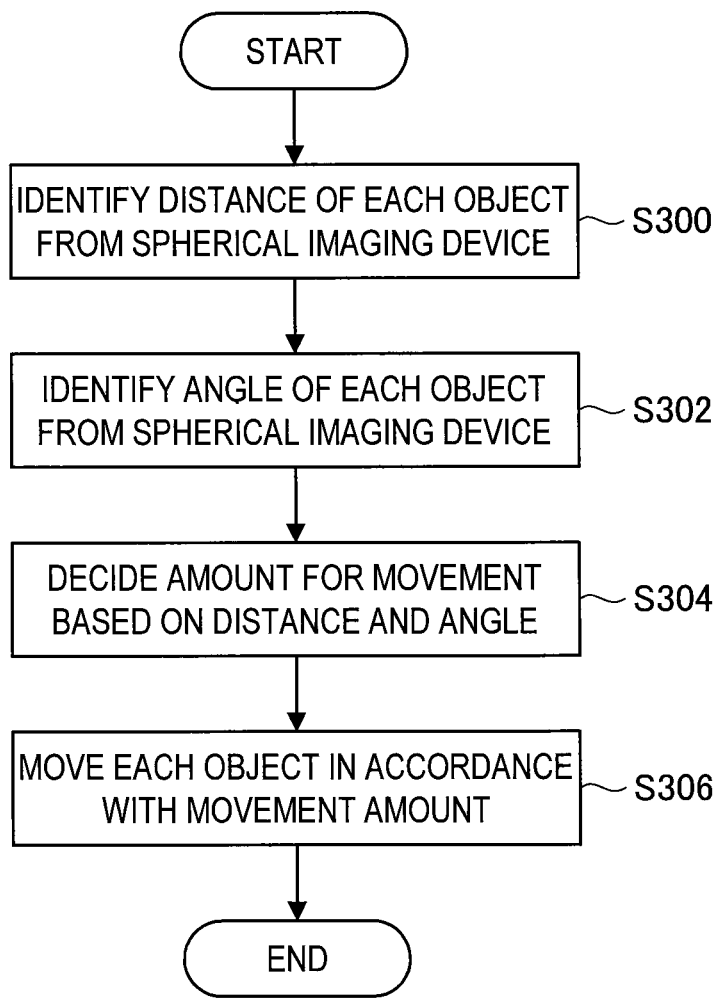
FIG. 19 is a flowchart for describing an example of the processes of the image processing method according to the present embodiment.

FIG. 19 is a flowchart for describing an example of the processes of the image processing method according to the present embodiment, and illustrates an example of the process in step S204 illustrated in FIG. 18.

An image processing apparatus according to the present embodiment identifies, for example, the distance of each target object from a spherical imaging device (which will also be referred to as 'distance from a spherical imaging device according to the present embodiment' below) (S300).

The image processing apparatus according to the present embodiment uses, for example, a target object included in an overlapping region in a plurality of captured images to calculate the distance from the imaging device to the target object. The image processing apparatus according to the present embodiment uses, for example, the disparity of an overlapping region in a plurality of captured images to calculate the distance from the imaging device to the target object. The image processing apparatus according to the present embodiment then identifies the calculated distance from the imaging device to the object as the distance of each object from the spherical imaging device.

FIG. 20 is an explanatory diagram for describing an example of the processes of the image processing method according to the present embodiment, and illustrates an example of a positional relationship between an imaging device and an object O for calculating the distance from a spherical imaging device according to the present embodiment. B of FIG. 20 extracts a positional relationship for calculating the distance from the imaging device to a target object from the positional relationship illustrated in A of FIG. 20. FIG. 20 illustrates the spherical imaging device according to the present embodiment as a 'sphere' for convenience. FIG. 20 illustrates the example, in which the central position of the spherical imaging device coincides with the middle point between the central position of a lens L1 and the central position of a lens L2.

A "distance f between viewpoints" illustrated in FIG. 20 indicates the distance between a plurality of optical units included in an omnidirectional imaging device according to the present embodiment, and has a value, for example, corresponding to a type of the omnidirectional imaging device according to the present embodiment.

An "angle a from the center of a lens" illustrated in FIG. 20 indicates the angle from a reference line at the central position of the lens L1 to the object O, while an "angle b from the center of a lens" illustrated in FIG. 20 indicates the angle from a reference line at the central position of the lens L2 to the object O. In addition, an "angle c from the center of a sphere" illustrated in FIG. 20 indicates the angle from a reference line at the central position (example of a reference position) of the spherical imaging device to the object O. Examples of the reference lines according to the present embodiment include a line that passes through the central position of the spherical imaging device, the central position of the lens L1, and the central position of the lens L2 as illustrated in FIG. 20.

For example, the following expression 1 is used to calculate an "angle d formed by a perpendicular from between viewpoints and a line connecting the center of the sphere and an object" illustrated in FIG. 20.

$$d = \arctan\left\{\frac{\sin(a-b)}{2\sin(a)\cdot\sin(b)}\right\} \quad \text{(Expression 1)}$$

Meanwhile, for example, the following expression 2 is used to calculate a "distance h in the perpendicular direction from between the viewpoints" illustrated in FIG. 20.

$$h = -f \cdot \frac{\sin(a)\cdot\sin(b)}{\sin(a+b)} \quad \text{(Expression 2)}$$

Furthermore, for example, the following expression 3 is used to calculate an "angle c from the center of the sphere" illustrated in FIG. 20.

$$c = \frac{\pi}{2} - d \quad \text{(Expression 3)}$$

For example, the following expression 4 is used to calculate an "object distance l from the center of the sphere" illustrated in FIG. 20.

$$l = \frac{h}{\cos(d)} \quad \text{(Expression 4)}$$

If the distance from an imaging device to a target object means the distance from the surface of a spherical imaging device to an object, the image processing apparatus according to the present embodiment, for example, subtracts a distance corresponding to the radius of the spherical imaging device from the distance l calculated from the expression 4 to calculate the distance from the imaging device to the target object.

The distance from the omnidirectional imaging device according to the present embodiment to a target object is not limited to the distance from the surface of a spherical imaging device to an object.

For example, the image processing apparatus according to the present embodiment can also calculate the distance from a predetermined position corresponding to an optical unit (e.g. central position of a lens included in an optical unit) to a target object as the distance from the imaging device to the target object. This is because if the central position of the spherical imaging device coincides with the middle point between the central position of the lens L1 and the central position of the lens L2, the distance corresponding to one of the optical units alone has to be identified to allow the distance corresponding to the other optical unit to be identified.

The image processing apparatus according to the present embodiment calculates the distance from the imaging device to the target object, for example, as described above, to identify the distance from the spherical imaging device according to the present embodiment.

A method for identifying the distance from the spherical imaging device according to the present embodiment is not limited thereto. The image processing apparatus according to the present embodiment can also identify the distance from the spherical imaging device according to the present embodiment, for example, as described below.

To identify the distance of a region in focus as the distance from the spherical imaging device according to the present embodiment on the basis of "information on contrast autofocus (AF)" indicating the distance of the region in focus (data) which has been acquired from the imaging device.

To identify the distance based on a difference in output data from a phase difference sensor which indicates an output of the phase difference sensor as the distance from the spherical imaging device according to the present embodiment on the basis of "information on phase difference AF" (data) which has been acquired from the imaging device and includes the output data.

To identify, as the distance from the spherical imaging device according to the present embodiment, the distance on the basis of "time information" (data) acquired from the imaging device which indicates time elapsed while output electromagnetic waves, infrared rays, ultrasonic waves, or the like are reflected on an object and return from the object, the distance being based on time indicated by the time information.

To identify, as the distance from the spherical imaging device according to the present embodiment, the distance on the basis of "information indicating a transformation amount of signals for known patterns of output visible light, electromagnetic waves, infrared rays, or the like" (data) acquired from the imaging device, the distance being based on a transformation amount indicated by the information.

To identify, as the distance from the spherical imaging device according to the present embodiment, the distance based on the angle of an object which has been acquired from a plurality of captured images and the distance between a plurality of optical units (distance calculated in triangulation).

To identify, as the distance from the spherical imaging device according to the present embodiment, the displacement of an object acquired from a combined image (captured image acquired in a rangefinder method) in which rays of light from a plurality of lenses are led into one by mirrors, and the distance (distance calculated in triangulation) based on the distance between the lenses.

An example of the process in step S204 of FIG. 18 will be described with reference to FIG. 19 again. The image processing apparatus according to the present embodiment identifies, for example, the angle of each object from a reference position of the spherical imaging device (which will also be referred to as 'angle from the spherical imaging device according to the present embodiment' below) (S302).

Figure 21:
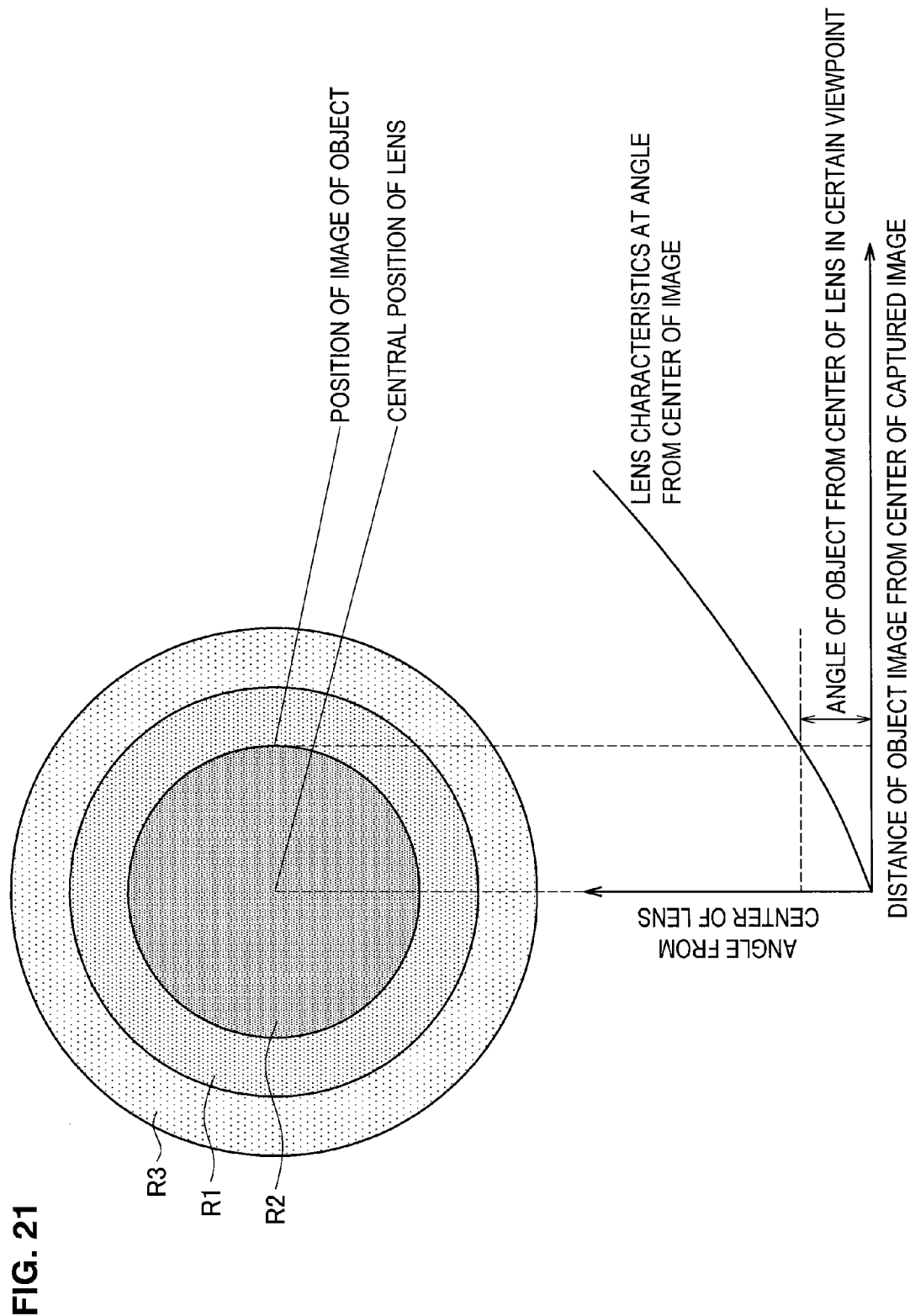
FIG. 21 is an explanatory diagram for describing an example of a process of the image processing method according to the present embodiment.

FIG. 21 is an explanatory diagram for describing an example of the processes of the image processing method according to the present embodiment, and illustrates an example of a method for identifying the angle from a spherical imaging device according to the present embodiment. "R1" illustrated in FIG. 21 corresponds to a region in a captured image imaged in "r1" illustrated FIG. 9, while "R2" illustrated in FIG. 21 corresponds to a region in a captured image imaged in "r2" illustrated in FIG. 9. Meanwhile, "R3" illustrated in FIG. 21 corresponds to a region in a captured image imaged in "r3" illustrated in FIG. 9.

For example, an image processing apparatus according to the present embodiment calculates the angle corresponding to the distance in an image imaged by the spherical imaging device according to the present embodiment by using a function indicating a lens characteristics at the angle from the center of the image which indicates a relationship between the distance in the image (corresponding to the "distance of an object from the center of the captured image" illustrated in FIG. 21) captured by the spherical imaging device according to the present embodiment and the angle (corresponding to the "angle from the center of a lens" illustrated FIG. 21) from the spherical imaging device according to the present embodiment. The image processing apparatus according to the present embodiment then identifies the calculated angle as the angle from the spherical imaging device according to the present embodiment.

A method for identifying the angle from the spherical imaging device according to the present embodiment is not limited thereto. The image processing apparatus according to the present embodiment can also identify the angle from the spherical imaging device according to the present embodiment, for example, as described below.

To identify, as the angle from the spherical imaging device according to the present embodiment, the angle obtained from a lens characteristic and the position of an object in an image on the basis of "information indicating a lens characteristic" (data) acquired from an imaging device and a captured image.

To identify, as the angle from the spherical imaging device according to the present embodiment, the angle obtained from a lens characteristic and the position of an object in a phase difference sensor on the basis of "information on phase difference AF" (data) including output data that indicates an output (including an image plane phase difference) from a phase difference sensor, and "information indicating a characteristic of a lens" (data) acquired from an imaging device.

To identify, as the angle from the spherical imaging device according to the present embodiment, the angle based on "direction information" (data) acquired from an imaging device, the "direction information" (data) indicating a direction in which output electromagnetic waves, infrared rays, ultrasonic waves, or the like are reflected on an object and return from the object.

To identify, as the angle from the spherical imaging device according to the present embodiment, the angle based on "information indicating a transformation position of signals for known patterns of output visible light, electromagnetic waves, infrared rays, or the like" (data) acquired from an imaging device.

An example of the process in step S204 of FIG. 18 will be described with reference to FIG. 19 again. The image processing apparatus according to the present embodiment decides an movement amount for moving a target object included in a captured image on the basis of, for example, the distance from the spherical imaging device according to the present embodiment which was identified in step S300, and the angle from the spherical imaging device according to the present embodiment which was identified in step S302 (S304). The image processing apparatus according to the present embodiment uses in step S304, for example, the movement methods described with reference to FIGS. 10 and 11 to decide a movement amount in a manner that the movement methods are implemented.

The image processing apparatus according to the present embodiment moves a target object included in two captured images in accordance with the movement amount decided in step S304 (S306).

The image processing apparatus according to the present embodiment moves a viewpoint, for example, by performing the processes illustrated in FIG. 19 in step S204 of FIG. 18.

An example of a process to be performed by the image processing apparatus according to the present embodiment will be described with reference to FIG. 18 again. The image processing apparatus according to the present embodiment performs spherical projection for two captured images in which a target object was moved in step S204, and deletes an unnecessary part of the overlapping parts (S206).

The image processing apparatus according to the present embodiment cuts out an image of a region corresponding to the viewpoint identified in step S202 from the images that underwent spherical projection in step S206 (S208). The process in step S208 corresponds to a process of generating a viewpoint image on the basis of a plurality of captured images in which a target object has been moved.

The image processing apparatus according to the present embodiment then causes a display screen to display the cut-out image (viewpoint image) (S210). Examples of a display screen caused by the image processing apparatus according to the present embodiment to display an image include a display screen of a display unit (discussed below) included in the image processing apparatus according to the present embodiment, a display screen of an external display device connected to the image processing apparatus according to the present embodiment, and a display screen of a display device included in an external apparatus. In causing a display screen of an external apparatus to display an image, the image processing apparatus according to the present embodiment causes, for example, a communication unit (discussed below) included in the image processing apparatus according to the present embodiment and an external communication device connected to the image processing apparatus according to the present embodiment to transmit image data indicating the cut-out image and a display instruction to the external apparatus.

The image processing apparatus according to the present embodiment determines whether to perform different display (S212).

For example, when a signal for changing display is detected, the image processing apparatus according to the present embodiment determines that different display is performed. Examples of the signals for changing display according to the present embodiment include signals based on user operations of changing display. The signals for changing display according to the present embodiment may also be regularly or irregularly generated by the image processing apparatus according to the present embodiment and an external apparatus.

To the contrary, for example, when the signal for changing display according to the present embodiment has not been detected for a predetermined time, or when a signal for finishing display is detected, the image processing apparatus according to the present embodiment does not determine that different display is performed.

If it is determined in step S212 that different display is performed, the image processing apparatus according to the present embodiment determines whether to change a viewpoint direction (S214). For example, when the signal for changing display according to the present embodiment indicates that a viewpoint direction is changed, the image processing apparatus according to the present embodiment determines that a viewpoint direction is changed.

If it is determined in step S214 that a viewpoint direction is changed, the image processing apparatus according to the present embodiment repeats the processes from the step S202. To the contrary, if it is not determined in step S214 that a viewpoint direction is changed, the image processing apparatus according to the present embodiment repeats the processes from step S200.

If it is not determined in step S212 that different display is performed, the image processing apparatus according to the present embodiment finishes the processes.

The image processing apparatus according to the present embodiment performs, for example, the processes illustrated in FIG. 18 as the processes of the image processing method according to the present embodiment.

Here, the image processing apparatus according to the present embodiment decides a movement amount for moving a target object on the basis of a plurality of captured images, and performs spherical projection for the plurality of captured images in which the target object has been moved on the basis of the decided movement amount to combine the plurality of captured images.

Accordingly, the image processing apparatus according to the present embodiment performs, for example, the processes illustrated in FIG. 18, so that it is possible to make more natural an image in which a plurality of captured images have been combined, the plurality of captured images being imaged by the omnidirectional imaging device (imaging device using all the directions as its imaging range) according to the present embodiment.

In addition, the image processing apparatus according to the present embodiment causes a display screen to display a viewpoint image cut out from a combined image. The image processing apparatus according to the present embodiment thus can cause a display screen to display a more natural image, for example, by performing the processes illustrated in FIG. 18.

Additionally, the processes of the image processing method according to the first example to be performed by the image processing apparatus according to the present embodiment are not limited to the processes illustrated in FIG. 18.

The image processing apparatus according to the present embodiment may, for example, perform a part of the process in step S204 of FIG. 18 (more specifically, the processes in steps S300 to S304 of FIG. 19), and the other processes in FIG. 18 may be performed by an external apparatus.

Even in that case, the image processing apparatus according to the present embodiment can decide, in a movement amount deciding process according to the present embodiment, a movement amount for moving a target object on the basis of a plurality of captured images. Accordingly, even in the case discussed above, the image processing apparatus according to the present embodiment can make more natural an image in which a plurality of captured images have been combined, the plurality of captured images being imaged by an imaging device using all the directions as its imaging range.

[3-2-2] Second Example of Processes of Image Processing Method According to Present Embodiment As a second example of the processes of the image processing method according to the present embodiment, a process will be described in which a movement amount deciding process according to the present embodiment is performed for the imaging processes.

Figure 22:
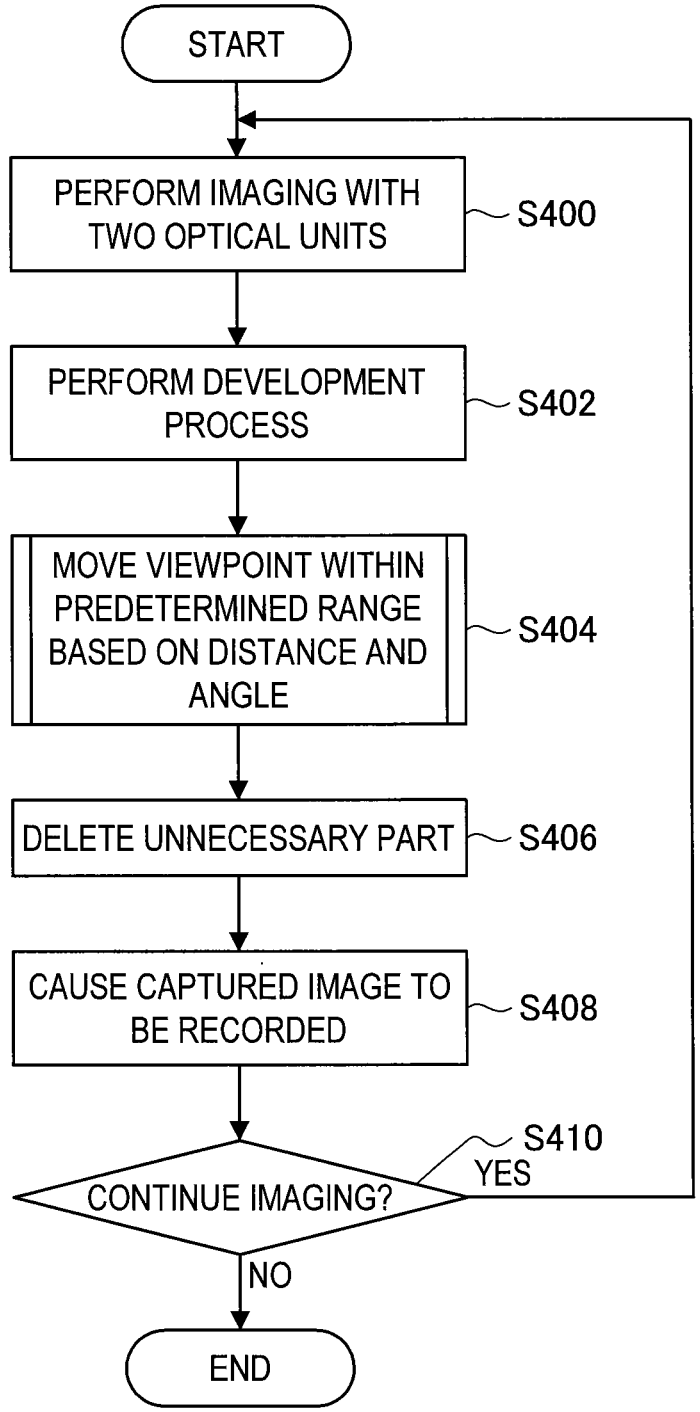
FIG. 22 is a flowchart for describing a second example of the processes of the image processing method according to the present embodiment.
Figure 23:
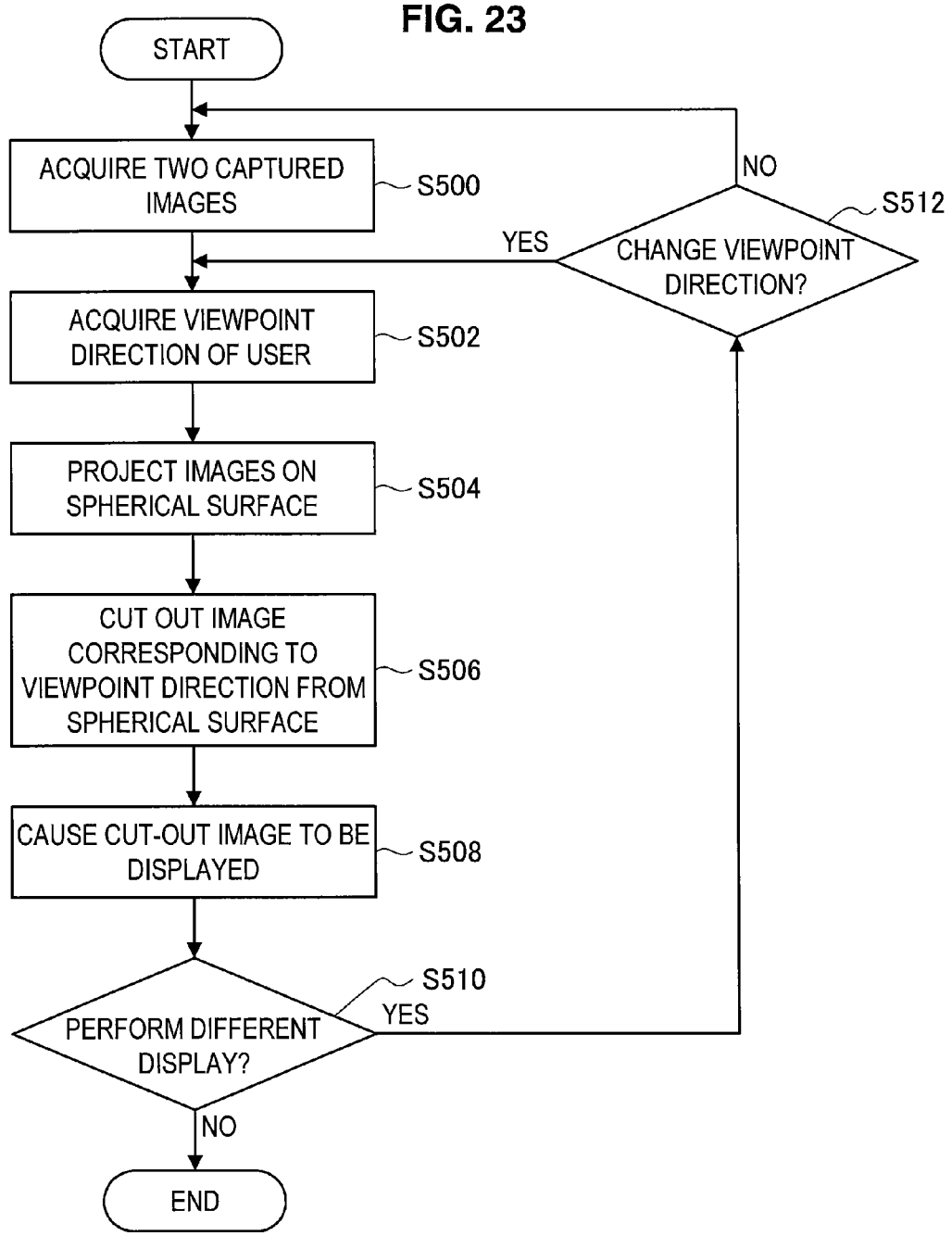
FIG. 23 is a flowchart for describing the second example of the processes of the image processing method according to the present embodiment.

FIGS. 22 and 23 each are a flowchart for describing the second example of the processes of the image processing method according to the present embodiment.

FIG. 22 illustrates an example of the imaging processes, and illustrates the example of the processes of the image processing method according to the present embodiment, which are to be performed on two captured images imaged by two optical units. The process in step S404 of FIG. 22 corresponds to a movement amount deciding process according to the present embodiment and a movement process according to the present embodiment.

Meanwhile, FIG. 23 illustrates an example of the processes of reproducing images. The process in step S504 of FIG. 23 corresponds to a spherical projection process according to the present embodiment, while the process in step S506 corresponds to a viewpoint image generating process according to the present embodiment.

It will be described below that the processes in FIGS. 22 and 23 are performed by an image processing apparatus according to the present embodiment, but the processes of the image processing method according to the second example are not limited thereto.

An image processing apparatus according to the present embodiment may, for example, perform a part of a process that corresponds to a movement amount deciding process according to the present embodiment in step S404 of FIG. 22, and the other processes in FIG. 22 may be performed by an omnidirectional imaging device according to the present embodiment, an external device, or an external apparatus. Since an external apparatus can perform a spherical projection process according to the present embodiment and a viewpoint image generating process according to the present embodiment as discussed above, the processes in FIG. 23 may be performed by the external apparatus.

First of all, an example of the processes of the image processing method according to the present embodiment for the imaging processes will be described with reference to FIG. 22.

An image processing apparatus according to the present embodiment images areas in all the directions with two optical units whose imaging ranges overlap with each other at least in part (S400). As in step S100 of FIG. 17, the image processing apparatus according to the present embodiment then performs a development process of performing a predetermined process that has been set for RAW data generated through imaging in step S400 (S402).

For example, as in step S204 of FIG. 18, the image processing apparatus according to the present embodiment moves a viewpoint within a predetermined range on the basis of the distance from an omnidirectional imaging device according to the present embodiment to a target object, and the angle from a reference line at a reference position of the omnidirectional imaging device according to the present embodiment to the target object (S404).

The image processing apparatus according to the present embodiment deletes an unnecessary part of the overlapping parts in two captured images in which the target object was moved in the process in step S404 (S406). As in step S104 of FIG. 17, the image processing apparatus according to the present embodiment then causes a recording medium to record the captured images that underwent the process in step S406 (S408).

As in step S106 of FIG. 17, the image processing apparatus according to the present embodiment determines whether to continue imaging (S410).

If it is determined in step S410 that imaging is continued, the image processing apparatus according to the present embodiment repeats the processes from the step S400. To the contrary, if it is not determined in step S410 that imaging is continued, the image processing apparatus according to the present embodiment finishes the processes.

The image processing apparatus according to the present embodiment performs, for example, the processes illustrated in FIG. 22 to generate two captured images in which a target object has been moved on the basis of the movement amount decided in a movement amount deciding process according to the present embodiment.

Additionally, processes to be performed by the image processing apparatus according to the present embodiment are not limited to the processes illustrated in FIG. 22.

For example, "if the image processing apparatus according to the present embodiment includes three or more optical units for overlapping the entire imaging range with the imaging ranges of the plurality of optical units," or "if the image processing apparatus according to the present embodiment includes four or more optical units disposed on a pyramid for overlapping the entire imaging range with the imaging ranges of the plurality of optical units," the image processing apparatus according to the present embodiment can also generate three or more captured images by performing, for example, processes similar to the processes illustrated in FIG. 22.

Meanwhile, for example, if the image processing apparatus according to the present embodiment can process RAW data, or if an external apparatus can perform a development process, the image processing apparatus according to the present embodiment does not necessarily have to perform the process in step S402 of FIG. 17.

The image processing apparatus according to the present embodiment may perform the processes of FIG. 23 on captured images that underwent the process in step S406, for example, without performing the process in step S408. When an external apparatus performs the processes of FIG. 23, the image processing apparatus according to the present embodiment may cause a communication device (discussed below) included therein or an external communication device connected thereto to transmit image data indicating the captured images to the external apparatus, for example, without performing the process in step S408.

Next, an example of the processes of reproducing images will be described with reference to FIG. 23. For example, as in step S200 of FIG. 18, an image processing apparatus according to the present embodiment acquires two captured images each of which has been generated by two optical units (S500).

For example, as in step S202 of FIG. 18, the image processing apparatus according to the present embodiment identifies a viewpoint direction of a user (S502).

The image processing apparatus according to the present embodiment performs spherical projection for the two captured images (two captured images in which a target object has been moved) acquired in step S500 (S504).

For example, as in step S208 of FIG. 18, the image processing apparatus according to the present embodiment cuts out an image of a region corresponding to the viewpoint direction identified in step S502 from the images that underwent spherical projection in step S504 (S506). For example, as in step S210 of FIG. 18, the image processing apparatus according to the present embodiment then causes a display screen to display the cut-out image (viewpoint image) (S508).

For example, as in step S212 of FIG. 18, the image processing apparatus according to the present embodiment determines whether to perform different display (S510).

If it is determined in step S510 that different display is performed, the image processing apparatus according to the present embodiment determines, for example, as in step S214 of FIG. 18, whether to change a viewpoint direction (S512).

If it is determined in step S512 that a viewpoint direction is changed, the image processing apparatus according to the present embodiment repeats the processes from the step S502. To the contrary, if it is not determined in step S512 that a viewpoint direction is changed, the image processing apparatus according to the present embodiment repeats the processes from step S500.

If it is not determined in step S510 that different display is performed, the image processing apparatus according to the present embodiment finishes the processes.

The image processing apparatus according to the present embodiment performs, for example, the processes illustrated in FIG. 23 as the processes of reproducing images.

The image processing apparatus according to the present embodiment performs, for example, the processes illustrated in FIGS. 22 and 23 as the processes of the image processing method according to the present embodiment.

Here, as one of the imaging processes, the image processing apparatus according to the present embodiment decides a movement amount for moving a target object on the basis of a plurality of captured images, and uses, as a captured image, an image in which the target object has been moved on the basis of the decided movement amount. In addition, as one of the processes of reproducing images, the image processing apparatus according to the present embodiment performs spherical projection for a plurality of captured images in which a target object has been moved on the basis of the decided movement amount to combine the plurality of captured images.

Accordingly, the image processing apparatus according to the present embodiment performs, for example, the processes illustrated in FIGS. 22 and 23, so that it is possible to make more natural an image in which a plurality of captured images have been combined, the plurality of captured images being imaged through an imaging function corresponding to an omnidirectional imaging device (imaging device using all the directions as its imaging range) according to the present embodiment.

In addition, as one of the reproducing processes, the image processing apparatus according to the present embodiment causes a display screen to display a viewpoint image cut out from the combined image. The image processing apparatus according to the present embodiment thus can cause a display screen to display a more natural image by performing, for example, the processes illustrated in FIG. 23.

[3-2-3] Third Example of Processes of Image Processing Method According to Present Embodiment The processes of the image processing method according to the first example described in [3-2-1] and the processes of the image processing method according to the second example described in [3-2-2] show the examples, in which the image processing apparatus according to the present embodiment processes two captured images. However, for example, "if an omnidirectional imaging device according to the present embodiment includes three or more optical units for overlapping the entire imaging range with the imaging ranges of the plurality of optical units," an image processing apparatus according to the present embodiment can process three or more captured images in which the plurality of optical units have imaged areas in all the directions and areas over all the distances from the imaging apparatus according to the present embodiment in an overlapping manner as described with reference to FIG. 14.

An example in which a movement amount deciding process according to the present embodiment is performed for the reproducing processes will be used below to describe an example of a process in which three or more images are processed in which a plurality of optical units have imaged areas in all the directions and areas over all the distances from the imaging apparatus according to the present embodiment in an overlapping manner.

Figure 24:
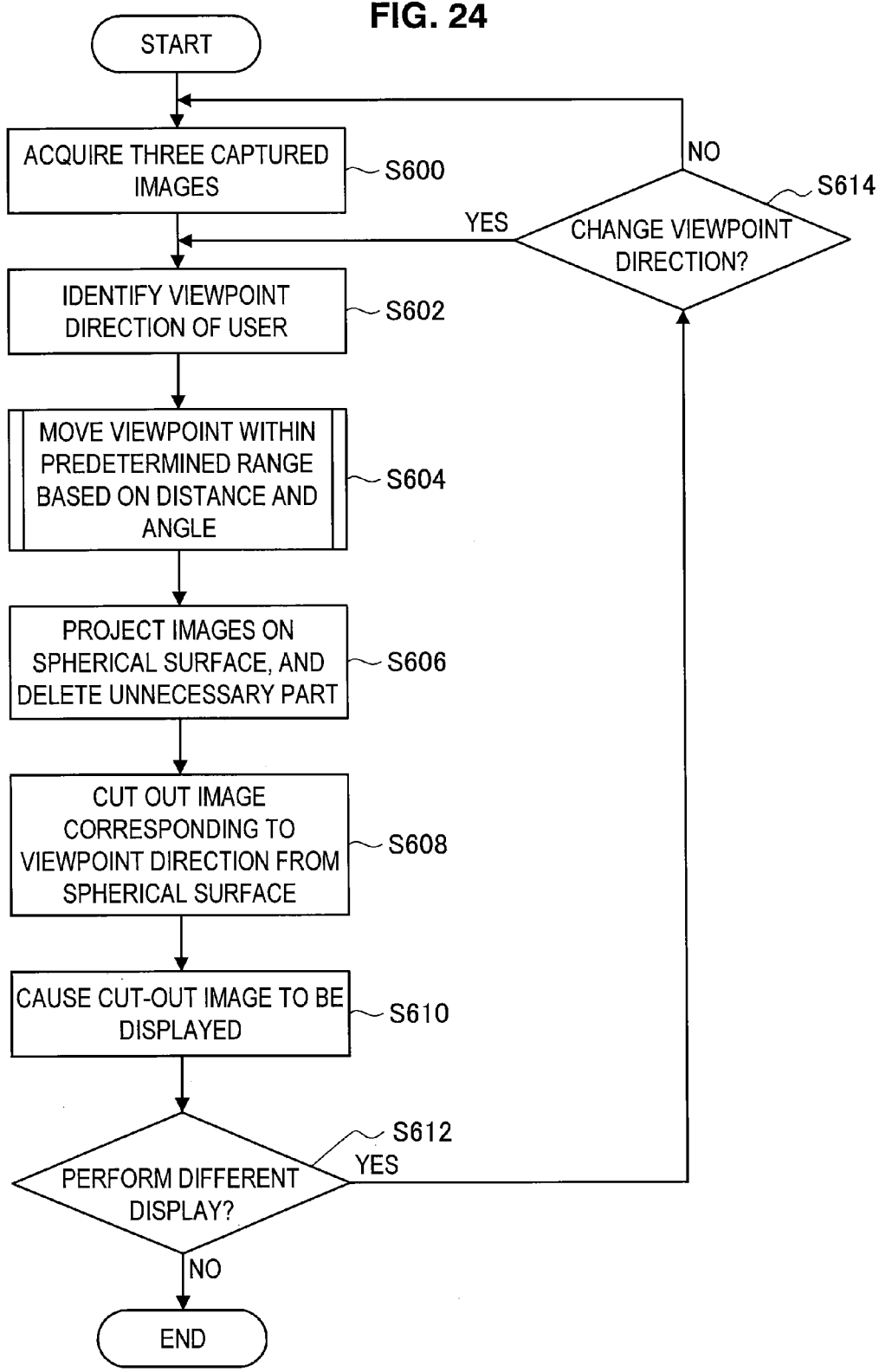
FIG. 24 is a flowchart for describing a third example of the processes of the image processing method according to the present embodiment.

FIG. 24 is a flowchart for describing a third example of the processes of the image processing method according to the present embodiment. The process in step S604 of FIG. 24 corresponds to a movement amount deciding process according to the present embodiment and a movement process according to the present embodiment. The process in step S606 of FIG. 24 corresponds to a spherical projection process according to the present embodiment, while the process in step S608 corresponds to a viewpoint image generating process according to the present embodiment.

The image processing apparatus according to the present embodiment acquires three captured images each of which has been generated by three optical units (S600). For example, as in step S200 of FIG. 18, an image processing apparatus according to the present embodiment acquires the captured images.

For example, as in step S202 of FIG. 18, the image processing apparatus according to the present embodiment identifies a viewpoint direction of a user (S602).

For example, as in step S204 of FIG. 18, the image processing apparatus according to the present embodiment moves a viewpoint within a predetermined range on the basis of the distance from an omnidirectional imaging device according to the present embodiment to a target object, and the angle from a reference line at a reference position of the omnidirectional imaging device according to the present embodiment to the target object (S604).

For example, as in step S206 of FIG. 18, the image processing apparatus according to the present embodiment performs spherical projection for the two captured images, in which the target object was moved in step S604, and deletes an unnecessary part of the overlapping parts (S606).

For example, as in step S208 of FIG. 18, the image processing apparatus according to the present embodiment cuts out an image of a region corresponding to the viewpoint direction identified in step S602 from the images that underwent spherical projection in step S606 (S608). For example, as in step S210 of FIG. 18, the image processing apparatus according to the present embodiment then causes a display screen to display the cut-out image (viewpoint image) (S610).

For example, as in step S212 of FIG. 18, the image processing apparatus according to the present embodiment determines whether to perform different display (S612).

If it is determined in step S612 that different display is performed, the image processing apparatus according to the present embodiment determines, for example, as in step S214 of FIG. 18, whether to change a viewpoint direction (S614).

If it is determined in step S614 that a viewpoint direction is changed, the image processing apparatus according to the present embodiment repeats the processes from the step S602. To the contrary, if it is not determined in step S614 that a viewpoint direction is changed, the image processing apparatus according to the present embodiment repeats the processes from step S600.

If it is not determined in step S612 that different display is performed, the image processing apparatus according to the present embodiment finishes the processes.

The image processing apparatus according to the present embodiment performs, for example, the processes illustrated in FIG. 24 as the processes of reproducing images.

The image processing apparatus according to the present embodiment performs, for example, the processes illustrated in FIG. 24 as the processes of the image processing method according to the present embodiment. As illustrated in FIG. 24, the image processing apparatus according to the present embodiment performs processes similar to the processes of the image process method according to the first example illustrated in FIG. 18, in which two captured images are processed.

Accordingly, even when the image processing apparatus according to the present embodiment performs, for example, the processes illustrated in FIG. 24, the image processing apparatus according to the present embodiment can attain advantageous effects similar to the advantageous effects attained in the processes of the image processing method according to the first example described in [3-2-1].

Additionally, the processes of the image processing apparatus according to the third example are not limited to the processes illustrated in FIG. 24.

For example, the image processing apparatus according to the present embodiment can also perform processes similar to the processes of the image processing method according to the second example illustrated in FIGS. 22 and 23, in which two captured images are processed.

In addition, the image processing apparatus according to the present embodiment may perform processes according to a modified example, the processes being similar to the processes of the image processing method according to the first example described in [3-2-1] or the processes of the image processing method according to the second example described in [3-2-2].

[3-2-4] Fourth Example of Processes of Image Processing Method According to Present Embodiment If two positions included in an n-sided polygon that includes, as its apices, the positions corresponding to respective three or more optical units are used as reference positions (a first reference position and a second reference position) to perform viewpoint movement as described with reference to FIG. 15, two images (an image for a right eye and an image for a left eye) can be generated, the two images allowing for stereopsis.

An example in which a movement amount deciding process according to the present embodiment is performed for the reproducing processes will be used below to describe an example of a process in which two images are generated, the two images allowing for stereopsis. One of the two images that allow for stereopsis will be referred to as 'right viewpoint image' below, the image corresponding to an image for a right eye. The other of the two images that allow for stereopsis will be referred to as 'left viewpoint image' below, the other corresponding to an image for a left eye.

Figure 25:
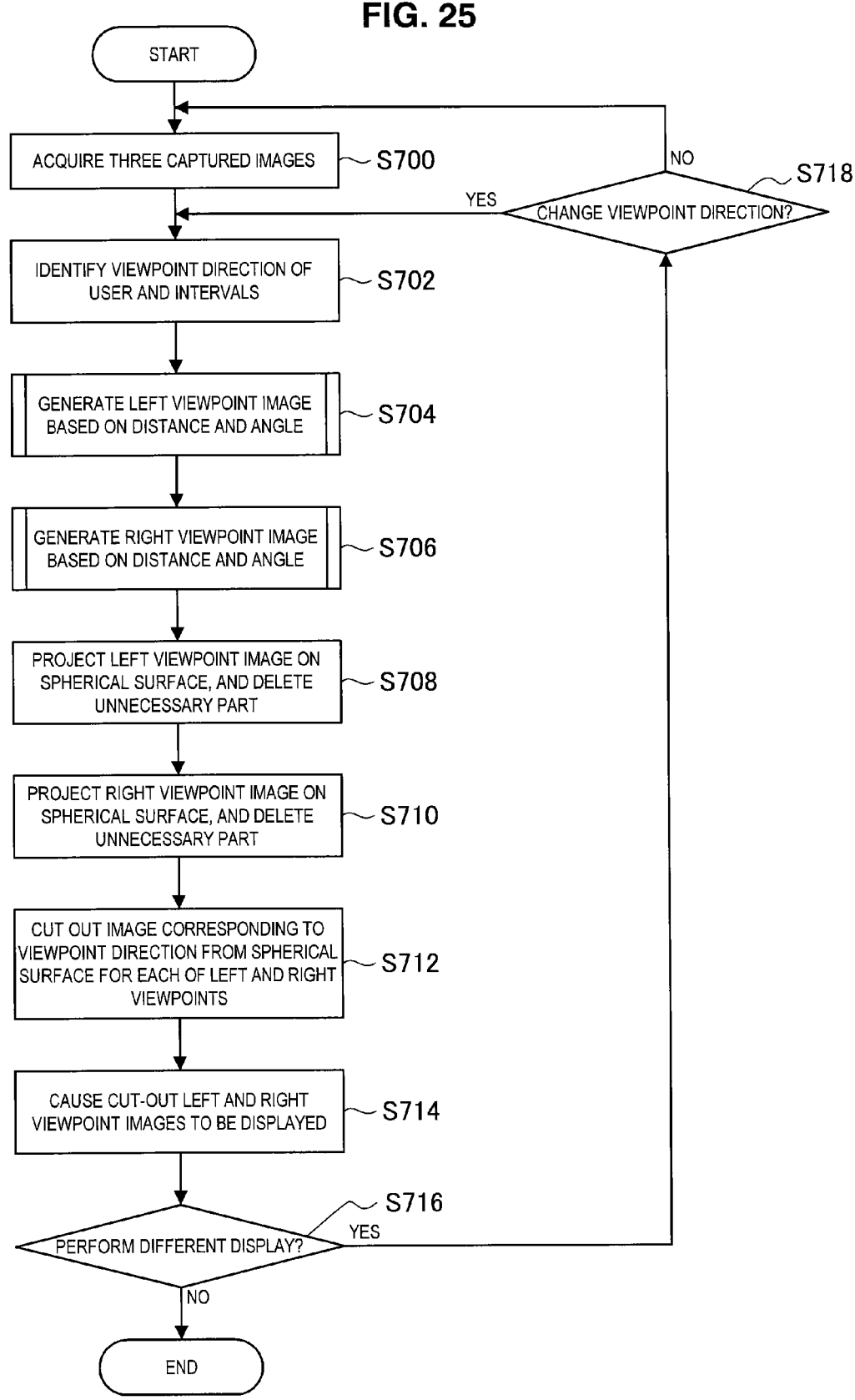
FIG. 25 is a flowchart for describing a fourth example of the processes of the image processing method according to the present embodiment.

FIG. 25 is a flowchart for describing a fourth example of the processes of the image processing method according to the present embodiment. The process in step S704 and the process in step S706 of FIG. 25 correspond to a movement amount deciding process according to the present embodiment and a movement process according to the present embodiment. The processes in steps S708 and S710 of FIG. 25 correspond to a spherical projection process according to the present embodiment. The process in steps S712 of FIG. 25 corresponds to a viewpoint image generating process according to the present embodiment.

For example, as in step S600 of FIG. 24, an image processing apparatus according to the present embodiment acquires three captured images each of which has been generated by three optical units (S700).

For example, as in step S202 of FIG. 18, the image processing apparatus according to the present embodiment identifies a viewpoint direction of a user (S702).

The image processing apparatus according to the present embodiment generates a left viewpoint image on the basis of the distance from an omnidirectional imaging device according to the present embodiment to a target object, and the angle from a reference line at a reference position of the omnidirectional imaging device according to the present embodiment to the target object (S704). The image processing apparatus according to the present embodiment performs viewpoint movement in a process similar to, for example, the process in step S204 of FIG. 18 to generate, as a left viewpoint image, an image corresponding to a first reference position included in a triangle that includes, as its apices, the positions corresponding to respective three optical units included in the omnidirectional imaging device according to the present embodiment.

More specifically, the image processing apparatus according to the present embodiment performs processes similar to, for example, the processes in steps S300 to S304 of FIG. 19 to decide a first movement amount for moving a target object in a manner that the three captured images corresponding to the respective three optical units look like images imaged from the first reference position. The image processing apparatus according to the present embodiment then performs a process similar to, for example, the process in step S306 of FIG. 19 to move the target object included in the captured images on the basis of the decided first movement amount.

The image processing apparatus according to the present embodiment generates a right viewpoint image on the basis of the distance from the omnidirectional imaging device according to the present embodiment to the target object, and the angle from a reference line at a reference position of the omnidirectional imaging device according to the present embodiment to the target object (S706). The image processing apparatus according to the present embodiment performs viewpoint movement in a process similar to, for example, the process in step S204 of FIG. 18 to generate, as a right viewpoint image, an image corresponding to a second reference position included in a triangle that includes, as its apices, the positions corresponding to respective three optical units included in the omnidirectional imaging device according to the present embodiment.

More specifically, the image processing apparatus according to the present embodiment performs processes similar to, for example, the processes in steps S300 to S304 of FIG. 19 to decide a second movement amount for moving the target object in a manner that the three captured images corresponding to the respective three optical units look like images imaged from the second reference position. The image processing apparatus according to the present embodiment then performs a process similar to, for example, the process in step S306 of FIG. 19 to move the target object included in the captured images on the basis of the decided second movement amount.

Additionally, FIG. 25 illustrates an example in which the process in step S706 is performed after the process in step S704, but the processes performed by the image processing apparatus according to the present embodiment are not limited thereto. For example, the image processing apparatus according to the present embodiment may perform the process in step S704 after the process in step S706, or may also perform the processes in step S704 and S706 in synchronization.

The image processing apparatus according to the present embodiment performs spherical projection for the left viewpoint image generated in step S704, and deletes an unnecessary part of the overlapping parts (S708). The image processing apparatus according to the present embodiment performs the process in step S708, the process being similar to, for example, the process in step S206 of FIG. 18.

The image processing apparatus according to the present embodiment performs spherical projection for the right viewpoint image generated in step S706, and deletes an unnecessary part of the overlapping parts (S710). The image processing apparatus according to the present embodiment performs the process in step S710, the process being similar to, for example, as the one in step S206 of FIG. 18.

Additionally, FIG. 25 illustrates an example in which the process in step S710 is performed after the process in step S708, but the processes performed by the image processing apparatus according to the present embodiment are not limited thereto. For example, the image processing apparatus according to the present embodiment may perform the process in step S708 after the process in step S710, or may also perform the processes in step S708 and S710 in synchronization.

For example, as in step S208 of FIG. 18, the image processing apparatus according to the present embodiment cuts out each image of a region corresponding to the viewpoint direction identified in step S702 from each of the images that underwent spherical projection in steps S708 and S710 (S712).

For example, as in step S210 of FIG. 18, the image processing apparatus according to the present embodiment then cause a display screen to display a left viewpoint image and a right viewpoint image that correspond to the cut-out images (S714). Here, the left viewpoint image and the right viewpoint image cut out in step S712 correspond to a "viewpoint image based on a plurality of captured images in which a target object has been moved on the basis of a first movement amount" (first viewpoint image) and a "viewpoint image based on a plurality of captured images in which a target object has been moved on the basis of a second movement amount" (second viewpoint image).

For example, as in step S212 of FIG. 18, the image processing apparatus according to the present embodiment determines whether to perform different display (S716).

If it is determined in step S716 that different display is performed, the image processing apparatus according to the present embodiment determines, for example, as in step S214 of FIG. 18, whether to change a viewpoint direction (S718).

If it is determined in step S718 that a viewpoint direction is changed, the image processing apparatus according to the present embodiment repeats the processes from the step S702. To the contrary, if it is not determined in step S718 that a viewpoint direction is changed, the image processing apparatus according to the present embodiment repeats the processes from step S700.

If it is not determined in step S716 that different display is performed, the image processing apparatus according to the present embodiment finishes the processes.

The image processing apparatus according to the present embodiment performs, for example, the processes illustrated in FIG. 25 as the processes of the image processing method according to the present embodiment.

As illustrated in FIG. 25, the image processing apparatus according to the present embodiment generates two images (a right viewpoint image corresponding to an image for a right eye, and a left viewpoint image corresponding to an image for a left eye) that allow for stereopsis in processes similar to the processes of the image processing method according to the third example illustrated in FIG. 24. Accordingly, even when the image processing apparatus according to the present embodiment performs, for example, the processes illustrated in FIG. 25, the image processing apparatus according to the present embodiment can attain advantageous effects similar to the advantageous effects attained in the processes of the image processing method according to the third example described in [3-2-3].

Additionally, the processes of the image processing method according to the fourth example are not limited to the processes illustrated in FIG. 25. For example, the image processing apparatus according to the present embodiment can perform processes according to a modified example, the process being similar to the processes of the image processing method according to the third example described in [3-2-3].

[3-2-5] Fifth Example of Processes of Image Processing Method According to Present Embodiment A process in which two images (an image for a right eye and an image for a left eye) that allow for stereopsis can be generated is not limited to the processes of the image processing method according to the fourth example described in [3-2-4]. If two positions included in a pyramid that includes, as its apices, the positions corresponding to respective four or more optical units are used as reference positions (a first reference position and a second reference position) to perform viewpoint movement as described with reference to FIG. 16, two images (an image for a right eye and an image for a left eye) can be generated, the two images allowing for stereopsis. An example in which a movement amount deciding process according to the present embodiment is performed for the reproducing processes will be used below to describe an example of a process in which two images are generated, the two images allowing for stereopsis.

Figure 26:
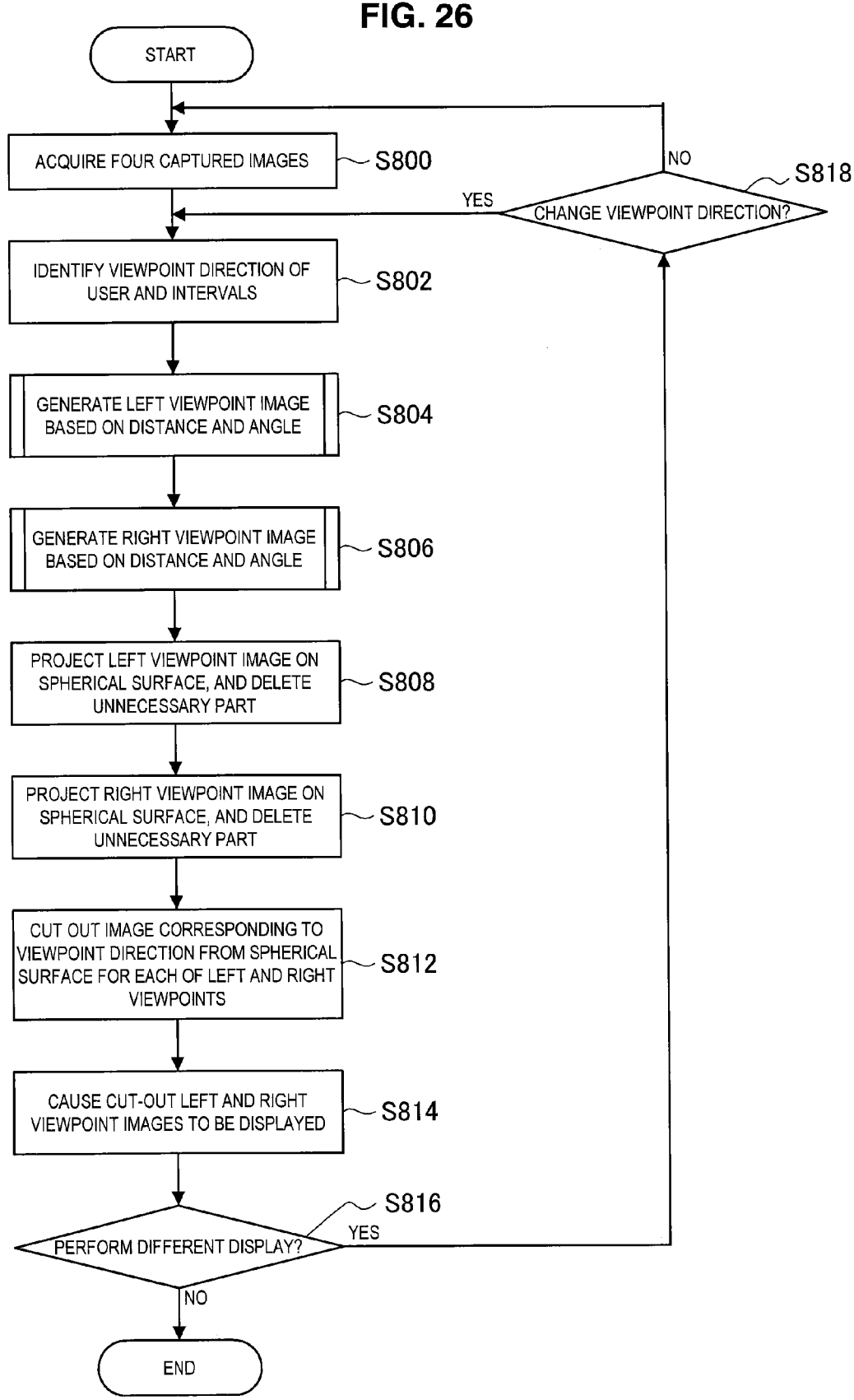
FIG. 26 is a flowchart for describing a fifth example of the processes of the image processing method according to the present embodiment.

FIG. 26 is a flowchart for describing a fifth example of the processes of the image processing method according to the present embodiment. The process in step S804 and the process in step S806 of FIG. 26 correspond to a movement amount deciding process according to the present embodiment and a movement process according to the present embodiment. The processes in steps S808 and S810 of FIG. 26 correspond to a spherical projection process according to the present embodiment. The process in steps S812 of FIG. 26 corresponds to a viewpoint image generating process according to the present embodiment.

For example, as in step S600 of FIG. 24, an image processing apparatus according to the present embodiment acquires four captured images each of which has been generated by four optical units (S800).

For example, as in step S202 of FIG. 18, the image processing apparatus according to the present embodiment identifies a viewpoint direction of a user (S802).

The image processing apparatus according to the present embodiment generates a left viewpoint image on the basis of the distance from an omnidirectional imaging device according to the present embodiment to a target object, and the angle from a reference line at a reference position of the omnidirectional imaging device according to the present embodiment to the target object (S804). The image processing apparatus according to the present embodiment performs viewpoint movement, for example, in a process similar to the process in step S204 of FIG. 18 to generate, as a left viewpoint image, an image corresponding to a first reference position included in a square pyramid that includes, as its apices, the positions corresponding to the respective four optical units included in the omnidirectional imaging device according to the present embodiment.

More specifically, the image processing apparatus according to the present embodiment performs processes similar to, for example, the processes in steps S300 to S304 of FIG. 19 to decide a first movement amount for moving the target object in a manner that the four captured images corresponding to the respective four optical units look like images imaged from the first reference position. The image processing apparatus according to the present embodiment then performs a process similar to, for example, the process in step S306 of FIG. 19 to move the target object included in the captured images on the basis of the decided first movement amount.

The image processing apparatus according to the present embodiment generates a right viewpoint image on the basis of the distance from the omnidirectional imaging device according to the present embodiment to the target object, and the angle from a reference line at a reference position of the omnidirectional imaging device according to the present embodiment to the target object (S806). The image processing apparatus according to the present embodiment performs viewpoint movement in a process similar to, for example, the process in step S204 of FIG. 18 to generate, as a right viewpoint image, an image corresponding to a second reference position included in a square pyramid that includes, as its apices, the positions corresponding to the respective four optical units included in the omnidirectional imaging device according to the present embodiment.

More specifically, the image processing apparatus according to the present embodiment performs processes similar to, for example, the processes in steps S300 to S304 of FIG. 19 to decide a second movement amount for moving a target object in a manner that four captured images corresponding to the respective four optical units look like images imaged from the second reference position. The image processing apparatus according to the present embodiment then performs a process similar to, for example, the process in step S306 of FIG. 19 to move the target object included in the captured images on the basis of the decided second movement amount.

Additionally, FIG. 26 illustrates the example, in which the process in step S806 is performed after the process in step S804, but the processes performed by the image processing apparatus according to the present embodiment are not limited thereto. For example, the image processing apparatus according to the present embodiment may perform the process in step S804 after the process in step S806, or may also perform the processes in step S804 and S806 in synchronization.

For example, as in step S708 of FIG. 25, the image processing apparatus according to the present embodiment performs spherical projection for the left viewpoint image generated in step S804, and deletes an unnecessary part of the overlapping parts (S808).

For example, as in step S710 of FIG. 25, the image processing apparatus according to the present embodiment performs spherical projection for the right viewpoint image generated in step S806, and deletes an unnecessary part of the overlapping parts (S810).

Additionally, FIG. 26 illustrates the example, in which the process in step S810 is performed after the process in step S808, but the processes performed by the image processing apparatus according to the present embodiment are not limited thereto. For example, the image processing apparatus according to the present embodiment may perform the process in step S808 after the process in step S810, or may also perform the processes in step S808 and S810 in synchronization.

For example, as in step S208 of FIG. 18, the image processing apparatus according to the present embodiment cuts out each image of a region corresponding to the viewpoint direction identified in step S802 from each of the images that underwent spherical projection in steps S808 and S810 (S812).

For example, as in step S210 of FIG. 18, the image processing apparatus according to the present embodiment then causes a display screen to display the left viewpoint image and the right viewpoint image that correspond to the cut-out images (S814). Here, the left viewpoint image and the right viewpoint image cut out in step S812 correspond to a "viewpoint image based on a plurality of captured images in which a target object has been moved on the basis of a first movement amount" (first viewpoint image) and a "viewpoint image based on a plurality of captured images in which a target object has been moved on the basis of a second movement amount" (second viewpoint image).

For example, as in step S212 of FIG. 18, the image processing apparatus according to the present embodiment determines whether to perform different display (S816).

If it is determined in step S816 that different display is performed, the image processing apparatus according to the present embodiment determines, for example, as in step S214 of FIG. 18, whether to change a viewpoint direction (S818).

If it is determined in step S818 that a viewpoint direction is changed, the image processing apparatus according to the present embodiment repeats the processes from the step S802. To the contrary, if it is not determined in step S818 that a viewpoint direction is changed, the image processing apparatus according to the present embodiment repeats the processes from step S800.

If it is not determined in step S816 that different display is performed, the image processing apparatus according to the present embodiment finishes the processes.

The image processing apparatus according to the present embodiment performs, for example, the processes illustrated in FIG. 26 as the processes of the image processing method according to the present embodiment.

As illustrated in FIG. 26, the image processing apparatus according to the present embodiment generates two images (a right viewpoint image corresponding to an image for a right eye, and a left viewpoint image corresponding to an image for a left eye) in processes similar to the processes of the image processing method according to the fourth example illustrated in FIG. 25, the two images allowing for stereopsis. Accordingly, even when the image processing apparatus according to the present embodiment performs, for example, the processes illustrated in FIG. 26, the image processing apparatus according to the present embodiment can attain advantageous effects similar to the advantageous effects attained in the processes of the image processing method according to the fourth example described in [3-2-4].

Additionally, the processes of the image processing apparatus according to the fifth example are not limited to the processes illustrated in FIG. 26. For example, the image processing apparatus according to the present embodiment can perform processes according to a modified example, the processes being similar to the processes of the image processing method according to the fourth example described in [3-2-4].

(Image Processing Apparatus According to Present Embodiment)

Next, an example of the configuration of the image processing apparatus according to the present embodiment will be described, the image processing apparatus being capable of performing the processes of the image processing method according to the present embodiment.

Figure 27:
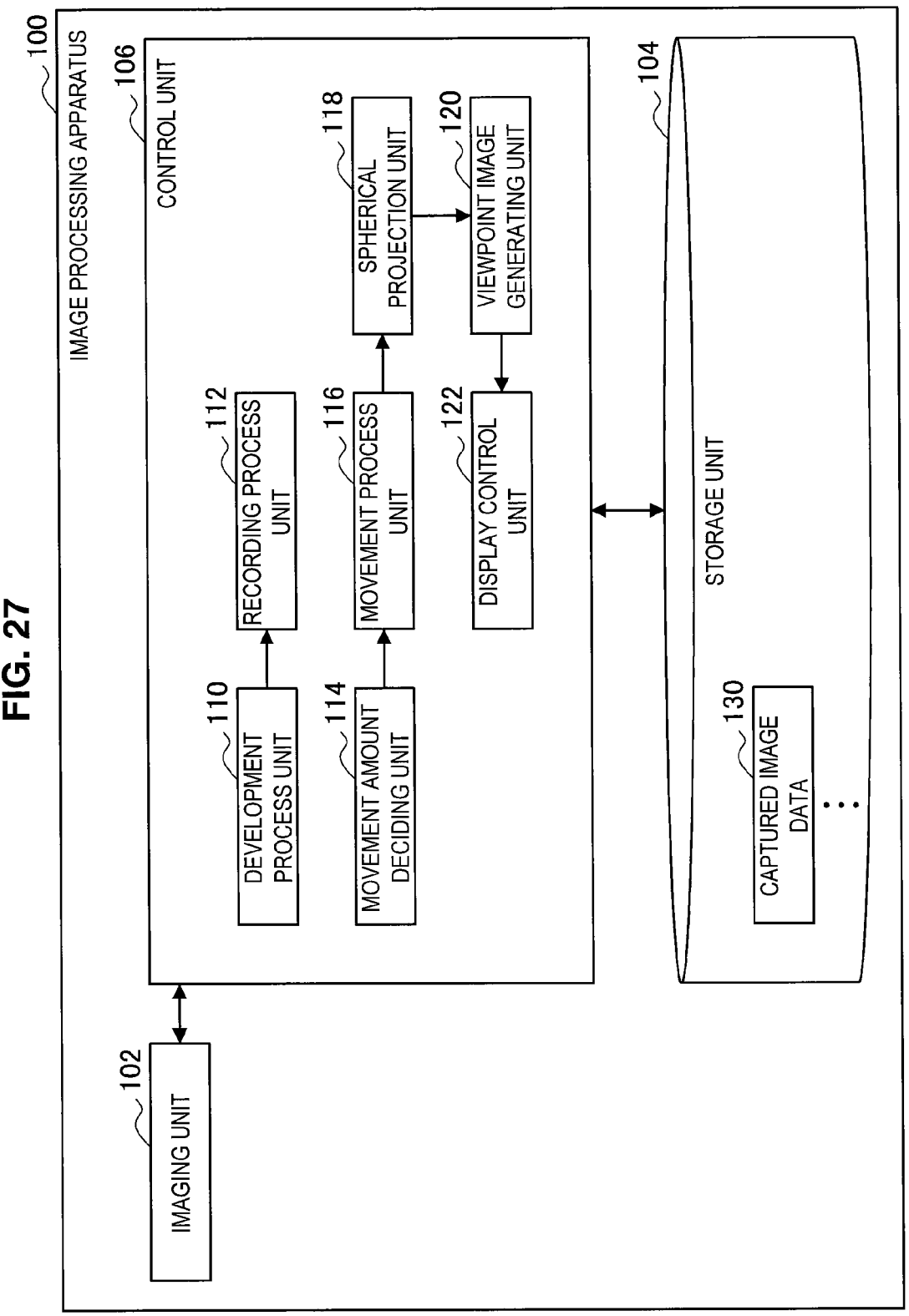
FIG. 27 is a block diagram illustrating an example of a configuration of an image processing apparatus according to the present embodiment.

FIG. 27 is a block diagram illustrating an example of the configuration of an image processing apparatus 100 according to the present embodiment. The image processing apparatus 100 includes, for example, an imaging unit 102, a storage unit 104, and a control unit 106.

In addition, the image processing apparatus 100 may include, for example, read only memory (ROM) (not illustrated), random access memory (RAM) (not illustrated), a communication unit (not illustrated), an operation unit (not illustrated) that a user can operate, and a display unit (not illustrated) that displays a variety of screens on a display screen. The image processing apparatus 100 uses, for example, a bus as a transmission path of data to connect the structural elements with each other.

The ROM (not illustrated) stores data for control such as programs and operation parameters used by the control unit 106. The RAM (not illustrated) temporarily stores a program or the like executed by the control unit 106.

The communication unit (not illustrated) is a communication mechanism included in the image processing apparatus 100, and performs wireless or wired communication with an external imaging device and an external apparatus via a network (or directly). For example, the control unit 106 controls the communication of the communication unit (not illustrated). Examples of the communication unit (not illustrated) include a communication interface discussed below.

Examples of the operation unit (not illustrated) include an operation input device discussed below. Meanwhile, examples of the display unit (not illustrated) include a display device discussed below.

[Hardware Configuration Example of Image Processing Apparatus 100]

Figure 28:
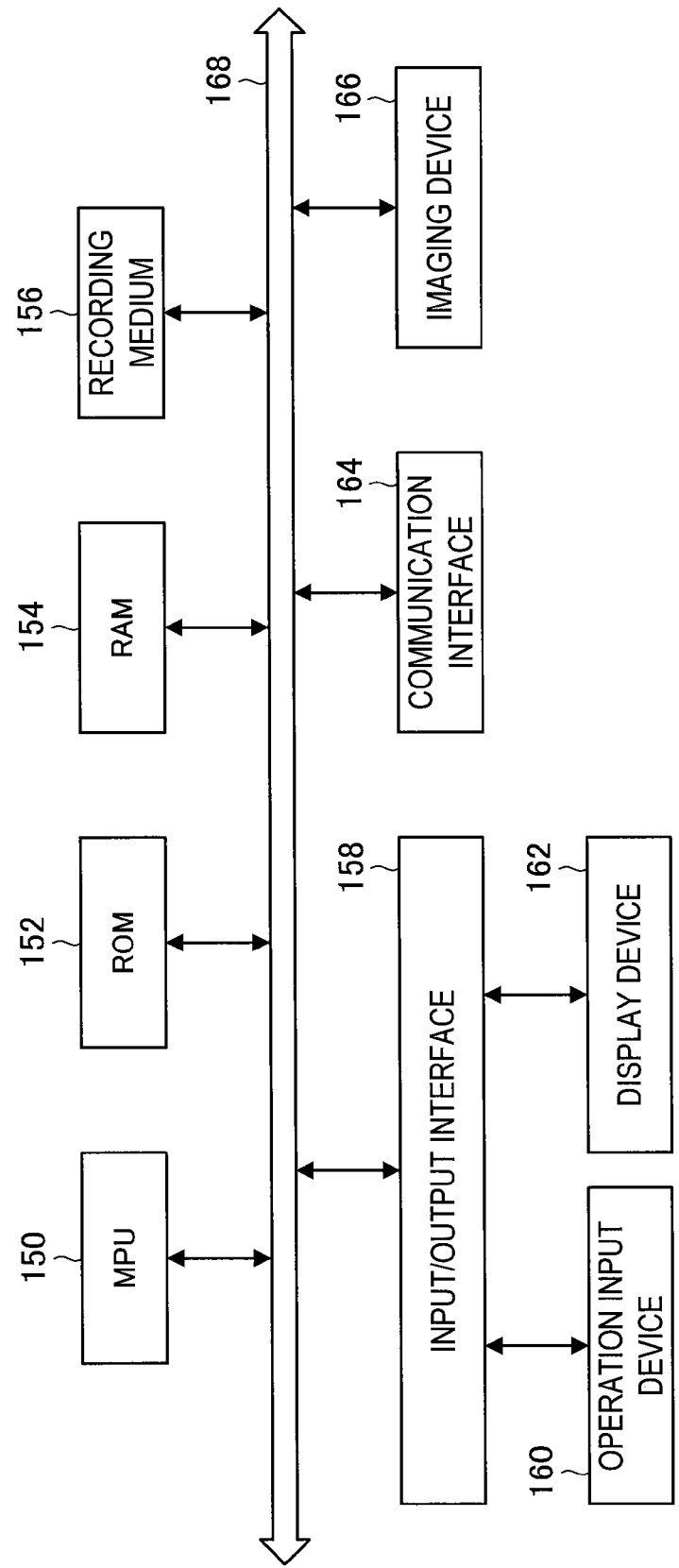
FIG. 28 is an explanatory diagram illustrating an example of a hardware configuration of an image processing apparatus according to the present embodiment.

FIG. 28 is an explanatory diagram illustrating an example of the hardware configuration of the image processing apparatus 100 according to the present embodiment. The image processing apparatus 100 includes, for example, an MPU 150, ROM 152, RAM 154, a recording medium 156, an input/output interface 158, an operation input device 160, a display device 162, a communication interface 164, and an imaging device 166. In addition, the image processing apparatus 100 uses, for example, a bus 168 as a transmission path of data to connect the structural elements with each other.

The MPU 150 includes, for example, a processor composed of an operation circuit such as a micro processing unit (MPU), and a variety of processing circuits, and functions as the control unit 106, which controls the entire image processing apparatus 100. In addition, the MPU 150 serves, for example, as a development process unit 110, a recording process unit 112, a movement amount deciding unit 114, a movement process unit 116, a spherical projection unit 118, a viewpoint image generating unit 120, and a display control unit 122 discussed below in the image processing apparatus 100.

The ROM 152 stores data for control such as programs and operation parameters used by the MPU 150. The RAM 154 temporarily stores, for example, a program or the like executed by the MPU 150.

The recording medium 156 functions as the storage unit 104, and stores a variety of data such as data for the image processing method according to the present embodiment including data indicating a captured image and data indicating a function representing a lens characteristic at the angle from the center of an image, and applications. Here, examples of the recording medium 156 include magnetic recording media such as hard disks and non-volatile memory such as flash memory. The recording medium 156 may be detachably attached to the image processing apparatus 100.

The input/output interface 158 connects, for example, the operation input device 160 to the display device 162. The operation input device 160 functions as an operation unit (not illustrated), while the display device 162 functions as a display unit (not illustrated). Examples of the input/output interface 158 include universal serial bus (USB) terminals, digital visual interface (DVI) terminals, high-definition multimedia interface (HDMI) (registered trademark) terminals, and a variety of processing circuits.

Meanwhile, the operation input device 160 is, for example, installed on the image processing apparatus 100, and connected to the input/output interface 158 inside the image processing apparatus 100. Examples of the operation input device 160 include buttons, direction keys and rotary selectors such as jog dials, or combinations thereof.

Meanwhile, the display device 162 is, for example, installed on the image processing apparatus 100, and connected to the input/output interface 158 inside the image processing apparatus 100. Examples of the display device 162 include liquid crystal displays and organic electroluminescence (EL) displays (which are also referred to as organic light emitting diode (OLED) displays).

Needless to say, the input/output interface 158 can be connected to an external device such as an external operation input device (including, for example, a keyboard and a mouse) and an external display device that are external apparatuses of the image processing apparatus 100. Meanwhile, the display device 162 may also be a device such as a touch screen capable of display and a user operation.

The communication interface 164 is a communication mechanism included in the image processing apparatus 100, and functions as a communication unit (not illustrated) that performs wireless or wired communication with an external apparatus such as an external setting target apparatus via a network (or directly). Here, examples of the communication interface 164 include a communication antenna and a radio frequency (RF) circuit (wireless communication), an IEEE 802.15.1 port and a transmission and reception circuit (wireless communication), an IEEE 802.11 port and a transmission and reception circuit (wireless communication), and a local area network (LAN) terminal and a transmission and reception circuit (wired communication). Examples of the networks according to the present embodiment include wired networks such as LANs and wide area networks (WANs), wireless networks such as wireless local area networks (WLANs) and wireless wide area networks (WWANs) via base stations, and the Internet, which uses communication protocols such as Transmission Control Protocol/Internet Protocol (TCP/IP).

The imaging device 166 is an imaging mechanism included in the image processing apparatus 100, includes a plurality of optical units, and uses all the directions as its imaging range. That is to say, the imaging device 166 serves as an omnidirectional imaging device according to the present embodiment.

FIG. 29 is an explanatory diagram illustrating an example of the hardware configuration of the image processing apparatus 100 according to the present embodiment, and A and B of FIG. 29 each illustrates an example of the configuration of the imaging device 166 included in the image processing apparatus 100.

The imaging device 166 configured as illustrated in A of FIG. 29 includes, for example, a lens L1, a lens L2, a light receiving element S1 corresponding to the lens L1, and a light receiving element S2 corresponding to the lens L2. The "lens L1 and the light receiving element S1" and the "lens L2 and the light receiving element S2" correspond to respective optical units of the imaging device 166 configured as illustrated in A of FIG. 29. That is to say, the imaging device 166 includes the two light receiving elements corresponding to the respective two lenses in the configuration illustrated in A of FIG. 29.

The imaging device 166 configured as illustrated in A of FIG. 29 has at least a part of the imaging ranges of the two optical units overlapping with each other, and uses all the directions as its imaging range.

Configured as illustrated in A of FIG. 29, the imaging device 166 outputs a signal indicating a captured image generated by the optical unit including the "lens L1 and the light receiving element S1" and a signal indicating a captured image generated by the optical unit including the "lens L2 and the light receiving element S2." Here, the signal that is output from the imaging device 166 configured as illustrated in A of FIG. 29 and indicates the captured image corresponding to each optical unit corresponds to a signal indicating RAW data.

The imaging device 166 configured as illustrated in B of FIG. 29 includes, for example, a lens L1, a lens L2, a mirror M, and a light receiving element S corresponding to the lens L1 and the lens L2. The "lens L1, the mirror M, and the light receiving element S" and the "lens L2, the mirror M, and the light receiving element S" each correspond to an optical unit of the imaging device 166 configured as illustrated in B of FIG. 29. That is to say, the single light receiving element is shared between the two lenses in the configuration illustrated in B of FIG. 29.

The imaging device 166 configured as illustrated in B of FIG. 29 has at least a part of the imaging ranges of the two optical units overlapping with each other, and uses all the directions as its imaging range.

Configured as illustrated in B of FIG. 29, the imaging device 166 outputs a signal indicating a captured image generated by the optical unit including the "lens L1, the mirror M, and the light receiving element S" and a signal indicating a captured image generated by the optical unit including the "lens L2, the mirror M, and the light receiving element S." Here, the signal that is output from the imaging device 166 configured as illustrated in B of FIG. 29 and indicates the captured image corresponding to each optical unit corresponds to a signal indicating RAW data.

For example, the configuration illustrated in FIG. 29 allows the imaging device 166 to obtain two captured images that have at least a part of regions overlapping with each other.

Additionally, the configuration of the imaging device 166 included in the image processing apparatus 100 according to the present embodiment is not limited to the configuration illustrated in FIG. 29. For example, as described with reference to FIGS. 14 and 15, the imaging device 166 may be configured of three or more optical units.

The image processing apparatus 100 uses, for example, the configuration illustrated in FIG. 28 to perform the processes of the image processing method according to the present embodiment. Additionally, the hardware configuration of the image processing apparatus 100 according to the present embodiment is not limited to the configuration illustrated in FIG. 28.

For example, the image processing apparatus 100 does not necessarily have to include the imaging device 166 for processing a plurality of captured images generated by an external omnidirectional imaging device according to the present embodiment.

Meanwhile, for example, the image processing apparatus 100 does not necessarily have to include the communication interface 164 for communicating with an external apparatus via a connected external communication device. In addition, the image processing apparatus 100 can also be configured to dispense with the storage medium 156, the operation device 160, or the display device 162.

An example of the configuration of the image processing apparatus 100 will be described with reference to FIG. 27 again. The imaging unit 102 is an imaging mechanism included in the image processing apparatus 100, includes optical units whose imaging ranges overlap with each other at least in part, and uses all the directions as its imaging range. The imaging unit 102 includes an omnidirectional imaging device according to the present embodiment which has been configured as illustrated, for example, in FIG. 29.

The storage unit 104 is a storage mechanism included in the image processing apparatus 100, and stores a variety of data such as data for the image processing method according to the present embodiment including data indicating a captured image and data indicating a function representing a lens characteristic at the angle from the center of an image, and applications. FIG. 27 illustrates an example in which captured image data 130, . . . are stored in the storage unit 104.

Here, examples of the storage unit 104 include magnetic recording media such as hard disks and non-volatile memory such as flash memory. The storage unit 104 may be detachably attached to the image processing apparatus 100.

The control unit 106 includes, for example, an MPU and the like, and serves to control the entire image processing apparatus 100. In addition, the control unit 106 includes, for example, a development process unit 110, a recording process unit 112, a movement amount deciding unit 114, a movement process unit 116, a spherical projection unit 118, a viewpoint image generating unit 120, and a display control unit 122, and serves to primarily perform the processes of the image processing method according to the present embodiment.

The development process unit 110 performs a development process, for example, on a signal indicating a captured image delivered from the imaging unit 102, and a signal indicating a captured image that has been received by a communication unit (not illustrated) and generated by an omnidirectional imaging device according to the present embodiment. The process performed by the development process unit 110 corresponds to, for example, the process in step S102 of FIG. 7.

The recording process unit 112 causes a recording medium such as the storage unit 104 to record a captured image on which the development process unit 110 has performed a development process. The process performed by the recording process unit 112 corresponds to, for example, the process in step S104 of FIG. 17.

In addition, the recording process unit 112 may cause a recording medium to store data indicating an imaging posture of the imaging unit 102 or an external omnidirectional imaging device according to the present embodiment along with the captured image. Examples of data indicating an imaging posture according to the present embodiment include data indicating an output of a sensor (including a gyro sensor) that can detect a posture and is included in the image processing apparatus 100, and an external omnidirectional imaging device according to the present embodiment and data indicating an output of an external sensor that can detect a posture and is connected to the image processing apparatus 100, and an external omnidirectional imaging device according to the present embodiment.

For example, if a movement amount deciding process according to the present embodiment and a movement process according to the present embodiment are performed as one of the imaging processes as illustrated in FIG. 22, the recording process unit 112 may records a captured image processed by the movement process unit 116 discussed below in a recording medium. The process for the recording process unit 112 to record a captured image in a recording medium corresponds to, for example, the process in step S408 of FIG. 22.

Data indicating an imaging posture according to the present embodiment is used, for example, in a process for the viewpoint image generating unit 120 to cut out an image, which will be described below. If the viewpoint image generating unit 120 performs a process on the basis of the set imaging posture, the recording process unit 112 does not necessarily have to cause a recording medium to store the data indicating an imaging posture according to the present embodiment.

The movement amount deciding unit 114 serves to perform a movement amount deciding process according to the present embodiment. The movement amount deciding unit 114 decides a movement amount for moving a target object in a manner that a plurality of captured images corresponding to respective optical units included in an omnidirectional imaging device according to the present embodiment look like images imaged from a reference position. The movement amount deciding unit 114 decides a movement amount on the basis of the "distance from the omnidirectional imaging device according to the present embodiment to the target object" and the "angle from a reference line at a reference position to the target object."

Here, examples of the captured image processed by the movement amount deciding unit 114 include an image indicated by captured image data that has been generated by the imaging unit 102 or an external omnidirectional imaging device according to the present embodiment and stored in a recording medium such as the storage unit 102. In addition, the movement amount deciding unit 114 can also process, for example, a captured image delivered from the imaging unit 102 or a captured image that has been generated by an external omnidirectional imaging device according to the present embodiment and received by a communication unit (not illustrated) or the like.

More specifically, the movement amount deciding unit 114 performs, for example, the processes in steps S300 to S304 of FIG. 19 to decide a movement amount. For example, as illustrated in steps S704 and S706 of FIG. 25 and steps S804 and S806 of FIG. 26, the movement amount deciding unit 114 may also decide a first movement amount and a second movement amount.

For example, as illustrated in FIG. 22, if a movement amount deciding process according to the present embodiment is performed as one of the imaging processes, the movement process unit 116 may decide a movement amount, for example, on the basis of a plurality of captured images on which the development process unit 110 performs a development process.

The movement process unit 116 serves to perform a movement process according to the present embodiment, and moves a target object included in captured images on the basis of the movement amount decided by the movement amount deciding unit 114. The process performed by the movement process unit 116 corresponds to, for example, the process in step S306 of FIG. 19. For example, as illustrated in steps S704 and S706 of FIG. 25 and steps S804 and S806 of FIG. 26, the movement process unit 116 may move a target object on the basis of a first movement amount, and may move the target object on the basis of a second movement amount.

The spherical projection unit 118 serves to perform a spherical projection process according to the present embodiment, and performs spherical projection for a plurality of captured images in which a target object has been moved. The process performed by the spherical projection unit 118 corresponds to, for example, the process in step S206 of FIG. 18.

The viewpoint image generating unit 120 serves to perform the a viewpoint image generating process according to the present embodiment, and cuts out an image corresponding to a set direction (desired viewpoint) from an image that has undergone spherical projection to generate a viewpoint image. The process performed by the viewpoint image generating unit 120 corresponds to, for example, the process in step S208 of FIG. 18.

Here, the process performed by the movement process unit 116, the process performed by the spherical projection unit 118, and the process performed by the viewpoint image generating unit 120 correspond to a series of processes of generating a viewpoint image on the basis of the movement amount decided by the movement amount deciding unit 114. Accordingly, the movement process unit 116, the spherical projection unit 118, and the viewpoint image generating unit 120 can be understood as an image generating unit of the image processing apparatus 100.

The display control unit 122 causes a display screen to display the viewpoint image generated by the viewpoint image generating unit 120. The process performed by the display control unit 122 corresponds to, for example, the process in step S210 of FIG. 18.

The image processing apparatus 100 uses, for example, the configuration illustrated in FIG. 27 to perform a process (e.g. a movement amount deciding process, a movement process, a spherical projection process, and a viewpoint image generating process) of the image processing method according to the present embodiment. The image processing apparatus 100 configured, for example, as illustrated in FIG. 27 can thus perform the processes of the image processing method according to the present embodiment such as the processes of the image processing method according to the first example described in [3-2-1] to the processes of the image processing method according to the fifth example described in [3-2-5].

For example, the configuration illustrated in FIG. 27 thus allows the image processing apparatus 100 to make more natural an image in which a plurality of captured images imaged by an imaging device have been combined, the imaging device using all the directions as its imaging range. For example, the configuration illustrated in FIG. 27 allows the image processing apparatus 100 to attain the advantageous effects as discussed above that would be attained in the processes of the image processing method according to the present embodiment provide.

Additionally, the configuration of the image processing apparatus according to the present embodiment is not limited to the configuration illustrated in FIG. 27.

For example, if the processes of the image processing method according to the present embodiment are performed on a plurality of captured images imaged by an external omnidirectional imaging device according to the present embodiment, an image processing apparatus according to the present embodiment does not necessarily have to include the imaging unit 102 illustrated in FIG. 27.

In addition, for example, "if the processes of the image processing method according to the present embodiment are performed on a plurality of captured images imaged by an external omnidirectional imaging device according to the present embodiment," or "if the processes of the image processing method according to the present embodiment are performed on a captured image that is RAW data," an image processing apparatus according to the present embodiment does not necessarily have to include the development process unit 110 illustrated in FIG. 27.

Furthermore, for example, "if the processes of the image processing method according to the present embodiment are performed on a plurality of captured images imaged by an external omnidirectional imaging device according to the present embodiment," or "if the processes of the image processing method according to the present embodiment are performed on a captured image that is RAW data or a captured image that has undergone a development process," the image processing apparatus according to the present embodiment does not necessarily have to include the recording process unit 112 illustrated in FIG. 27.

Still further, for example, "if the processes of the image processing method according to the present embodiment are performed on a captured image stored in an external recording medium or the like," or "if the processes of the image processing method according to the present embodiment are performed on a captured image that is RAW data or a captured image that has undergone a development process," the image processing apparatus according to the present embodiment does not necessarily have to include the storage unit 104 illustrated in FIG. 27.

The image processing apparatus according to the present embodiment can also be configured to dispense with one or two or more of the movement process unit 116, the spherical projection unit 118, the viewpoint image generating unit 120, and the display control unit 122.

Adopting any one of the configurations according to the modified examples or the combinations of the configurations according to the modified examples, an image processing apparatus according to the present embodiment can perform a movement amount deciding process according to the present embodiment. Accordingly, adopting any one of the configurations according to the modified examples or the combinations of the configurations according to the modified examples, an image processing apparatus according to the present embodiment can make more natural an image in which a plurality of captured images have been combined, the plurality of captured images being imaged by an imaging device using all the directions as its imaging range.

In addition, the image processing apparatus according to the present embodiment can include, for example, one or two or more of the development process unit 110, the recording process unit 112, the movement amount deciding unit 114, the movement process unit 116, the spherical projection unit 118, the viewpoint image generating unit 120, and the display control unit 122 illustrated in FIG. 27 apart from the control unit 106 (e.g. installed as another processing circuit). To give an example, the movement process unit 116, the spherical projection unit 118, and the viewpoint image generating unit 120 may, for example, installed as a single processing circuit corresponding to the image processing unit.

The present embodiment has been described above using an image processing apparatus, but the present embodiment is not limited thereto. The present embodiment can also be applied to a variety of apparatuses including, for example, an omnidirectional imaging device as illustrated in FIG. 1, a computer such as a personal computer (PC) and a server, a display apparatus, a television receiver, a communication apparatus such as a mobile phone and a smartphone, a tablet apparatus, a video/music player (or a video/music recording and reproduction apparatus), and a game console. In addition, the present embodiment can also be applied to, for example, a processing integrated circuit (IC) that can be inserted into the apparatus.

Meanwhile, the present embodiment may be implemented as a system composed of a plurality of apparatuses that connect to a network (or communicate with each other) like, for example, cloud computing. That is to say, an image processing apparatus according to the present embodiment can be implemented, for example, as an image processing system composed of a plurality of apparatuses.

(Program According to Present Embodiment)

A program (a program that can execute the processes of the image processing method according to the present embodiment including, for example, a "movement amount deciding process according to the present embodiment," and a "process including a movement amount deciding process according to the present embodiment described in the processes of the image processing apparatus according to the first example described in [3-2-1] to the processes of the image processing method according to the fifth example described in [3-2-5]) for causing a computer to function as an image processing apparatus according to the present embodiment is executed by a processor or the like in a computer, which can thereby make more natural an image in which a plurality of captured images imaged by an imaging device have been combined, the imaging device using all the directions as its imaging range.

In addition, a program for causing a computer to function as an image processing apparatus according to the present embodiment is executed by a processor or the like in a computer, which can thereby attain the advantageous effects that would be attained in the processes of the image processing method according to the present embodiment.

It should be understood by those skilled in the art that various modifications, combinations, sub-combinations and alterations may occur depending on design requirements and other factors insofar as they are within the scope of the appended claims or the equivalents thereof.

It has been described above, for example, that a program (a computer program) for causing a computer to function as an image processing apparatus according to the present embodiment is provided, and yet the present embodiment can further provide a recording medium having the program stored therein in addition to the program.

The above-described configurations show an example of the present embodiment, and naturally belong to the technological scope of the present disclosure.

The advantageous effects described herein are merely explanatory or illustrative, but not limited. That is to say, the technology according to the present disclosure may attain other advantageous effects obvious to those skilled in the art from the present specification in combination with the above-described advantageous effects or instead thereof.

Additionally, the present technology may also be configured as below.

(1) An image processing apparatus including:
a movement amount deciding unit configured to decide a movement amount for moving a target object that is a movement target among objects included in a plurality of captured images imaged by an imaging device including optical units that have imaging ranges overlapping with each other in part on the basis of a distance from the imaging device to the target object and an angle from a reference line at a reference position of the imaging device to the target object in a manner that the plurality of captured images look like images imaged from the reference position, the imaging device using all directions as an imaging range, the plurality of captured images corresponding to the respective optical units.

(2) The image processing apparatus according to (1),
wherein the movement amount deciding unit calculates the distance on the basis of the target object included in regions of the plurality of captured images, the regions overlapping with each other.

(3) The image processing apparatus according to (2),
wherein the movement amount deciding unit calculates the distance from the imaging device to the target object on the basis of an angle from a reference line at a position corresponding to each of the plurality of optical units to the target object and a distance between the plurality of optical units.

(4) The image processing apparatus according to any one of (1) to (3), further including:
an image generation unit configured to move the target object included in the plurality of captured images on the basis of the movement amount, and to generate a viewpoint image that is an image corresponding to a set direction on the basis of the plurality of captured images in which the target object has been moved.

(5) The image processing apparatus according to (4),
wherein the image generation unit includes
a movement process unit configured to move the target object included in the plurality of captured images on the basis of the decided movement amount,
a spherical projection unit configured to perform spherical projection for the plurality of captured images in which the target object has been moved, and
a viewpoint image generating unit configured to cut out an image corresponding to a desired viewpoint from the plurality of captured images that have undergone spherical projection, and to generate the viewpoint image.

(6) The image processing apparatus according to (4) or (5), further including:
a display control unit configured to cause a display screen to display the viewpoint image.

(7) The image processing apparatus according to (1) or (2),
wherein the imaging device includes three or more optical units configured to overlap a whole of the imaging range with the imaging ranges of the plurality of optical units,
wherein the reference position refers to a first reference position and a second reference position that are included in an n-sided polygon (where n represents a number of the optical units) that includes, as apices, positions corresponding to the respective three or more optical units, and
wherein the movement amount deciding unit decides a first movement amount for moving a target object that is a movement target among objects included in three or more captured images corresponding to the respective three or more optical units in a manner that the three or more captured images look like images imaged from the first reference position, and a second movement amount for moving the target object that is a movement target among the objects included in the three or more captured images in a manner that the three or more captured images look like images imaged from the second reference position.

(8) The image processing apparatus according to (1) or (2),
wherein the imaging device includes four or more optical units disposed on a pyramid, the four or more optical units overlapping a whole of the imaging range with the imaging ranges of the plurality of optical units,
wherein the reference position refers to a first reference position and a second reference position included in a pyramid that includes, as apices, positions corresponding to the respective four or more optical units, and
wherein the movement amount deciding unit decides a first movement amount for moving a target object that is a movement target among objects included in four or more captured images corresponding to the respective four or more optical units in a manner that the four or more captured images look like images imaged from the first reference position, and a second movement amount for moving the target object that is a movement target among the objects included in the four or more captured images in a manner that the four or more captured images look like images imaged from the second reference position.

(9) The image processing apparatus according to (7) or (8), further including:

an image generation unit
configured to generate a first viewpoint image that is an image corresponding to a desired viewpoint on the basis of the plurality of captured images in which the target object included in the plurality of captured images has been moved on the basis of the first movement amount, and
configured to generate a second viewpoint image that is an image corresponding to a desired viewpoint on the basis of the plurality of captured images in which the target object included in the plurality of captured images has been moved on the basis of the second movement amount.

(10) The image processing apparatus according to any one of (1) to (9), further including:
an imaging unit including the imaging device,
wherein the movement amount deciding unit decides the movement amount for a plurality of captured images imaged by the imaging unit.

(11) An image processing method to be executed by an image processing apparatus, the image processing method including:
deciding a movement amount for moving a target object that is a movement target among objects included in a plurality of captured images imaged by an imaging device including optical units that have imaging ranges overlapping with each other in part on the basis of a distance from the imaging device to the target object and an angle from a reference line at a reference position of the imaging device to the target object in a manner that the plurality of captured images look like images imaged from the reference position, the imaging device using all directions as an imaging range, the plurality of captured images corresponding to the respective optical units.

(12) A program for causing a computer to execute:
deciding a movement amount for moving a target object that is a movement target among objects included in a plurality of captured images imaged by an imaging device including optical units that have imaging ranges overlapping with each other in part on the basis of a distance from the imaging device to the target object and an angle from a reference line at a reference position of the imaging device to the target object in a manner that the plurality of captured images look like images imaged from the reference position, the imaging device using all directions as an imaging range, the plurality of captured images corresponding to the respective optical units.

What is claimed is:

1. An image processing apparatus, comprising:
one or more processors configured to decide a movement amount to move a target object, that is a movement target among objects included in a plurality of captured images imaged by an imaging device that includes plurality of optical units that have imaging ranges that overlap with each other in part, on the basis of:
a distance from the imaging device to the target object, and
an angle from a reference line at a reference position that include a central position of the imaging device to the target object in a manner that the plurality of captured images look like images imaged from the reference position,
wherein the imaging device uses all directions as an imaging range, the plurality of captured images corresponding to respective optical units of the plurality of optical units to generate a viewpoint image that is an image that corresponds to a set direction on the basis of the plurality of captured images in which the target object has been moved.

2. The image processing apparatus according to claim 1, wherein the one or more processors are configured to calculate the distance on the basis of the target object included in regions of the plurality of captured images, wherein the regions correspond to the imaging ranges that overlap with each other.

3. The image processing apparatus according to claim 2, wherein the one or more processors are configured to calculate the distance from the imaging device to the target object on the basis of an angle from a reference line at a position corresponding to each of the plurality of optical units to the target object and a distance between the plurality of optical units.

4. The image processing apparatus according to claim 1, wherein the one or more processors are configured to move the target object included in the plurality of captured images on the basis of the movement amount, and to generate the viewpoint image.

5. The image processing apparatus according to claim 4, wherein the one or more processors are further configured to:
move the target object included in the plurality of captured images on the basis of the decided movement amount;
perform spherical projection for the plurality of captured images in which the target object has been moved;
cut out an image corresponding to a desired viewpoint from the plurality of captured images that have undergone spherical projection; and
generate the viewpoint image.

6. The image processing apparatus according to claim 4, wherein the one or more processors are further configured to cause a display screen to display the viewpoint image.

7. The image processing apparatus according to claim 1, wherein the imaging device includes three or more optical units of the plurality of optical units configured to overlap a whole of the imaging range with the imaging ranges of the plurality of optical units,
wherein the reference position refers to a first reference position and a second reference position that are included in an n-sided polygon (where n represents a number of the optical units) that includes, as apices, positions corresponding to the respective three or more optical units, and
wherein the one or more processors are configured to decide a first movement amount to move a target object that is a movement target among objects included in three or more captured images corresponding to the respective three or more optical units in a manner that the three or more captured images look like images imaged from the first reference position, and a second movement amount to move the target object that is a movement target among the objects included in the three or more captured images in a manner that the three or more captured images look like images imaged from the second reference position.

8. The image processing apparatus according to claim 1, wherein the imaging device includes four or more optical units disposed on a pyramid, wherein the four or more optical units of the plurality of optical units overlap a whole of the imaging range with the imaging ranges of the plurality of optical units, wherein the reference position refers to a first reference position and a second reference position included in a pyramid that includes, as apices, positions corresponding to the respective four or more optical units, and wherein the one or more processors are configured to decide a first movement amount to move a target object that is a movement target among objects included in four or more captured images corresponding to the respective four or more optical units in a manner that the four or more captured images look like images imaged from the first reference position, and a second movement amount to move the target object that is a movement target among the objects included in the four or more captured images in a manner that the four or more captured images look like images imaged from the second reference position.

9. The image processing apparatus according to claim 7, wherein the one or more processors are further configured to:

generate a first viewpoint image that is an image corresponding to a desired viewpoint on the basis of the plurality of captured images in which the target object included in the plurality of captured images has been moved on the basis of the first movement amount, and generate a second viewpoint image that is an image corresponding to a desired viewpoint on the basis of the plurality of captured images in which the target object included in the plurality of captured images has been moved on the basis of the second movement amount.

10. The image processing apparatus according to claim 1, wherein the one or more processors are configured to decide the movement amount for the plurality of captured images imaged by the imaging device.

11. An image processing method to be executed by an image processing apparatus, comprising:

deciding a movement amount for moving a target object, that is a movement target among objects included in a plurality of captured images imaged by an imaging device including a plurality of optical units that have imaging ranges overlapping with each other in part, on the basis of:

a distance from the imaging device to the target object, and an angle from a reference line at a reference position that include a central position of the imaging device to the target object in a manner that the plurality of captured images look like images imaged from the reference position, wherein the imaging device uses all directions as an imaging range, the plurality of captured images corresponding to respective optical units of the plurality of optical units to generate a viewpoint image that is an image corresponding to a set direction on the basis of the plurality of captured images in which the target object has been moved.

12. A non-transitory computer-readable storage medium having stored thereon, a set of computer-executable instructions for causing a computer to execute operations, comprising:

deciding a movement amount for moving a target object, that is a movement target among objects included in a plurality of captured images imaged by an imaging device including a plurality of optical units that have imaging ranges overlapping with each other in part, on the basis of:

a distance from the imaging device to the target object, and an angle from a reference line at a reference position that include a central position of the imaging device to the target object in a manner that the plurality of captured images look like images imaged from the reference position, wherein the imaging device uses all directions as an imaging range, the plurality of captured images corresponding to respective optical units of the plurality of optical units to generate a viewpoint image that is an image corresponding to a set direction on the basis of the plurality of captured images in which the target object has been moved.

* * * * *